United States Patent [19]

Potash et al.

[11] Patent Number: 5,222,236
[45] Date of Patent: Jun. 22, 1993

[54] MULTIPLE INTEGRATED DOCUMENT ASSEMBLY DATA PROCESSING SYSTEM

[75] Inventors: M. Steven Potash, South Euclid; Raymond T. Nygren, Euclid, both of Ohio

[73] Assignee: OverDrive Systems, Inc., Beachwood, Ohio

[21] Appl. No.: 751,676

[22] Filed: Aug. 23, 1991

Related U.S. Application Data

[63] Continuation of Ser. No. 188,777, Apr. 29, 1988, abandoned.

[51] Int. Cl.⁵ .............................................. G06F 15/40
[52] U.S. Cl. .............................. 395/600; 364/DIG. 1; 364/DIG. 2; 364/943; 364/222.81; 364/222.82; 364/225.6; 364/225.8
[58] Field of Search ................. 395/DIG. 1, DIG. 2, 395/100, 600, 700, 800

[56] References Cited

U.S. PATENT DOCUMENTS

| | | | |
|---|---|---|---|
| 4,156,909 | 5/1979 | Barton et al. | 364/200 |
| 4,485,454 | 11/1984 | Kimoto | 364/900 |
| 4,601,003 | 7/1986 | Yoneyama et al. | 364/900 |
| 4,713,754 | 12/1987 | Agarwal et al. | 364/200 |
| 4,792,919 | 12/1988 | Fukunaga | 364/900 |
| 4,881,197 | 11/1989 | Fischer | 364/900 |
| 4,918,648 | 4/1990 | Taguchi et al. | 364/900 |

FOREIGN PATENT DOCUMENTS 1205562  3/1984  Canada .

Primary Examiner—Robert R. Harrell
Attorney, Agent, or Firm—Jones, Day, Reavis & Pogue

[57] ABSTRACT

A multiple document assembly data processing system allows a user to pick and assemble numerous documents (or files) while collecting required variable field information for each of the documents and eliminating duplicate information. The system enables a user in a single data entry operation to prepare each of the documents at substantially the same time by distributing information entered to all the selected documents or files. The system is an interactive, menu-driven system which uses prompt windows in which, for example, documents are selected and entry formats are presented to prompt a user to enter common variable information relating to numerous documents. The documents are stored in a library which is organized into a series of volumes. Each volume is broken down further into a series of chapters. Each chapter, in turn, may store a series of specific documents. Each of the documents includes a series of field names that are required to have data inserted therein to complete the document. Each of these stored documents may be revised, edited, and manipulated in accordance with a conventional word processing system which is resident in the system.

62 Claims, 20 Drawing Sheets

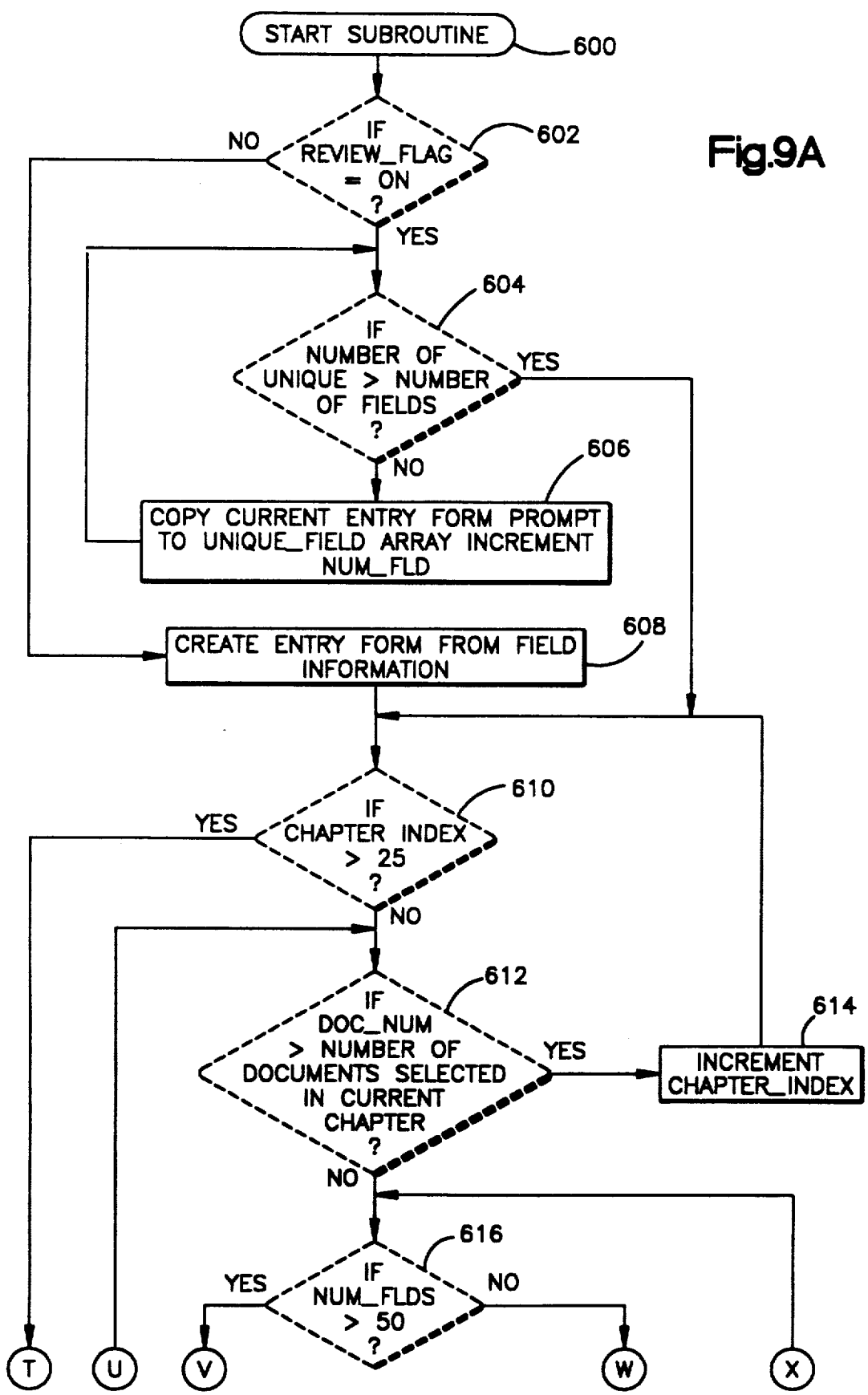

SET UP.CFG

```
SUBDIRECTORY WHERE OVERDRIVE SYSTEM
            PROGRAM FILE EXISTS
SUBDIRECTORY WHERE WORD PROCESSOR EXISTS
            AND WORD PROCESSOR VERSION DATA
SUBDIRECTORY WHERE VOLUME 1 EXISTS
SUBDIRECTORY WHERE VOLUME 2 EXISTS
                       ⋮
SUBDIRECTORY WHERE VOLUME 5 EXISTS

CONTINUOUS TYPE PRINTER
```

Fig.10

USER.DEF

| | |
|---|---|
| VOLUME 1 | MENU SELECT ITEM<br>MENU CALLED (CHAPTER MENU)<br>STATUS WINDOW PROMPT |
| VOLUME 2 | |
| ⋮ | |
| VOLUME 5 | |

Fig.11

USER / DEF

| | |
|---|---|
| CHAPTER 1 | MENU SELECTION ITEM |
| | 4 CHAR. CHAPTER INDEX |
| CHAPTER 2 | STATUS WINDOW PROMPT |
| | MENU SELECTION ITEM |
| CHAPTER n | ⋮ |

Fig.12

```
          IDX FILE
    ┌─────────────────────────────────┐
 1  │ DOCUMENT NAME (CHAP.NAME____)   │
    │ DOCUMENT DESCRIPTION            │
 2  │ DOCUMENT NAME                   │
    │ DOCUMENT DESCRIPTION            │
 .  │                                 │
 .  │                                 │
 .  │                                 │
50  │ DOCUMENT NAME                   │
    │ DOCUMENT DESCRIPTION            │
    └─────────────────────────────────┘
```

Fig.13

```
                        VARIABLE FILE
                ┌──────────────────────────┐
      FIELD 1   │ _DOC.NAME (CHAP____)     │
                │  PICTURE FORMAT          │
                │  FUNCTION                │
                │  PROMPT WINDOW PROMPT    │
                │  ENTRY WINDOW PROMPT     │
                │                          │
      FIELD 2   │                          │
                ⋮                          │
      FIELD n   │                          │
                └──────────────────────────┘
```

Fig.14

DOCUMENT SELECT MENU – COMMERCIAL CHAPTER

```
┌─────────────────────── Volumes ──────────────────────┐
│ LEGAL  Sample Forms  Open  Open                      │
│ ─────────────────────── Chapters ─────────────────── │
│ Personnel  Real Estate  Wills&Trust  COMMERCIAL  Corporate │
│                                                      │
│ COMM101    Indentification Agreement                 │
│ COMM102    NON-DISCLOSURE AGREEMENT                  │
│ COMM103    Escrow Agreement                          │
│ COMM104    Assignment of Note                        │
│ COMM105    Promissory Note, Variable Rate            │
│ COMM106    Promissor Note, Fixed Rate                │
│ COMM107    General Security Agreement                │
│ COMM108    Guarantee                                 │
│ COMM109    Truth-in-Lending Disclosure Statement     │
│ COMM110    Right of Recision Statement (Truth-in-Lending) │
│ COMM111    General Release                           │
│ COMM112    General Bill of Sale                      │
│ COMM113    Consignment Sales Agreement               │
│ COMM114    Earnest Agreement to Sell                 │
│ COMM115    Bulk Sales Agreement                      │
│            Continued....                             │
└──────────────────────────────────────────────────────┘
   <↑>To Select<↓>[ENTER]  <ESC>Prior Menu  <F7>Done
```

Fig.15

```
         ┌─────── OverDrive Entry Window   Page 1 ──────┐
         │ SIGNING CITY      BELLEVUE                    │
         │ SIGNING STAT      Washington                  │
         │ AGREE DATE        3/1/88                      │
         │ CORP NAME         ABC Company                 │
         │ CORP ADDRESS      1234 State Street           │
         │ CORP CITY         Bellevue                    │
         │ CORP STATE        Washington                  │
         │ CORP ZIP          90884                       │
         │ EMPLOYEE          "Your Name"                 │
         │ EMPLOYEE ADD      "Your Address"              │
         └───────────────────────────────────────────────┘

┌──────────────── <Prompt Window> ─────────────┐
         │ city where agreement is signed                │
         └───────────────────────────────────────────────┘
```

*FIRST ENTRY SCREEN*

Fig.16

```
                  ┌──────── OverDrive Entry Window   Page 2 ────────┐
                  │  EMPLOY CITY      YOUR CITY                     │
                  │  EMPLOY STATE    "Your State"                   │
                  │  EMPLOYEE ZIP    "Your Zip"                     │
SECOND ENTRY SCREEN  ANNUAL SAL$      12888                         │
     [PGDN]        │  HIS/HER                                       │
                  │  HE/SHE                                         │
                  │  WEEKS VACATN     4                             │
                  │  CORP COUNTY      Xing                          │
                  │                                                 │
                  └─────────────────────────────────────────────────┘
```

┌──────────────── <Prompt Window> ────────────────┐
│ city where employee resides                       │
└───────────────────────────────────────────────────┘

Fig.17

Volume/Chapter Description

OverDrive

┌─── 1 ───┐
│ Legal   │
└─────────┘

┌─── 2 ───────┐
│ Sample Forms│
└─────────────┘

┌─── 3 ───┐
│ Open    │
└─────────┘
                    ┌─────────────────────────────────────┐
                    │ Enter Volume number to Edit [1–5]:  │
┌─── 4 ───┐         └─────────────────────────────────────┘
│ Open    │
└─────────┘

┌─── 5 ───┐
│ Open    │
└─────────┘

┌──────────────── <Prompt Window> ────────────────┐
│ <ESC> Quit                                        │
└───────────────────────────────────────────────────┘

Fig.18

*Document*
*Description*

```
                          OverDrive
                        Volume: Legal
                       Chapter: Personnel
   Document          Document Description
  ─────────────────────── Page 1 ───────────────────────
  PERS▮▮▮   Offer of Employment
  PERS102   Employment Agreement
  PERS103   Employee Confidentiality and Invention Agreement
  PERS104   Non-competition Agreement
  PERS105   118 Business Envelope, for Employee
  PERS106   9 x 12 envelope, Horizontal Address, for Employee
  PERS107   Personnel Memo
  PERS108   Request for Reference
  PERS109   Employee Benefit letter
  PERS110   Independent Contractor Agreement
  PERS111   Cover letter, Independent Contractor
  PERS112   118 Business Envelope, for Independent Contractor
  PERS
  PERS
  PERS
```

```
  ─────────────────<Prompt Window>───────────────────
  Enter Document Number   <F7>Save/Exit   <ESC>Quit  ↑↓<PgUp><PgDn>
```

Fig.19

```
                     Data
                  Entry Screen
                                                    OverDrive
                                                 Volume: Legal
                              Data  Chapter: Commercial       Document: COMM101
                   Field      Type  #        Prompt Window
                                             ──── Page 1 ────
                   1   AGREE DATE    T  28   date on which agreement is signed
                   2   FIRST PARTY   T  58   full name of the first party
                   3   ADDRESS 1     T  58   street address of first party
                   4   CITY 1        T  48   city on which the first party resides
                   5   STATE 1       T  15   state in which the first party resides
                   6   ZIP 1         T  5    zip code for the first party
                   7   SECOND PARTY  T  58   full name of the second
                   8   ADDRESS 2     T  48   street address of the second party
                   9   CITY 2        T  48   city in which the secodn party resides
                  10   STATE 2       T  15   state in which the second party resides
                  11   ZIP 2         T  5    zip code for the second party
                  12                    0
                  13                    0
                  14                    0
                  15                    0
```

```
                                  ─<Prompt Window>─
                   Enter Document Number   <F7>Save/Exit   ↑↓<PgUp><PgDn>  <ESC>Quit
```

Fig.20

Reference File Report

| 03/31/88 | Reference File Document Information | | |
|---|---|---|---|
| Reference Files | Documents | Description | |
| 1. LOAN.REF | COMM106 | Promissory Note, Fixed Rate | |
|  | COMM107 | General Security Agreement | |
|  | COMM109 | Truth-in-Lending Disclosure Statement | |
| 2. NEWCORP.REF | CORP103 | Articles of Incorporation | |
|  | CORP104 | Resolution for Subchapter S Election | |
|  | CORP105 | Corporate Bylaws | |
|  | CORP108 | Resolution Appointing Statutory Agent | |
| 3. NEWHIRE.REF | PERS102 | Employment Agreement | |
|  | PERS105 | #10 Business Envelope, for Employee | |
| 4. WILLPACK.REF | WILL101 | Simple Form of Will | |
|  | WILL103 | Power of Attorney | |
|  | COMM121 | Attorney Fee Letter – Contract | |

Fig.21

MULTIPLE INTEGRATED DOCUMENT ASSEMBLY DATA PROCESSING SYSTEM

This is a continuation of application Ser. No. 07/188,777, filed Apr. 29, 1988, now abandoned.

FIELD OF THE INVENTION

This invention relates generally to data processing systems having word processing capabilities and designed for composing documents, letters, files or the like. More particularly, the invention relates to a data processing method and apparatus that allows a user to pick and assemble numerous documents (or files) while collecting required variable field information for each of the documents and eliminating duplicate information. The system enables a user in a single data entry operation to prepare each of the documents at substantially the same time by distributing information entered to all the selected documents or files.

BACKGROUND AND SUMMARY OF THE INVENTION

Word processing systems have now become an indispensable tool in virtually every office setting. Such word processing systems allow a user to efficiently create and revise documents of all types such as personal letters, legal contracts, corporate by-laws, etc.

Many of these word processing systems support the storage of frequently used documents which may be individually accessed and completed with data tailored to a particular user. Likewise, many word processing systems permit a user to complete a common form letter with data relating to numerous different individuals, as evidenced by the multitude of personalized "junk" mail which is received by nearly everyone on a daily basis. The merge option in presently available word processing systems permit such standard form letters to be generated.

While presently available word processing systems include a document merging capability, the merging capability is limited. For example, the word processing system, WordPerfect, in addition to its standard word processing document creation and revision features, allows a user to merge documents through the use of a primary and secondary merge file. In this regard, in WordPerfect, through the use of a "secondary" merge file, a series of form documents can be generated using personalized data relating to a series of individuals stored in a "primary" merge file. However, in WordPerfect, if a different type of form document needs to be created, a new secondary merge file must be independently created and supplied with data.

In many commercial settings, there is a need for a series of unique documents or files to be prepared and assembled for a single individual, partnership, or corporation. Presently available word processing systems require each such document to be independently prepared. Moreover, present word processing systems are devoid of any mechanism for aiding a user in efficiently assembling and managing multiple documents, even those which are frequently used.

The present invention permits a user to integrate numerous substantially unrelated documents (or files) while supplying such documents with required variable field information. The present invention permits these documents to be prepared and assembled with optimum efficiency and with minimum errors.

For example, a lawyer may be required to prepare a set of distinct documents all relating to a common party or parties, e.g., an employment agreement, an employee confidentiality and invention agreement, a non-compete agreement, and a cover letter for an employee of a particular corporation. In the present invention, each of the documents is stored as a form document, having standard "boilerplate" language and variable field information which must be tailored to a particular user.

In accordance with an exemplary embodiment of the present invention, a user is only required to enter common variable information once for each of the documents selected from a library of documents. Upon entering, for example, his name, address, and other information only once, such information is printed on each of the employment agreement, employee confidentiality and invention agreement, the non-compete agreement as well as a cover letter and envelopes addressed to the new employee.

The present invention is an interactive, menu-driven system which uses prompt windows in which, for example, documents are selected and entry formats are presented to prompt a user to enter common variable information relating to numerous documents. The documents are stored in a library which is organized into a series of volumes. For example, one volume may be dedicated solely to legal documents.

Each volume is broken down further into a series of chapters where, for example, one chapter in the legal volume may relate to commercial law matters, another chapter may relate to real property related matters. Each chapter, in turn, may store a series of specific documents falling within the body of law to which the chapter is directed.

Each of the documents includes a series of field names that are required to have data inserted therein to complete the document. Each of these stored documents may be revised, edited, and manipulated in accordance with a conventional word processing system which is resident in the system. For example, in the exemplary embodiment of the present invention to be described in detail below, each of the stored documents or files may be edited using the commercially available WordPerfect word processing system.

BRIEF DESCRIPTION OF THE DRAWINGS

These as well as other features of this invention will be better appreciated by reading the following detailed description of the preferred embodiment of the present invention taken in conjunction with the accompanying drawings of which:

FIGS. 9A and 9B are a flowchart delineating the sequence of operations performed by the "scrform" subroutine;

FIG. 10 is a schematic representation of the set and configuration file;

FIG. 11 is a schematic representation of a file utilized to create a volume menu;

FIG. 12 is a schematic representation of a file utilized to create a chapter menu;

FIG. 13 is a schematic representation of the index file;

FIG. 14 is a schematic representation of a variable file;

FIG. 15 is an exemplary document select menu;

FIG. 16 is an exemplary first field data entry screen;

FIG. 17 is an exemplary second field data entry screen;

FIG. 18 is an exemplary screen display where a user can edit or modify a volume;

FIG. 19 is an exemplary document description screen;

FIG. 20 is an exemplary document description screen showing variable fields and associated descriptions; and FIG. 21 is an exemplary reference file report.

DETAILED DESCRIPTION OF THE DRAWINGS

Figure 1:
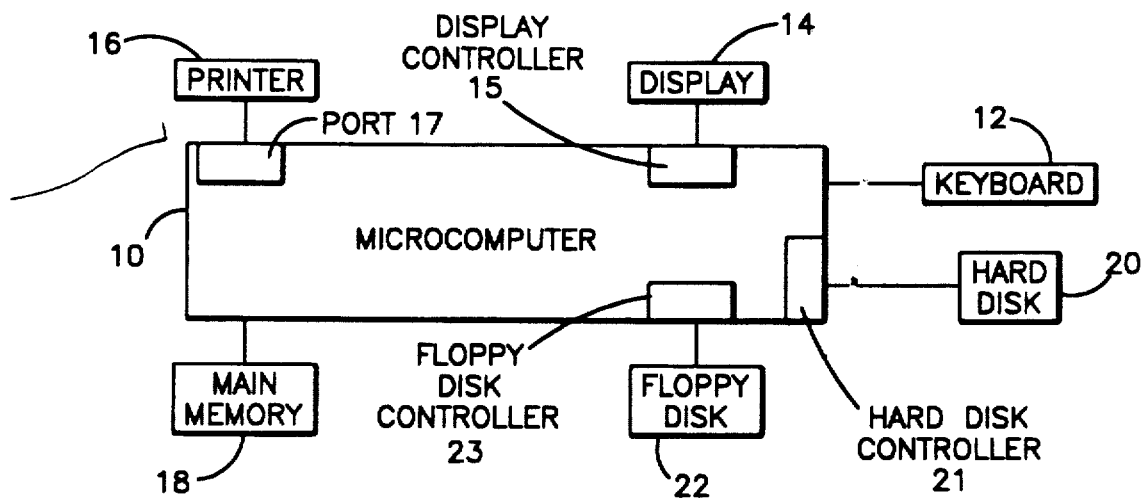
FIG. 1 is a schematic diagram of the hardware of an exemplary embodiment of the present invention.

FIG. 1 shows a schematic block diagram of an exemplary embodiment of a multiple document assembly data processing system in accordance with the present invention. In the detailed description which follows (or in the associated drawings), any reference to the Over-Drive system should be construed as a reference to a multiple document assembly data processing system in accordance with an exemplary embodiment of the present invention. The heart of the data processing system is microcomputer 10 which may, by way of example only, be a commercially available IBM PC or the like.

Coupled to microcomputer 10 is a keyboard 12, which may be, for example, a Keytronics 5150. Keyboard 12 is used by the operator to key in data to create documents and to control system operation by selecting options during interactive operations. The microcomputer 10 is also coupled to a display terminal 14, which may be a Samsung CD1452M extended graphics adapter which provides a color display.

Documents generated on the system, as well as worksheets that are utilized in the construction of such documents, are printed by a printer 16, which may, for example be a HP Laser Jet Series 2 laser printer.

The system also includes main memory 18, which may, for example, be a semiconductor dynamic random access memory having 640K bytes of storage capacity. The system further includes a hard disk 20, which by way of example only, has 10 Mega bytes of storage capacity. The system also includes a floppy disk 22.

Each of these components are interfaced with microcomputer 10 via conventional interface cards as will be appreciated by those skilled in the art. In this regard, the system includes a hard disk controller 21 associated with hard disk 20 and a floppy disk controller 23 associated with floppy disk 22. A conventional display controller 15, e.g., an extended graphic video card 15, is associated with display 14. The system also includes a parallel port 17 associated with printer 16.

The microcomputer's operating system, which may, for example, be the MS DOS operating system (which is typically associated with an IBM PC),is initially stored on hard disk 20 and is then loaded for execution into main memory 18 upon turning the power on. Also resident on hard disk 20 is a commercially available word processing software system for supporting conventional word processing operations on documents generated by the system. As noted above, by way of example only, the WordPerfect word processing system is utilized in an exemplary embodiment of the present invention.

Figure 2:
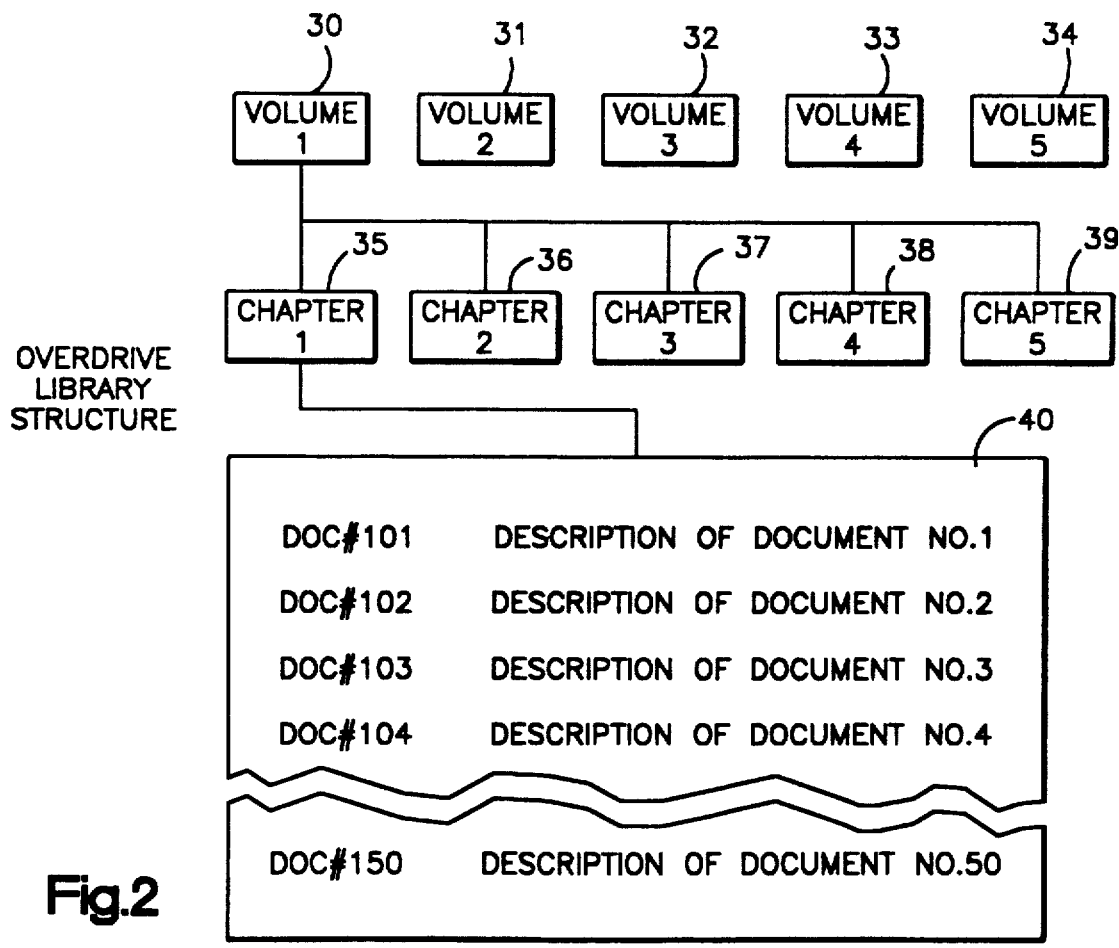
FIG. 2 shows an exemplary document library structure.

A library of form documents is also resident on hard disk 20. The library of documents, which is generally shown in FIG. 2, is organized and accessible by volume, chapter, document, field or variables or paragraph. By way of example only, the library, as shown in FIG. 2 includes a maximum of five volumes. Each volume includes up to five chapters. Each chapter stores up to fifty documents to thereby permit a maximum of up to 1,250 documents per library. The organization of documents in this fashion permits documents to be meaningfully organized by subject matter and allows for rapid access of any individual document. The documents stored in the library system of FIG. 2 are referred to as the primary merge documents in the system.

As shown in FIG. 2, the library includes five volumes 30-34. Each volume has five associated chapters, such as chapters 35-39 associated with volume 1. Volume 1 may, for example, be dedicated to legal related documents and chapters 35-39 may be directed to personnel related legal documents, real estate legal documents, wills and trusts, commercial legal documents and corporate legal documents, respectively.

In the first chapter relating to personnel related legal matters may be documents such as an offer of employment, an employment agreement, an employee confidentiality and invention agreement, etc. Also associated with each chapter is an index file 40 defining each document name and a description of the contents of the document. The description of the document provides a brief comment defining the basic nature of the document. For example, if document 101 is an offer of employment, the description might indicate that the document is a letter setting forth agreed upon terms of employment.

The field names in a document defining the variable data that must be individually tailored are also accessible, e.g., name of prospective employee, address related data, job title, annual salary, etc. Additionally, a document summary having comment fields may be associated with each document. Such a summary may be utilized to inform an operator when to use a document while providing information relating to the need to modify the document under special circumstances.

Turning back to FIG. 1, also stored on hard disk 20 is the system software (which is described below in conjunction which associated flowcharts) which controls microcomputer 10 to operate in accordance with the present invention. This system software is transferred to main memory from the hard disk 20 during system operation as will be appreciated by those skilled in the art. Other files which are stored on hard disk 20 are described below in conjunction with the description of the flowcharts.

Resident in main memory 18 is a conventional command interpreter and loading routine. This routine permits an operator to identify a file of system software on a hard disk 20, retrieve the file, transfer it to main memory 18 and execute the associated program.

In the detailed description of the flowcharts which follows, reference is made to a wide variety of menus and display screens which are presented to a user. The present invention utilizes commercially available menu and display screen generating application tools which are not described in detail herein to place a window on the screen and insert predetermined text in a predetermined portion of the window. For example, the commercially available product known as Vitamin C is an exemplary development tool which may be utilized to generate such screens.

Prior to discussing the details of the software that controls microcomputer 10, some of the basic features of the present system will be first described. The present system permits multiple selected documents to be prepared at the same time in response to a single operator entry of variable data common to each document.

The present system permits a user to select and assemble a wide range of organized documents while allowing an individual document to be composed using any combination of frequently used paragraphs. Additionally, the system links and prints all documents in sequence while utilizing common name and address to print out addressed envelopes.

As noted above, the system drives a library of, for example, up to 1,250 documents and forms, including those which are operated generated and organizes such documents into volumes and chapters. The system includes a comprehensive report generating system that includes a dynamically updated library table of contents.

Using a conventional word processing system such as WordPerfect, the system allows a user to select, enter, and assemble documents. The documents may be reviewed by the user on display 14 during this process and may be further customized and edited using the word processing functions.

This system incorporates a document review function which is referenced in the flowcharts below as function F8 to allow a user to review any of the documents stored in the system library. Documents may be selected using the review function and printed with the variable field names inserted into the selected documents. The review feature scans the stored field information for the documents selected by the user and creates merge files using the field names instead of the variable information normally entered within a data entry window. Thus, a document may be printed using the review function with field names such as "EMPLOYEE", "CORP NAME", etc., so that a user is assisted as to the correct field data to be entered.

The present system relies on three files which are utilized together to assemble documents. These files are the WordPerfect primary document files, the assembly/print macros created by the present system (as will be explained further below) and the field information files (the secondary merge file) created from the data entered into the present system's entry window. The text or form of the document remains constant during the document assembly process and user defined merge only file information is changed each time the document is assembled and used.

Figure 3:
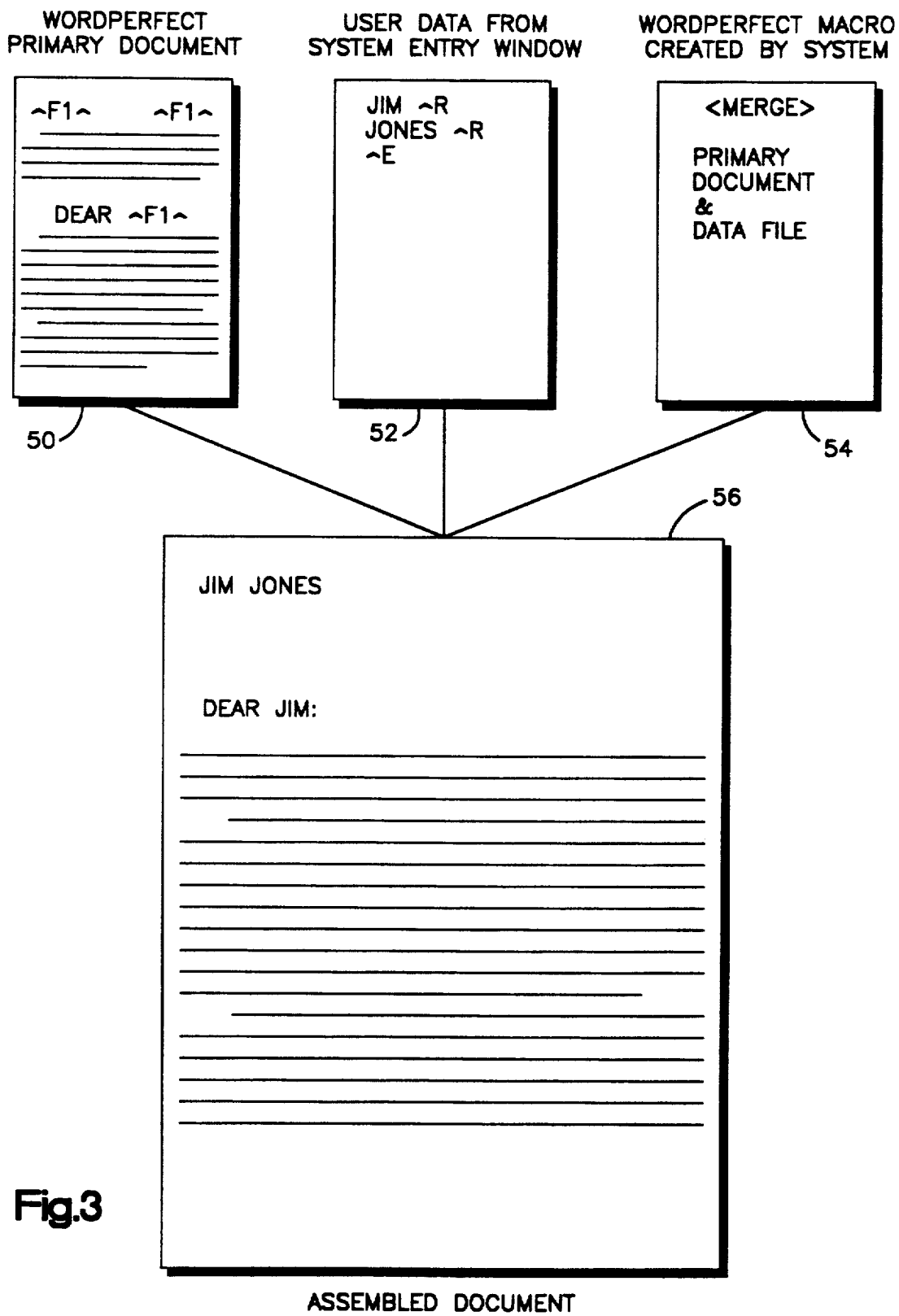
FIG. 3 is a schematic representation of the manner in documents are created.

As generally indicated in FIG. 3, data is entered into the systems entry window 52. Significantly, this data is distributed to the various documents previously selected by the user for assembly as will be explained further below.

A WordPerfect primary document 50 is shown in FIG. 3. FIG. 3 also shows the macro 54 created by the system which controls the merging of documents 50 and the data 52 to thereby result in an assembled document 56.

It is noted that a macro is relatively brief program that performs routine tasks in the system. A series of commonly used keystrokes are stored and activated during the systems assembling and printing of documents. Macros are executed either from a menu or by typing in [Alt] and a letter. For example, [Alt] O brings up the systems macro menu which will be discussed further below. The system uses macros to chain, link and print documents simply by pressing one key.

Most standard documents are assembled by merging field information created from the system's entry window with the stored WordPerfect primary documents. In addition, the system allows for the assembly of documents from a collection of building blocks, such as paragraphs or optional provisions. The building block method of document assembly provides the user the flexibility to construct a document by selecting various different blocks of information stored as separate documents. The building blocks inserted may be of a variable file size (a separate document inserted into the document) and may include insertion of field information as well as, for example, paragraphs to assemble a single document.

This building block method provides the user with the option to specify various provisions or paragraphs at the time of data entry using the entry window. Instead of entering variable data, the user types the name of the document that contains the block or optional provision. The entire contents of that document is then inserted into the primary document. If the field is left blank, the systems resident word processing system WordPerfect ignores the option and prints the document without using any additional provisions. In order to operate in this mode, the field definition associated with the data entry window must be completed with data type "B" informing the system that the block provisions are being utilized.

Turning now to the flowcharts in FIGS. 4 through 9, these flowcharts delineate the sequence of operations that micro-computer 10 is controlled to perform during the operation of an exemplary embodiment of the present invention. Turning first to FIG. 4A, upon power up, after conventional IBM PC system initiating operations are performed (100), the system's main menu is accessed and displayed for the user (102). The main menu offers the user a choice between the following five options: 1. select documents, 2. select reference, 3. library manager, 4. printing library reports or 5. exiting system. Each of these options will be explained in detail below in the context of describing the operations which are performed upon user selection.

After the main menu is displayed at 102, the system as indicated at terminal I/O block 104, enters a wait state awaiting an operator input at keyboard 12. The system enters such a wait state after each menu is displayed (even though only this initial wait state 104 is reflecting in the flowcharts).

After the user has made a selection, a check is made to see whether the select documents option has been chosen (106). After the "select document" option or any of the other options is selected, the system clears from memory previously selected documents no longer required for current operation.

After the "select documents" option has been selected, a configuration file is read into main memory (108). This file is referred to as the set up.cfg file and is shown in FIG. 10.

Upon the user making any of the selections indicated on the main menu, the set up.cfg file read into main memory to inform the system as to certain fundamental system configuration features. Also system Global System Memory is cleared which stores document selection information. In this regard, the set up.cfg file may, be way of example only, include as shown in FIG. 10, a sub-directory indicating where in the memory system the system software program file is located. Additionally, this file includes a sub-directory identifying where the word processing program file is located as well as an indication as to the particular version of the word processing program that is currently being utilized. Additionally, the configuration file includes a sub-directory identifying where each of the volumes described above are located. Finally, the configuration file includes an indication as to whether the printer is utilizing continuous form paper or individual sheet paper.

While such system data is required when first installing the multiple integrated document assembly System of the present invention, it is also required when volumes are added to the library. If the location of any of the files described above are modified then the system must be informed of such a change.

As noted above, the system configuration file includes information relating to the word processing version which is currently being used. For example, the current system operates with a WordPerfect word processing system. However, the macro language associated with WordPerfect version 5 is different than in version 4.X. However, through the use of the system configuration file, the system automatically uses the appropriate macros based upon the word processing version data in the set up.cfg file.

With respect to the printing option, the system can be set up for manual printing. However, if no entry is made in this field of the system configuration file, the system defaults to continuous form paper.

Additionally, upon the selection of the "select documents" option other files from disk memory 20 are read in to the main memory 18. Certain of these files are utilized by a "build menu" subroutine (110) to build volume and chapter menus. In this regard, as shown in FIG. 11, a "USER.DEF" file is utilized to create a volume menu. This file includes fifteen volume related entries stored in five groups of three lines. Each group relates to one of the five volumes in the system.

As shown in FIG. 11, for each of the five volumes, the first entry is a menu selection item which, for example, identifies the volume of a "legal" volume. The second line associated with each volume identifies the menu that it calls. For example, the menu called by the volume 1 entry in the USER.DEF file is the chapter menu associated with volume 1. The third line associated with each volume is information to be displayed in the prompt window.

Five additional files USER1.DEF through USER2.DEF are loaded into main memory 18. Each of these files is constructed for example, as shown in FIG. 12 which shows the USER1.DEF file. Each of these files is directed to a respective chapter and is constructed, in a similar fashion to the previously discussed USER.DEF file described above.

The first line in each of the files as shown in FIG. 12 include a menu selection item which identifies a chapter, for example, Wills and Trusts. The second line defines a four character chapter index that uniquely defines a particular chapter. For example, under the volume, "LEGAL", and he chapter, Wills and Trusts, the four character chapter index in the second line of "USER1.DEF" file may include the four characters "WILL". The third entry in the file shown in FIG. 12 is the information to be displayed in the prompt window which is associated with that chapter.

By virtue of the files shown in FIGS. 11 and 12, the present system utilizes the above mentioned Vitamin C window and screen capabilities to allow the user to select documents and an associated description in any of the 25 chapters. The data stored in these files may be modified by the user so that different menus may be created for new or modified volumes and chapters may be created or modified. Such modifications may be made by utilizing the library manager option of the main menu which will be described further below.

The system additionally requires a series of index files to build the menus displayed to the user. For each chapter, as shown in FIG. 13 an index file records the document name followed by a document description for up to, for example, fifty documents. In this regard, the document name consists of the four character chapter index identifying the chapter name, followed by three digits identifying the document. The document description may, for example, be up to sixty characters long.

A variable file is also used in the menu building process and is shown in FIG. 14. The variable file exists for each chapter in the system. A variable file for each chapter is accessed by the four digit indicator uniquely identifying each of the twenty-five chapters in the system, followed by "VAR", e.g., "CORP.VAR".

The variable file identifies the variable field information associated with each of the documents. For every document in the system, the variable file must include the same number of variable fields as contained in the document.

As shown in FIG. 14, the initial entry in the variable file for each document is a document name (which as noted above may comprise a chapter index followed by a three digit document identifier). Following the document name, a picture format field is utilized that defines the format in which the variable field information is entered on the entry screen, e.g., by entering numerical or textual data.

After the picture format field, the variable file includes a function field which, for example, may indicate whether a check need to be made to determine whether a date specified in a given document is a valid date. If no function is associated with a given entry in the file, data reflecting that "no function is indicated" is placed in this field.

The prompt window shown in FIG. 14, may for example, be up to fifty seven (57) characters to be displayed as prompt, window prompt. The variable file also includes information to be displayed as an entry window prompt record which is associated with a field in the variable file and prompts the user as to the nature of the information which must be entered for a particular field.

The structure shown for FIELD 1 in FIG. 14 for a given document is repeated for each of the fields 2 to N in the document. The same file structure is repeated for each of the documents in the system.

Turning to FIG. 20, this figure shows a data entry screen for a document identified as COMM101 in FIG. 20 shows for each of the eleven fields in the document the data type, the number of characters which may be inserted in a given field, followed by a prompt window for each of the fields and an entry window prompt at the bottom of the screen.

Turning back to FIG. 4A, the document selection menus are constructed at block 110 by loading of the volume and chapter menu data files shown in FIGS. 11 and 12 into main memory. The user upon reviewing displayed volume and chapter menu selects a volume and a chapter. After the user has selected the chapter, the routine shown at 110, then loads the IDX file as shown in FIG. 13 into main memory for the selected chapter. FIG. 15 shows an exemplary document select menu which is generated by the system which corresponds to the index file shown in FIG. 13. The screen identifies a volume, chapter, and identifies a document by a chapter index (e.g., COMM) and a three digit number. A document description is also included. Documents may be selected by moving the cursor to a document in FIG. 15 and hitting the enter key.

Figure 4A:
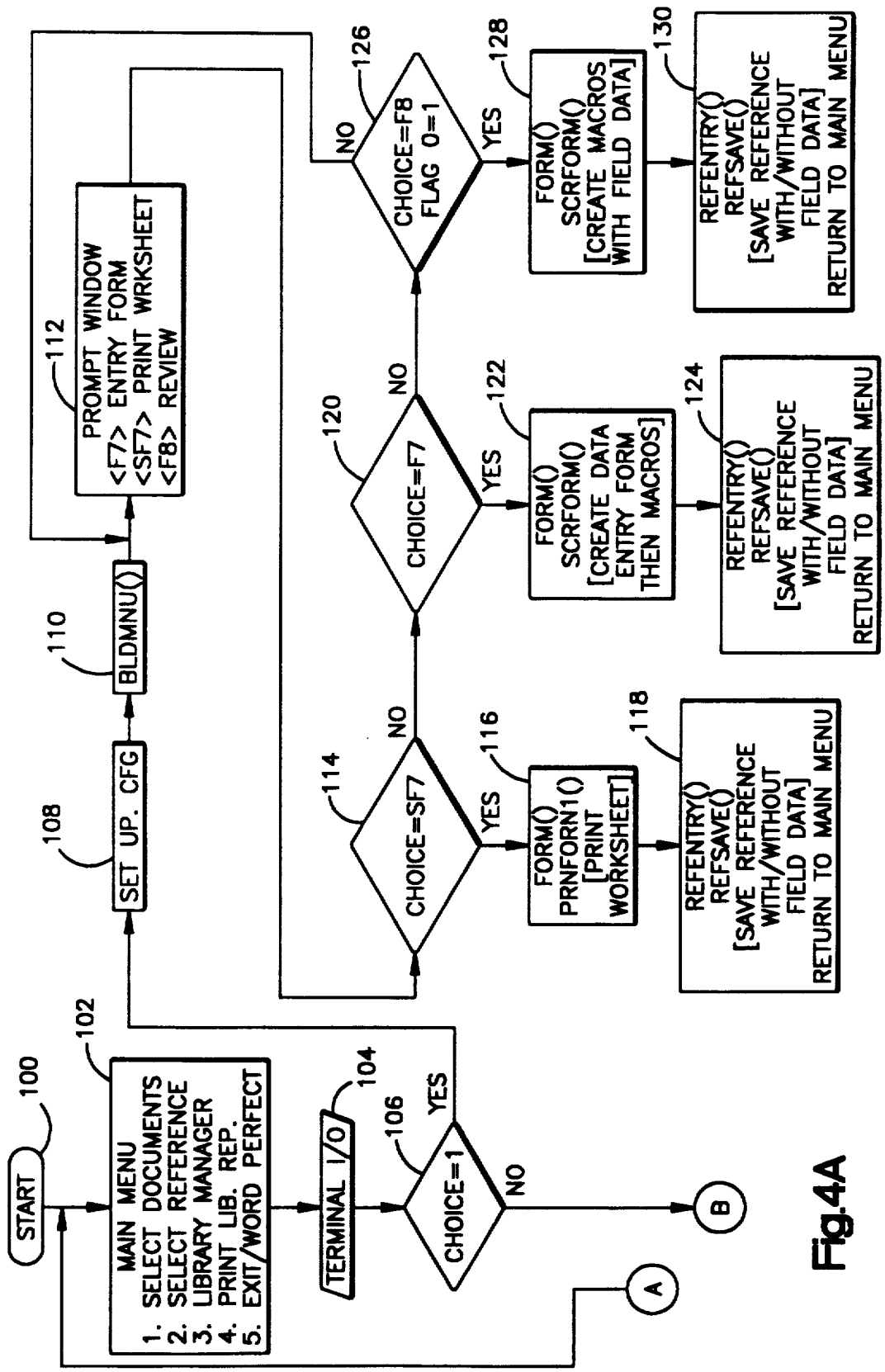
FIGS. 4A, 4B, 5A, 5B, 6A and 6B are a flowchart which delineates the sequence of operations performed by the system's computer to perform multiple document assembly operations in accordance with the present invention.
Figure 4B:
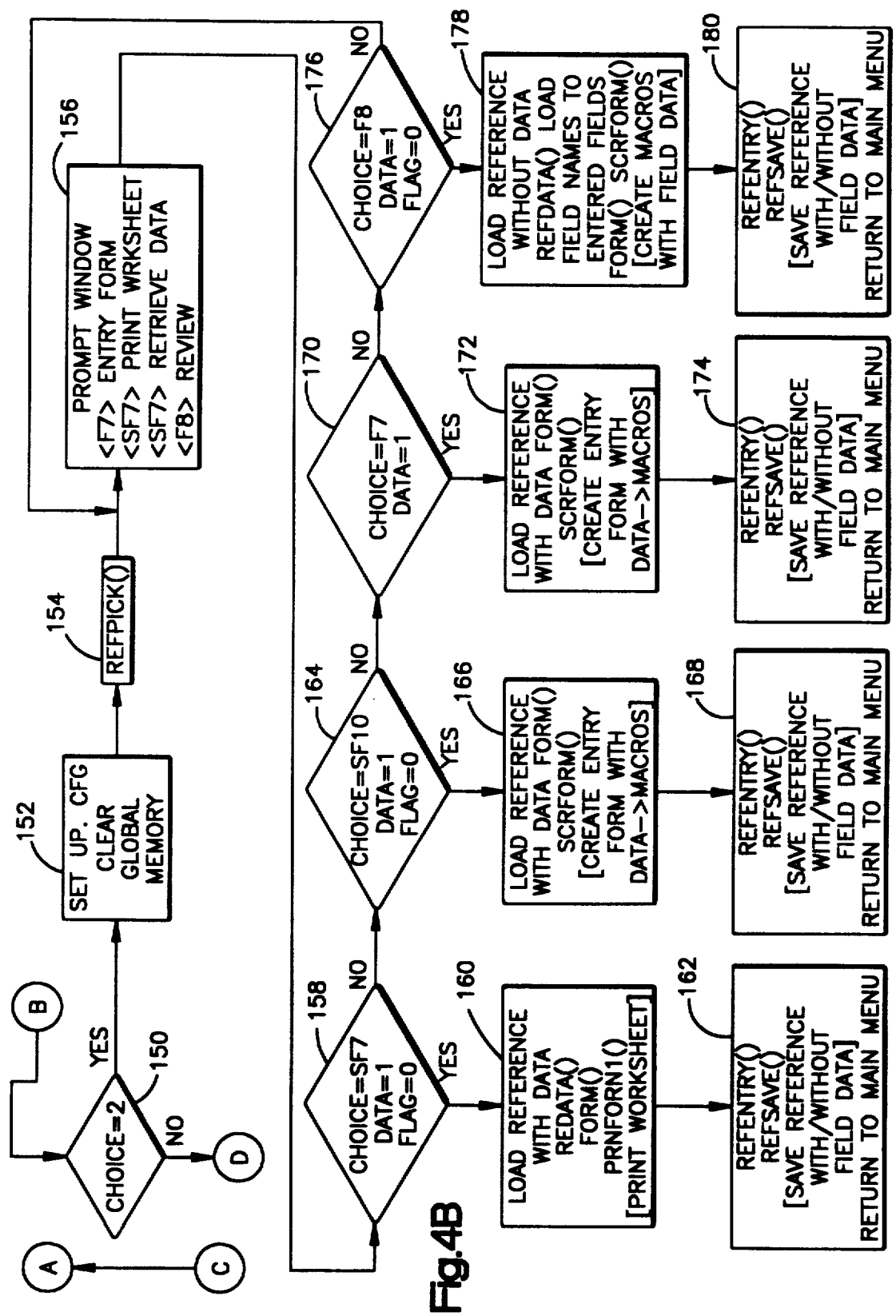

The build menu routine 110 in FIG. 4A thus utilizes the volume, chapter, and index files shown in FIGS. 11 through 13 to allow a user to select a series of documents. The user is able to mark documents that have been selected, as well as display a representation of selected documents to review the selections.

Once a document is selected, the document name is loaded into an array in memory which identifies those documents which have been selected. Keyboard 12 shown in FIG. 1 preferably includes a function key which initiates the accessing of this array so that the user can initiate a display of the document names selected. After the documents have been selected, a further function key serves to load a conventional word processing routine (e.g., WordPerfect) into main memory along with a summary file for the documents selected. By virtue of the above described processing in block 110, the system, identifies each of the documents selected to which additional variable field information needs to be merged.

As indicated at block 112, after the menus have been constructed, a prompt window is displayed to allow the user to select entry form, worksheet, or document review option (which will be described in detail below). The prompt window appears at the bottom of the screen at which point the user is ready to create an entry window via function key F7.

A print out of the entry form may be obtained by selecting the "print worksheet" option which as indicated at block 112, is accessed by hitting the shift and the F7 (SF7) function key. By receiving a copy of the worksheet, a user can fill it out off-line and have the entry form keyed in by another party.

By selecting the review function fields names are automatically merged with the document instead of the variable information. The review function is actuated by hitting function key F8 and is designed to printout field associated prompts so that a user can clearly identify the precise data that is required to be in a particular field.

Exemplary first and second entry screens are shown in FIGS. 16 and 17. Information is entered into each field shown in the precise format that it will appear in the assembled documents. The entered alpha-numeric characters may be edited in accordance with the field processing system loaded into main memory at block 110. After information has been entered into a field, use of the enter key or the down arrow key will move the cursor to the next field. At the bottom of the screen shown in FIGS. 16 and 17 are prompt windows which provide the user with additional information as to what needs to be inserted in the field currently being operated on.

After the prompt window is displayed at block 112, subsequent processing is dependent upon which option is selected by the user. However, as shown, in processing blocks 116, 122, and 128, regardless of which option is selected, "form" sub-routine is executed.

The "form" subroutine extracts variable information from the chapter variable file for documents which have been selected by a user. The routine keeps track of the number of documents that have been selected and organizes the number of documents selected by chapter. After sorting the documents by chapter, variable information is read in from the files and stored in predetermined global memory locations. Thereafter, comparisons are made to determine whether a field is a unique field or a duplicate field. In this manner, variable field information from different documents is analyzed to find the unique fields which are stored in memory to create an entry form which relieves the user from having to enter duplicate information common to a number of the documents selected. Such processing also permits a user who does not require an entry form to be displayed to have a worksheet printed out or to perform a review function as described above. Thus, the form routine by keeping track of those documents which have a variable fields in common with other documents, insures that the variable is supplied to all the necessary documents even though the user entered the variable only once.

FIGS. 7A, 7B, 8A, and 8B are a detailed flowchart of the "form" subroutine. As noted above, this subroutine is called upon the operator choosing any of the options displayed in the prompt window at block 112 in FIG. 4A.

Upon entry into the subroutine (500), a check is made to determine whether the number of documents selected by the user is greater than 20 documents. If so, then the maximum number of documents which may be selected by the user has been exceeded and the routine returns to the calling subroutine to have the user make another selection (501).

If the number of documents is not greater than 20, then a check is made to determine whether the current document being processed is greater than the number of documents selected (504). If so, the loop is exited and a check is made at block 520 to determine whether the chapter index is greater than 25, the maximum number of chapters permissible.

If the document being processed in the loop is not greater than the number of selected documents, then the selected documents are sorted by chapter. At block 506, in order to find out the selected document's chapter, the first four letters of the current document name are copied into a character array (referred to as TESTS in block 506). As indicated at block 508, a check is then made to determine whether the chapter index is greater than 25 to determine whether all of the chapters have been tested.

If the chapter index is greater than 25, then the loop is exited to block 520. If the chapter index is less than 25, then a comparison is made at block 510 to compare the current document name with current chapter index code to determine if a given document is within a particular chapter. If the current document name is not equal to the current chapter index code as determined at block 512, then the chapter index is incremented to go to the next chapter and the next chapter index code is selected (514). The routine thereafter branches back to block 508 to repeat the steps indicated at blocks 508, 510, and 512.

Upon finding a match at block 512, the current document name is copied to a character array which indexed by chapter (i.e, 1–25) and by the number of documents selected in the current chapter (1–20) as indicated at block 516. After the copying operation at block 516, the counters associated with the current loop are appropriately incremented. In this regard, the document index and the number of documents selected per chapter are incremented (518). In this fashion, all the documents selected by the user are sorted by chapter while keeping track of the number of documents selected in each chapter.

As noted with respect to FIG. 14, there is one variable information file per chapter. By organizing documents by chapter and keeping track of the number of documents selected per chapter, the variable file fields may be efficiently utilized since the variable file stores all of the field information required to build an entry window on a chapter basis.

The loop beginning at block 520 is an important processing loop in the present invention. Based on the documents selected a "unique field" array is created. The unique field array stores in a predetermined location in memory all the unique variable fields in the documents selected. At the same time, all fields which are duplicated are kept track of to enable the system to identify those documents which have common duplicated fields. In this fashion, a single user data entry will result in corresponding data being inserted into each of the documents requiring such duplicated variable information.

At block 520, at the beginning of this loop, a check is made to determine whether the chapter index is greater than 25, which is the maximum number of permissible chapters in an exemplary embodiment of the present system. If so, a return is made to the prompt window at block 112 (521). If the 25th chapter has not yet been reached, a check is made to determine if the number of documents selected in the current chapter being operated on is greater than 0 (522). In this manner, the routine determines if there are any documents to be processed in a given chapter. If not, then the chapter index is incremented and the next chapter index code is selected (524) and the routine branches back to block 520.

If the number of selected documents in the chapter is greater than 0, then a field information file is opened for the current chapter (526). At 528, a check is made to determine whether the counter keeping track of the documents processed per chapter is greater than the number of documents actually selected in the current chapter by the user.(528) If so, then the chapter index is incremented and the next chapter index code is selected (524) and the routine branches back to block 520. If not, then a unique symbol is placed in front of the current document name in the current chapter being processed (530). In this fashion, the system can uniquely identify that an item is a document name.

Thereafter, a search is made for a document match in the field information file shown. If a document match is not found as determined at block (534), then the user is informed that the document is not found in the field information file and a return is made to the prompt window at block 112 in FIG. 4. The failure to find a document match indicates that the variable information shown in FIG. 14 has not been stored for the document being processed. This indicates that the document has not been entered into the system library and its associated files and therefore cannot be found.

Figure 8A:
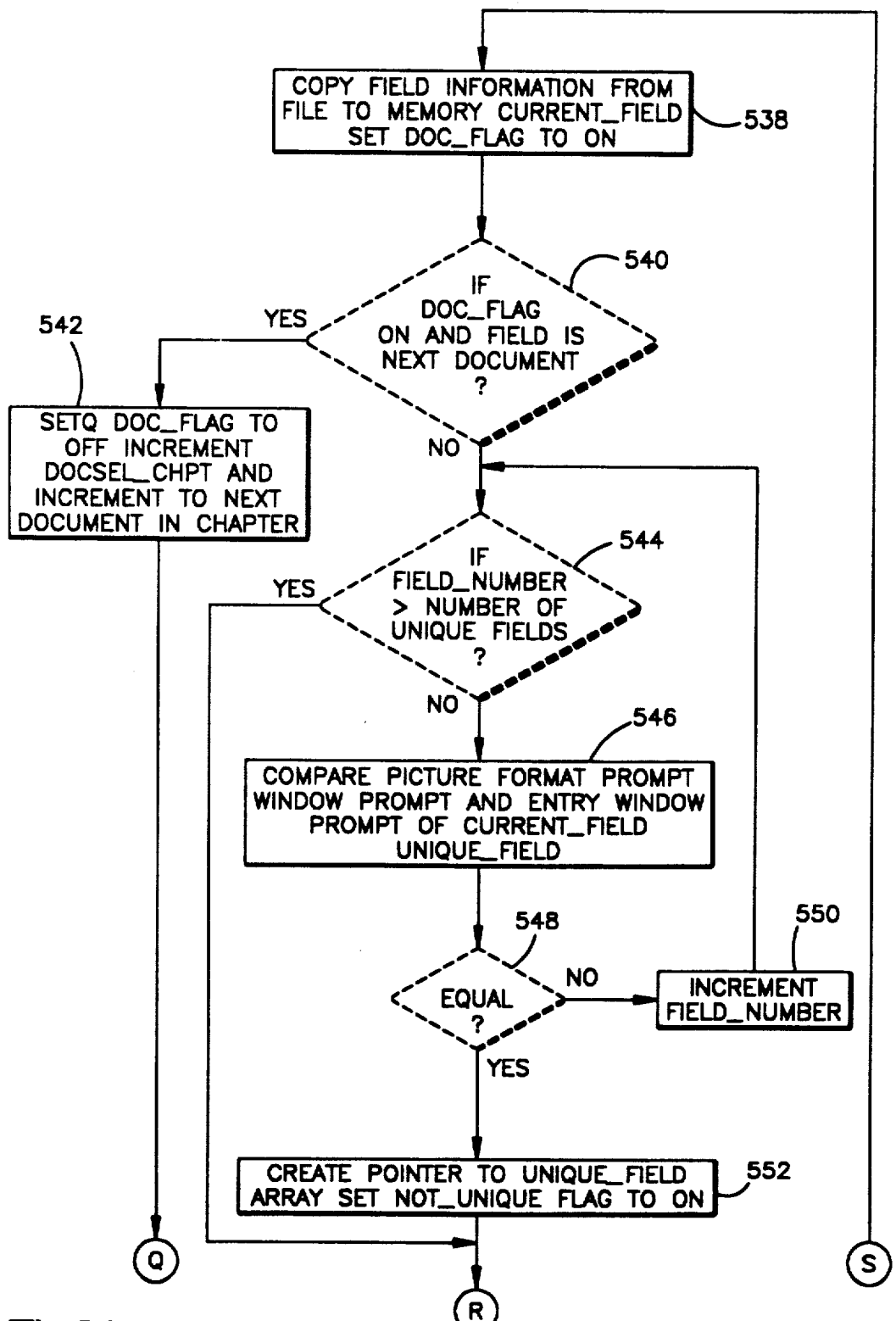
Figure 8B:
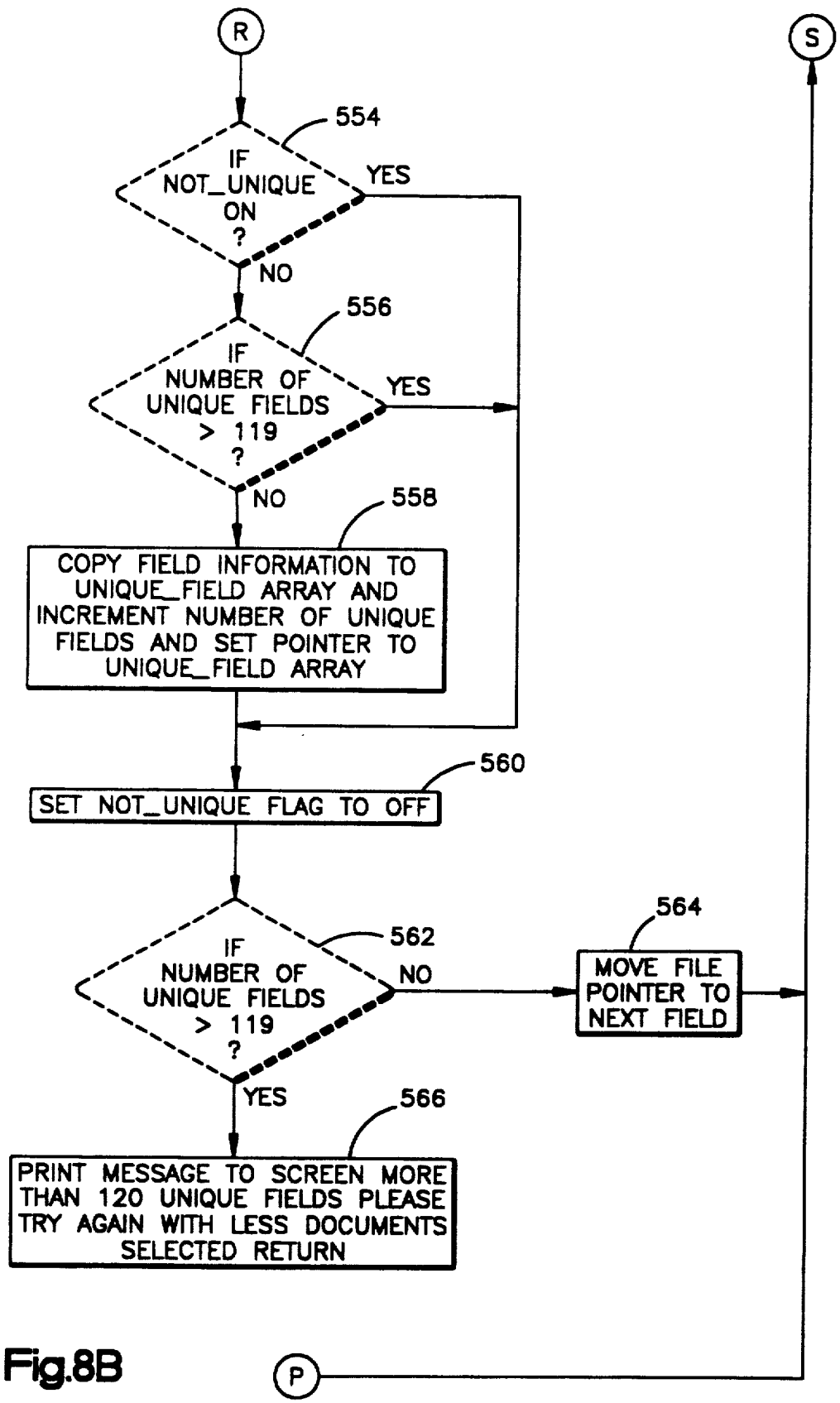
Figure 9B:
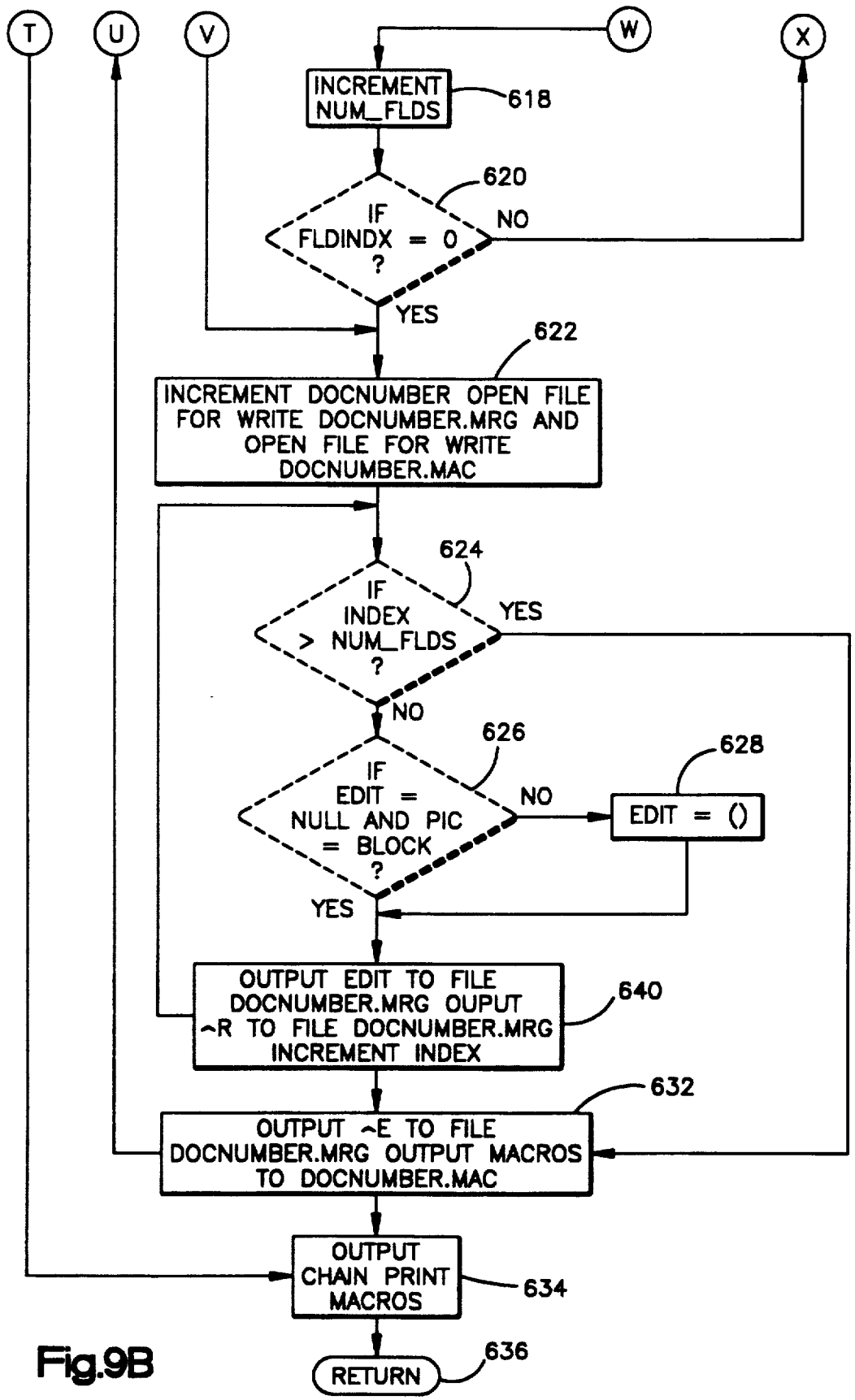

If a document match is found, then as shown in FIG. 8A the field information pertaining to the document is copied from the variable file (as shown in FIG. 14) to a "current field" area in memory. Additionally, a bit in memory which is utilized as a document flag is set, for example, to a binary "1" state representing a flag "on" state (538). In this fashion, the field information data relating to a particular document such as the picture format, functions, status window prompt and entry window prompt described above are loaded into memory for subsequent processing. This data is utilized to create the entry forms that the user uses as described above with respect to block 112 in FIG. 4.

Processing in the next loop is performed on each of the fields in a document. The loop is exited once all of the fields in a given document are processed. As indicated at block 540, a check is made to determine whether the document flag is on and to determine whether the current field being processed relates to the next document. If so, then the document flag is turned off, the counter keeping track of the number of selected documents in the chapter is incremented and the next document is selected for processing (542). Thereafter, the loop is re-entered at block 528.

If the field being processed is not in the next document, and if the document flag is on, as determined by block 540, then a check is made to determine whether the current field is already present in the unique field array. The current field number is compared with the number of unique fields in the unique field array to determine whether the current field number is greater than the number of unique fields (544). If so, the routine branches to clock 554. If not, a comparison is made of the current field data that is stored (as shown in FIG. 14) with the data in the unique field array. In this regard, the picture format, the prompt window and entry window prompts of the current field are compared to corresponding data in the unique field array (546).

If these items are equal, as determined by the check at block 548, then the current field being processed is already present in the unique field array and a pointer is created which links the original document to the portion of the unique field array where appropriate field information is stored. Additionally, a "non-unique" flag is turned on identifying the field as not being unique (552). The "not unique" flag being on indicates that the field does not need to be saved in the unique field array, since it is already present.

Turning back to the check made at block 548, if these items are not equal, then the field number is incremented (550) and the routine branches to block 544 until the field number is greater than the number of unique fields. Under such conditions, the routine by-passes blocks 544 through 552.

Thereafter, a check is made at block 554 to determine whether the "not unique" flag is on. If so, then blocks 556 and 558 are skipped and no information is copied into the unique field array. However, if the "not unique" flag is off, then a check is made to determine whether the number of unique fields is greater than the maximum permissible limit (e.g., 120) (556). If so, no further field information can be entered into the unique field array and the "not unique" flag is turned off (560).

If the number of unique fields is not greater than 119, then the field information which has been determined to be unique is copied into the unique field array and the number of unique fields is incremented and a pointer is set linking the selected document to the portion of the unique field array where appropriate field information is stored (558). Thereafter, a check is made to determine whether the number of unique fields is greater than the maximum permissible limit (562). If not, then the file pointer is moved to the next field (564) and the routine branches to block 538 so that the next field information may be copied from the variable file to the current field file in memory. If the check at block 562 reveals that the number of unique fields is greater than the maximum permissible limit, then a message is printed to the user identifying the problem with a request for a repeated document selection with less documents selected and the routine branches back to the prompt window 112.

In summary, the "form" subroutine places in memory all the variable fields which are in the selected documents. Whenever one or more documents is to be merged with variable field information, it is necessary for the "form" subroutine to be executed. The execution of the "form" routine creates a file in memory which links variable field data with the appropriate selected documents. The execution of the "form" subroutine sets the stage for the user to enter user specific data.

Turning back to FIG. 4A, if the user as determined by blocks 120 or 126, either selects the display of an entry form or the "review" option, after the "form" subroutine is executed, the "scrform" subroutine is executed immediately thereafter (122 and 128).

The "scrform" subroutine takes the information and files created by the "form" subroutine and either creates an entry form (as commanded by the selection of F7) or puts the field prompts in the merge file (if the review function is selected). The "scrform" routine creates both the merge files and the associated macro files which are necessary to assemble the documents.

Upon entry of the "scrform" subroutine (600) which is shown in FIGS. (9a and 9B, a check is made to determine if the review flag is on (602). The review flag is set if the user selects the review function.

If the review function is selected, an entry form need not be created and the entry form generation steps are bypassed. Instead, the field prompts are loaded in accordance with the review function. Thus, if the review flag is on, a check is made (604) to determine if the number of unique fields is greater than the number of fields. If not, then the current entry form prompts are copied to the unique field array and the number of fields counter is incremented (606). After the number of fields counter is incremented (606), the routine branches back to block 604 and the loop is repeated until the number of unique fields is greater than the number the current field being processed. Under such conditions, the routine branches to block 610 skipping the creation of the entry form step at block 608. As noted above, an entry form is not created if the review function has been selected.

The copying of the current entry form prompt at block 606 serves to load a prompt or descriptor associated with the field currently being processed. For example, if a will is being prepared, in the field dedicated to the testator's name, instead of data identifying the testator being inserted into this field, the prompt "insert testator's name" is inserted. This prompt makes clear to the user the nature of the information which must later be inserted, thereby reducing the number of errors associated with incorrect entry of information.

If the review function was not selected (602) and entry form is created (604). After the entry form is created from the field information stored as a result of the processing in the "form" subroutine (or after it has been determined that the number of unique fields is greater than the number of fields (604)), a check is made at block 610 to see if the chapter index is greater than the maximum permissible number of chapters. If so, then the routine branches to block 634, which will be described below. If not, a check is made to determine whether the count defining the number of the document currently being processed is greater than the number of documents selected in the chapter currently being processed (612). If so, then the chapter index is incremented (614) to move to the next chapter and the routine branches back to block 610.

If the current document number is not greater than the number of documents selected in the current chapter, then a check is made at block 616 to determine whether the number of fields in the document has been reached which is greater than the maximum permissible number of fields per document to thereby finish the loop counting the number of fields per document.

If the number of fields is not greater than 50, then the number of fields is incremented (618). Thereafter, a check is made to determine whether the value of a predetermined field index is equal to 0 (620). This field index is an index in the unique field array whose value identifies the field in another document selected that is common to the current field. Additionally, if the field index is equal to zero, for example, for field number 10, that indicates that there is not a field number 10 in the document.

Thus, the check at 620 results in a determination as to how many fields are in the document. If the field index is not equal to 0, thereby indicating that there may still be remaining fields in the document, the routine branches to block 616.

If the field index is equal to 0, then the document number counter is incremented and files are opened for writing into memory the secondary merge file that includes the data entered by the user on the entry form. Additionally, as indicated at block 622, a file is written containing the macros controlling the printing and merging of files required to assemble individual documents.

These macros identify the primary and secondary files to be merged, as well as the instructions for merging. Such macro instructions enable a user to initiate a merge operation by hitting, for example, a single keystroke, which causes the accessing of the macros to initiate such operations.

These files are identified by document number 1 merge file through document number 20 merge file and document number 1 macro file through document number 20 macro file (since only a maximum of 20 documents may be selected by the user at one time). A file is also maintained to equate a document number (1 through 20) with the seven digit name of the document described above so that the user can verify that the documents being merged are the proper documents.

After the processing at 622, in which the document merge and document macro files are opened, a check is made to determine whether a index which is stepped from 1 through the maximum permissible number of fields is greater than the actual number of fields in the documents (which had been determined previously in the loop defined by block 616, 618, 620) (624). If this local index is greater than the number of fields, then a check is made to determine if both a variable "edit" is equal to "null" and the variable "pick" is equal to "block" (626). If the variable "edit" equals "null" the operator failed to request any editing functions. If the variable "pic" is equal to "block", then the operator selected a block macro in which paragraphs or various provisions may be specified for insertion into the document at the time of data entry. If both "edit" is equal to "null" and "pic" is equal to "block", then the output of the edit file operation is initiated at block 630. Otherwise, "[ ]" is inserted into the unique field array (edit).

At block 630, the information typed in by the operator is outputted to the merge file. By outputting "edit" to the merge file in block 630, either the information entered by the user or the prompt fields (if the review function has been selected) are placed in the merge file. Also, in order to satisfy the requirements of the resident word processing system (WordPerfect), at the end of each field a special character (i.e., (shift 6) R which is generated by shift —6) is output the merge file to denote the end of a field. Additionally, the index referred to above at block 624 is incremented and the routine branches back to block 624 to repeat the check as to whether the index is greater than the number of fields as described above.

If the check at block 624 indicates that the index is greater than the number of fields then the routine branches to block 632. At block 632, a special control character is output (i.e., (shift 6) E which is generated by shift —6) to a merge file to indicate that the end of the merge file has been reached. At this point, the macros associated with the merge file are output to a macro file for the current document.

After block 632, the routine begins processing the next document at block 612 described above. This routine is ultimately exited when the decision block 612 reveals that the document number is greater than the number of documents selected in the current chapter at which point the chapter index is incremented (614) and a further check is made as to whether the chapter index is greater than 25 (610). If the chapter index is greater than 25, the routine is exited after outputting chain print macros (634) which serve to control the sequential printing of each of the documents selected by an operator in response to an operator keystroke requesting the printing of documents. After outputting the chain print macros, the sub routine returns control to the calling routine.

Turning back to FIG. 4A, if the operator selected the print worksheet option, as indicated in block 116, the "form" subroutine is executed. Thereafter, a routine is executed which prints the entry form worksheet utilizing the results of the processing of the "form" subroutine (e.g., the unique field array). The printing of the worksheet results in the printing of the name of the documents selected and each of the fields that must be supplied with information for the selected combination of documents.

After printing the worksheet, routines are executed at block 118, which result in the saving of the documents which have been selected so that these documents may be called by a reference name without going through a build menu routine previously described at block 110. Thus, if a user selects a predetermined set of documents, such predetermined set of documents may be accessed via the use of a reference name chosen to refer to that set of documents. These documents, as indicated at block 118 may be saved at the user's option with our without the data that has been entered into the variable fields in the documents. Thereafter, a return is made to the main menu.

It is noted that the "refentry" routine shown at block 118 initially checks to determine whether the reference entered to represent the set of selected documents currently is in existence. If so, the operator is given an opportunity to overwrite the previous reference selection. The reference refsave routine shown at block 118 then performs the saving function described above.

If the check at block 114 reveals that the print worksheet function has not been selected, a check is made at 120 to determine if a request has been made for the entry form via function key F7. If so, then as described below the form routine is executed, followed by the scrform routine to thereby result in the creation of the data entry form, as well as the macro file for the selected documents (122). Once the data entry form is created and completed by the user via keyboard entries, the reference entry and reference save routines are executed as described above at block 118, after which there is a return to the main menu (124). The save operation in block 124, if the operator so chooses, results in the saving of the documents with the entered field data.

If the check at block 120 reveals that the entry form option was not selected, then a check is made at 126 to determine whether the review function has been selected. If so, a review flag is turned on. If the review function has been selected, as described above, the form and scrform routines are executed resulting in the creation of macros tailored to implementing the review function (128). In this regard, the entry field prompts are associated with a variable document field as described above. Thereafter, the reference entry and reference save routines are executed to perform the functions described above. The execution of these routines may, if the user chooses, result in the saving of the reference entry prompts in the documents variable fields. Thereafter, the routine returns the user back to the main menu (130).

Turning back to block 126, if the check indicates that the review function has also not been selected then a holding loop is entered awaiting the operator to make one of the selections indicated in the prompt window at block 112. When the operator makes his selection, the processing as indicated in blocks 118, 124, 130 ultimately returns to display the main menu at block 102.

If the check at block 106 indicates that the "select documents" options was not selected, a check is made at decision block 150 to determine if the "select reference" option has been selected. If so, the set up and configuration file is read into memory as described in detail above with respect to block 106 (152).

The "refpick" routine is then executed as shown at block 154. This routine creates a file which enables the user to select a previously entered reference name to thereby access all of the documents chosen in a prior select documents session. In this fashion, the user is not required to manually select each of the documents previously selected.

The refpick routine creates a file of all the files that have an extension "ref" indicating that the user has requested that his selection of documents, (e.g., "Corp 101", "Corp 102", and "Corp 103") be saved along with the related data for the fields therein in accordance with the processing in blocks 118, 124, and 130 described above. This file is then used to create a menu selection set for all the reference files.

Each of these reference files lists the collection of documents selected and a designated reference file name. The reference files are displayed for the user who, upon viewing his reference file, presses enter to thereby retrieve the reference file and load it into memory. Thereafter, a prompt window 156 is generated to set the stage for processing operations very similar to those described above, with respect to the "select document" processing.

As indicated at block 156, a prompt window is generated which is similar to the window described above at block 112. In the prompt window shown at 156, however, the operator is given a choice of using the same group of documents selected in a prior session, either with or without the data which was entered during the previous session. In this regard, if the operator wants to use completely new data in the new session, the function key F7 should be selected. Alternatively, if the operator wants to retrieve the prior data selected then the operator hits the Shift key followed by striking the F10 key (SF10).

As noted above, the processing that takes place in blocks 158-180 is nearly identical to the processing previously described above and accordingly will only be briefly described hereinafter.

Turning to block 158, the routine checks to determine whether the operator chose the print worksheet option (158) (which is the same printwork sheet option discussed above). If so, a data indicator is set to 1 indicating that reference data must be loaded and a flag is set equal to zero. As indicated at block 160, data is loaded from the appropriate reference file and the form routine and a routine which results in the printing of the worksheet are executed. Thereafter, the reference entry and reference save routines are executed precisely as described above with respect to block 118 (162).

If the operator did not choose the print worksheet option, a check is made to determine whether the "retrieve data" option was selected (164). If so, the data indicator is set to 1 indicating that data must be provided and the flag field is set equal to 1 indicating that the data previously entered with respect to the selected prior session is accessed and loaded (164). Thereafter, reference file data is loaded and the form and the scrform routines described above are executed to create a data entry form with the previously selected data intact, well as the required macros. (166). Thereafter, the reference entry and reference save routines are executed as described above, at for example block 118.

If the retrieve data option, was not selected a check is made at 170 to determine whether the "new data" option has been selected. If so, the data indicator is set to zero. Thereafter, the reference file is loaded without the field data and the form and scrform routines are executed to create a data entry form (with the required macros) in which the user can enter completely new data (172). Thereafter, the reference entry and reference save routines are executed as described above, in regard to block 124 (174).

If the "new data" option was not selected, a check is made at 176 to determine whether the review option had been selected. If so, the data indicator is set to zero and the flag indicator is set to 1. Thereafter, the reference file is loaded without data and the appropriate field names are entered in accordance with the review function described above. The form and scrform routines are then executed which create the macros with field data as described above in regard to block 128 (178). Finally, the reference entry and reference save routines are executed (180).

If the check at 176 reveals that the review function had also not been selected then the system goes into a hold mode awaiting for an operator selection. Any selection by the operator at blocks 162, 168, 174, or 180 ultimately returns the operator to the main menu.

Figure 5A:
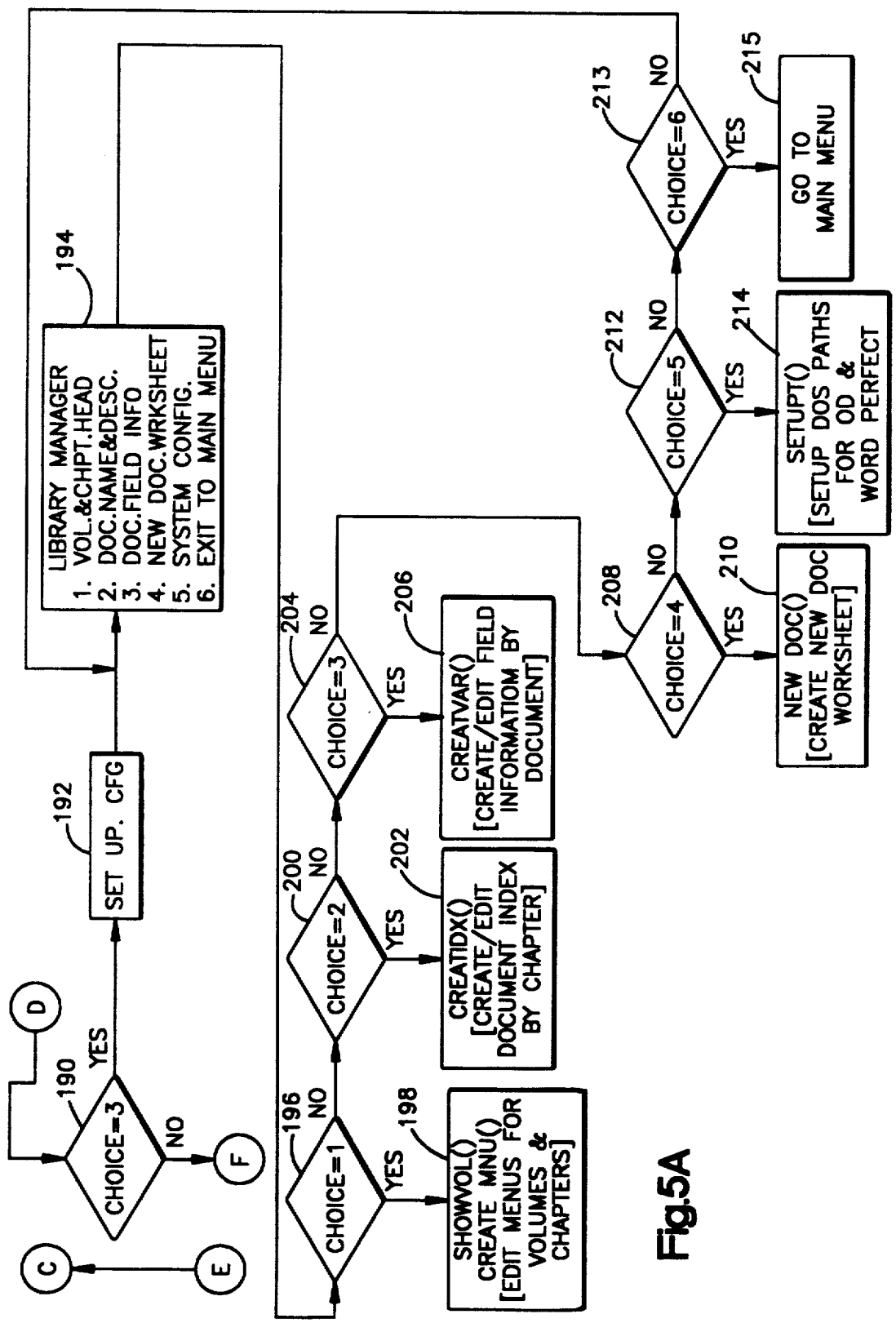
Figure 5B:
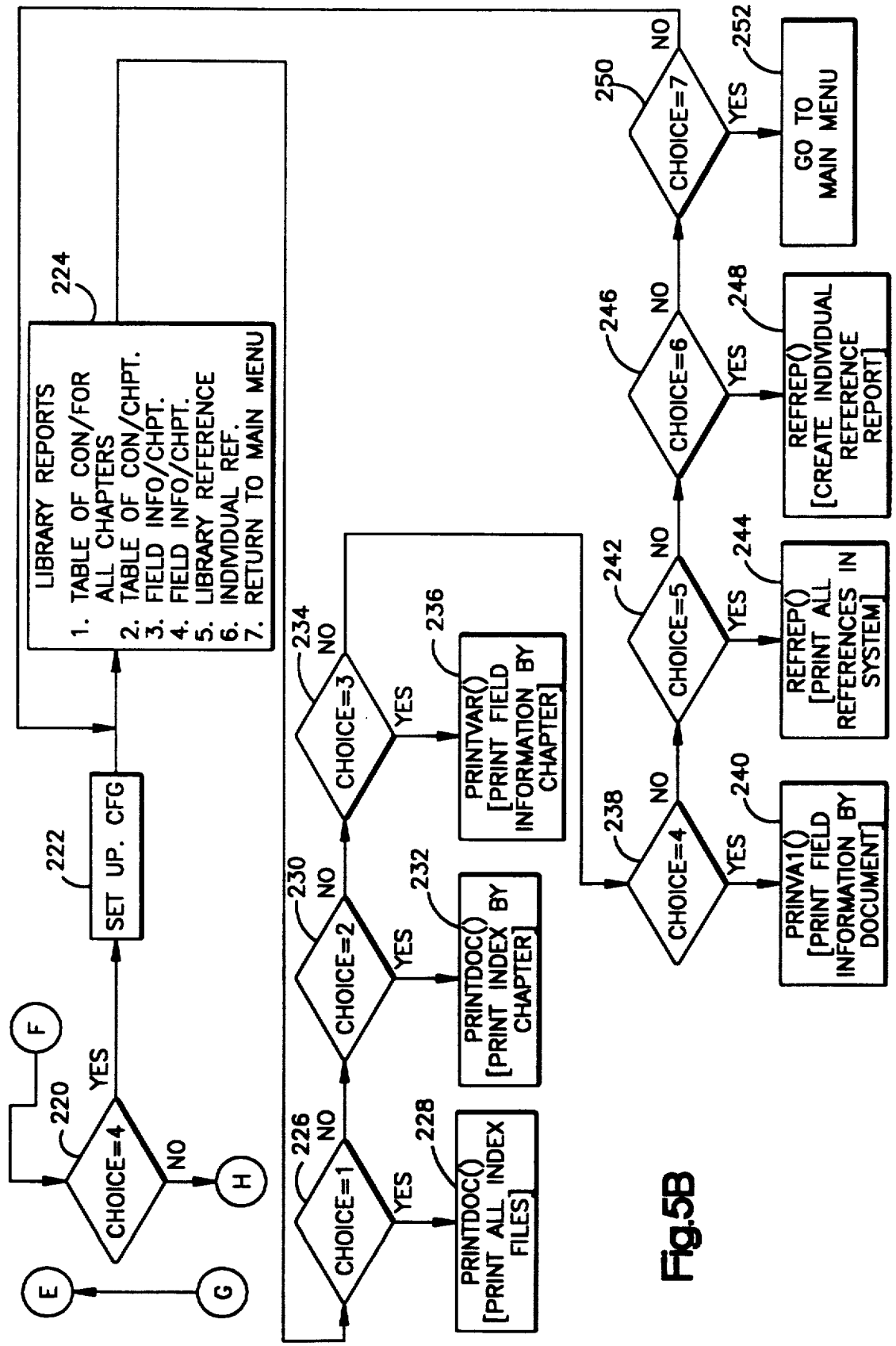
Figure 6A:
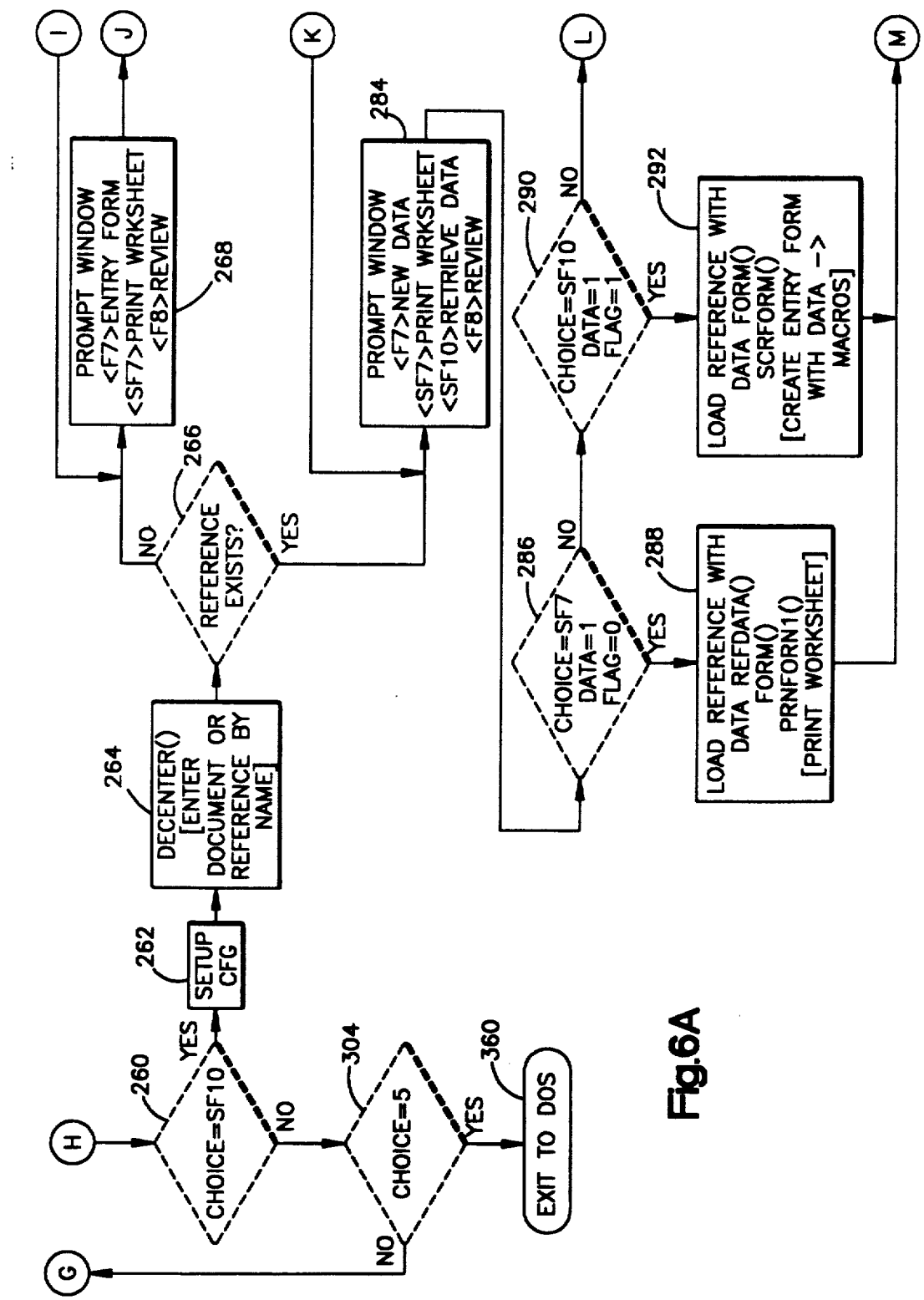
Figure 6B:
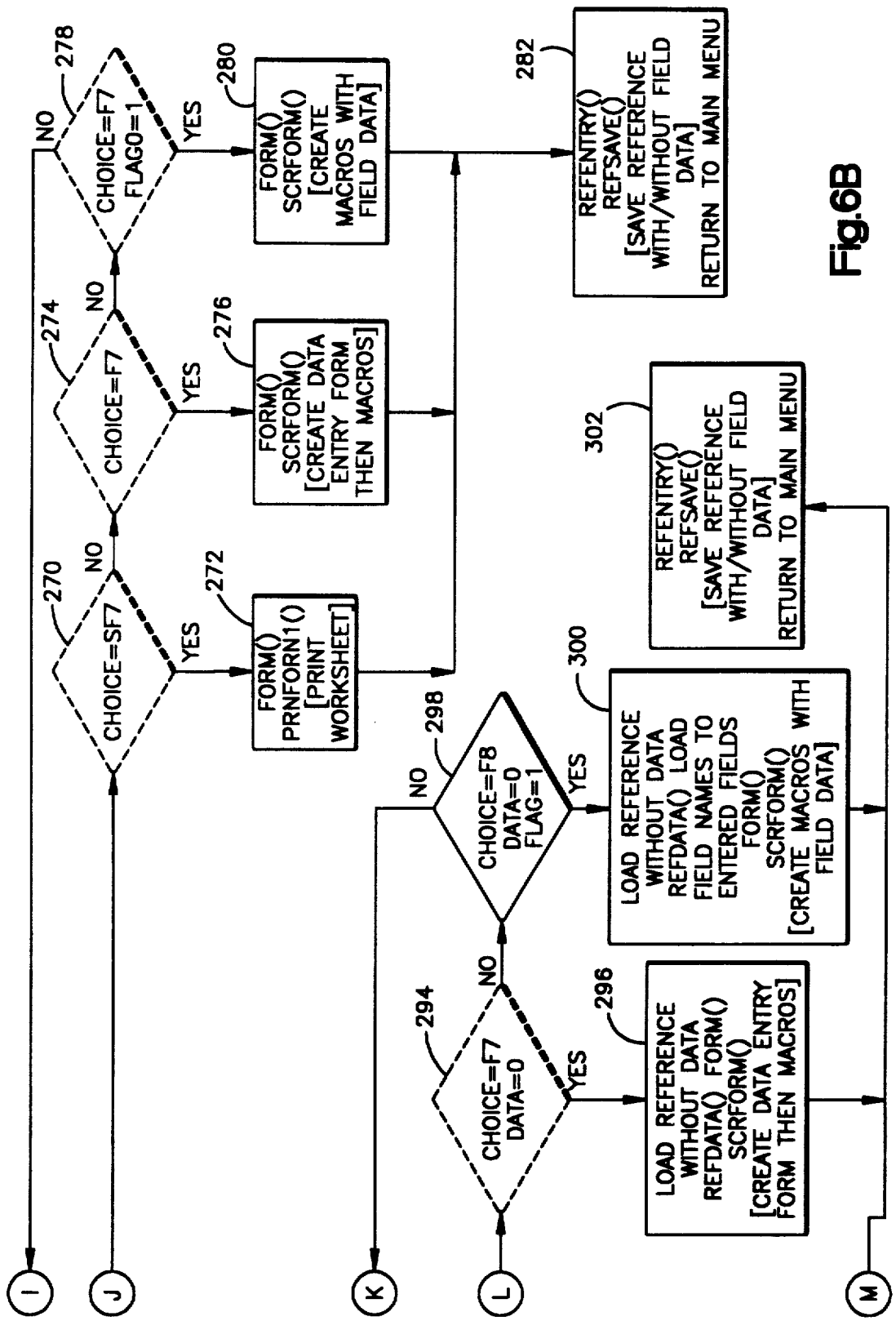
Figure 7A:
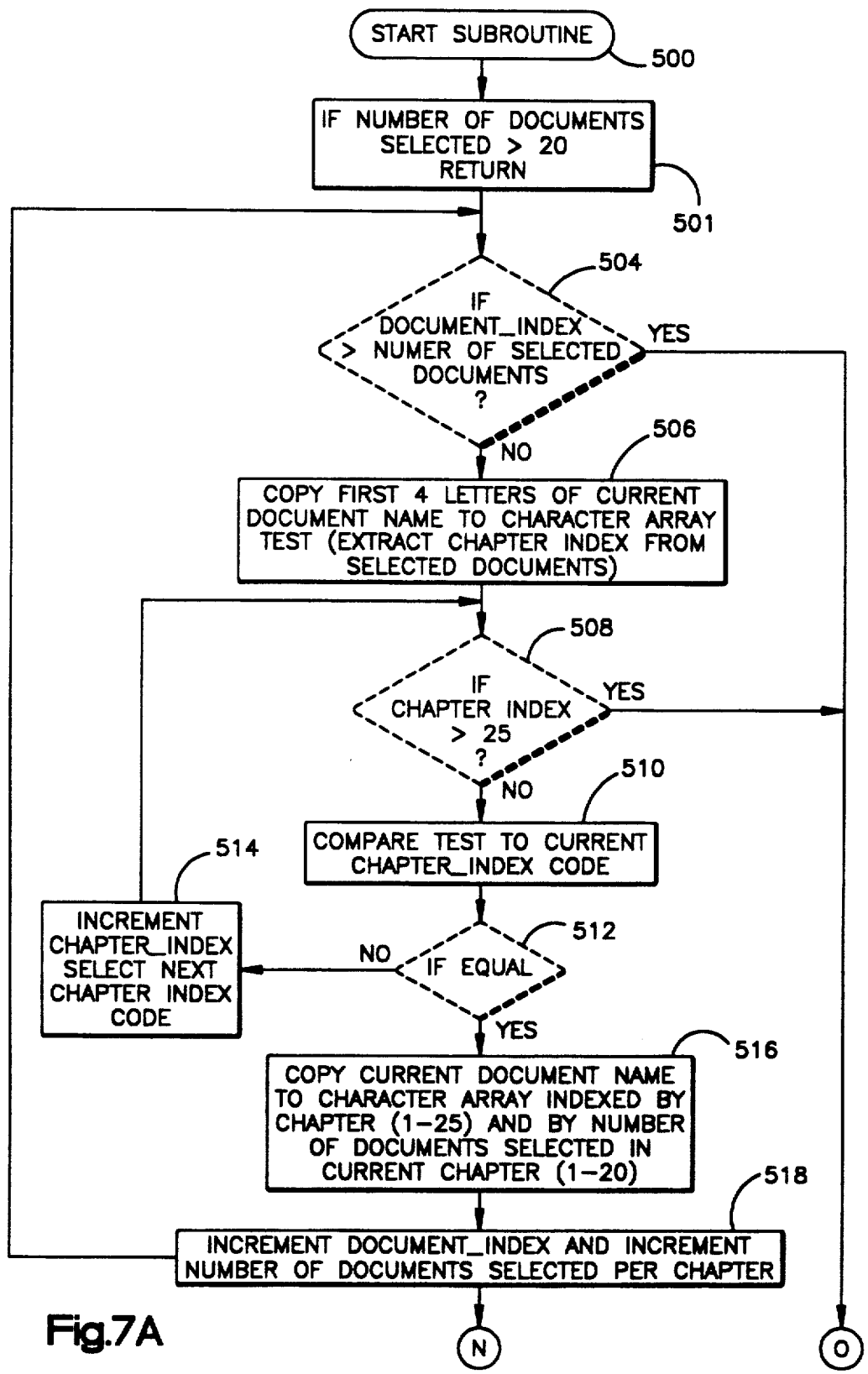
FIGS. 7A, 7B, 8A and 8B are a flowchart delineating the sequence of operations in the "form" subroutine.
Figure 7B:
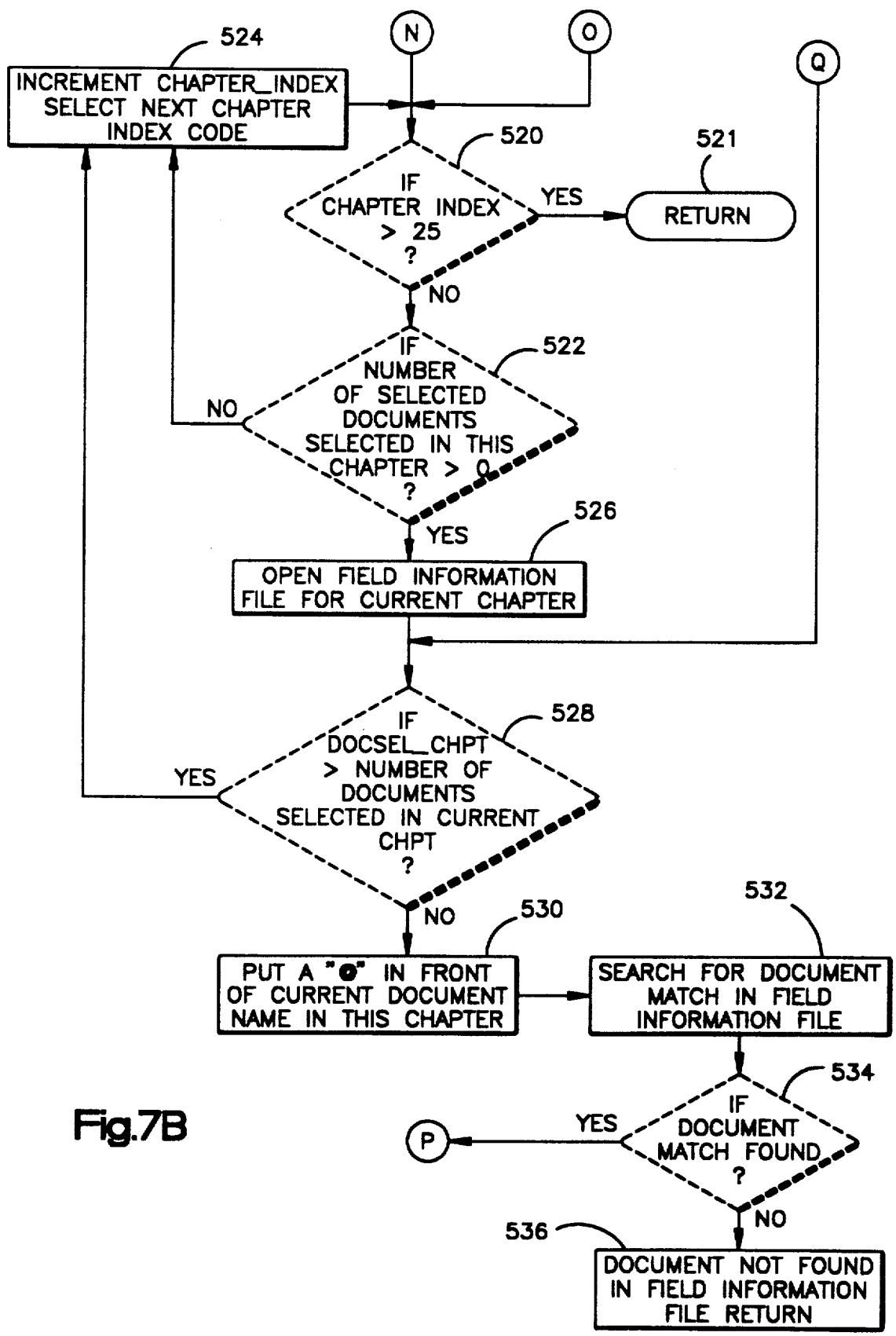

Focussing back on the main menu, it is now presumed that the operator chooses the library manager option. If so, as shown in FIG. 5A, the check at 190 triggers the reading in of the set up and configuration file at 192 as was previously described in conjunction with 108.

The library manager is a group of routines which allows a user to customize the system menus, index files (as shown in FIG. 13), and variable files (shown in FIG. 14). The library manager also allows for new documents to be added to the library.

The library manager menu shown at 194 allows a user to update or modify a system library which as described above includes, for example, a maximum of five volumes, where each volume contains up to five chapters and each chapter contains up to fifty documents. From the menu shown at 194, a user may add an entire volume, chapter or simply a document. When adding new volumes, the system configuration can be changed to modify the manner in which documents are located.

Presuming that the "Volume and Chapter Heading" option is chosen as indicated by the check at block 196, the user is able to create or modify a volume and/or chapter. Upon selecting the volume and chapter heading option, a screen such as shown in FIG. 18 is displayed. As shown in FIG. 18, a prompt is displayed asking for the number of the volume to add or modify.

FIG. 18 shows that two volumes have already been created; legal and sample forms. The "Legal" volume, for example, may contain a number of prepared legal agreements. The volume "Sample Forms" may contain cover letters and preprinted forms, for example, relating to airbills and/or envelopes. Thus, the user may use the documents in these volumes or create new ones as shown in FIG. 18. Volumes 3-5 are left open, for example, for the user to add any standard forms and documents specific to a particular organization.

The "Document Name and Description" allows a user to add or modify document names and descriptions in the library. Upon entering option number 2 as determined by block 200, a volume select menu appears for the user to key in the appropriate volume. Upon entering the name of the volume, a list of the chapters in the volumes is displayed by entering a chapter, a list of document names and descriptions within a selected chapter will appear, such as, for example, shown in FIG. 19. These document descriptions if modified, likewise correspondingly changes the index file shown in FIG. 13.

It is further noted that in addition to the document description shown in FIG. 19, the system also includes a document note pad window which is a word processor associated function which enables a user to enter information regarding special notes or descriptions beyond the mere identification of the document shown in FIG. 19. The document note pad window serves to display a text file that is under the same name as the document selected with a "sum" extension added and allows for extensive comments to be added regarding the document.

The "Document Field Information" option of the library manager allows the user to modify the field information of the type described in FIG. 14. As should be apparent from the above description, an agreement or form that is used in document assembly consists of standard form paragraphs and associated variable field locations. These fields may change depending on the parties involved. Each document must have a set field definitions which corresponds to merge codes located in the WordPerfect document file that is in a merge ready format. This field information is required as previously described in order for the entry window to be created. These fields also must correspond to the primary merge document.

By selecting an appropriate volume and chapter and entering the number of the document, these variable fields may be displayed such as shown in FIG. 20. Presuming that the field variables have already been created, a list of field definitions for the selected documents may be displayed as shown in FIG. 20. Changes to such data may be made by the user. If during data entry, a particular field is left blank the system will place brackets in the merge file to alert the user that an entry was missed if the field data type is not "B" for block. As described in detail above in conjunction with the form subroutine, commonly used fields are repeated throughout related documents. The system automatically checks for such field duplicates so that the operator will only have to enter a common field once. In order for the system to accomplish this however, it is important that the fields are created with exactly the same verbiage as the related documents.

The "New Document Worksheet" option of the library manager allows a user to receive a print out of an essentially blank version of the data entry screen shown in FIG. 20 so the user can fill in the actual field data offline. Such a worksheet is used when preparing the document for assembly into the system's word processing package WordPerfect.

If library manager option 5 is selected as determined at 212, the set up and configuration file described in conjunction with block 108 and shown in FIG. 10 is displayed. Using this option a user may edit and modify the information shown in FIG. 10. As shown in block 194 the user is also provided with the option of exiting the main menu.

Turning now to decision block 196, if the "Volume and Chapter Heading" option is selected as shown in block 198, a routine is executed (showvol) which causes the display of the "Volume" screen shown in FIG. 18. The displayed information can then be edited. The "create menu" routine, referred to in block 198 performs the same function, except that it displays the five chapters in a selected volume and permits editing of the chapters.

If the "Volume and Chapter Heading" option was not selected, a check is made to determine whether the Document Name and Description option was selected (200). If so, a routine is executed which places the chapter index file on the screen (which is shown in FIG. 13) so that it may be edited.

If the Document and Description option was not chosen, a check is made at 204 to determine whether the document field information option is selected. If so, a routine is executed (creatvar) at block 206 which responds to an operator entry of volume, chapter and specific document document information, to displays the appropriate variable file (see FIG. 14) on the screen so that the user may appropriately edit such field information.

A check is then made at 208 to determine if the New Document Worksheet option was selected. If so, a routine is executed at block 210 to printout a new document worksheet as described above.

If the user did not select the New Document worksheet option at block 208, a check is made at 212 to determine whether the system configuration option was selected. If so, a routine is executed (214) which serves to display the set up and configuration file shown in FIG. 10 to allow for the user to edit the system configuration file as described above with respect to FIG. 10.

If the user did not choose the system configuration option, a check is made at 213 to determine whether the user selected to exit back to the main menu. If so, a return is made to the main menu (215). If not, the system is set to a wait state to await an operator's option selection.

Upon return to he main menu presuming that the user selects option 4, a check at block 220 initiates the read in of a set up and configuration file described above in conjunction with block 108 in FIGS. 4A and 10. Thereafter, the "Library Reports" menu shown at 224 is displayed for the user.

If the user chooses option 1 as indicated at block 226, a routine is executed that results in a print out of a table of contents for all the chapters. This report includes a list of all the documents in the library by volume and chapter. It is formed by printing out all the index files, such as the index files shown in FIG. 13 (228).

If the table of contents option 1 is not chosen, a check is made at block 230 to determine whether a chapter table of contents option has been selected. If so, a selected chapter table of contents is printed by printing out the index files for a particular chapter (232).

If option 2 was not selected, a check is made at block 234 to determine whether the Field Information Report (option 3) was selected. If so, the user gets a print out of all the field definitions for each document within a selected chapter (236). Such a report is generated by accessing the variable file field information for a particular chapter as shown in FIG. 14. A list of fields appears on one page per document in the selected chapter. This report is useful for managing common fields within related documents in a chapter.

If option 3 is not selected then a check is made to determine whether the Field Information Report of option 4 was selected at 238. If so, the user receives a print out of all the field definitions for a selected document (240). This report is generated by accessing the variable file such as shown in FIG. 14 for a particular document.

If the operator did not select option 4, a check is made at block 242 to determine whether the Library Reference option was selected. This report which is generated at 244 lists all the reference files shown in the system library. An exemplary reference file report is shown in FIG. 21.

If option 5 was not selected, a check is made at 246 to determine if an individual reference report option has been requested. If so, a reference file select menu appears allowing the user to highlight an appropriate reference file name, and thereafter press enter which will result in the print out of an individual reference file (248).

If option 6 is not selected, then a check is made to determine whether the operator requested a return to the main menu (250). If so, the routine initiates a display of the main menu (252). If not, the system enters into a wait state awaiting the user to select an option.

If the check at block 220 reveals that choice 4 was not selected, a determination is made as to whether the direct document enter function (SF10) has been selected (260). If so, the set up and configuration file is read into memory as described above in conjunction with FIG. 4A and FIG. 10. A direct document enter function is initiated by function key F10 while hitting the shift key. This feature allows the user to perform either the "document selection" option 1 or the "select reference" option 2 directly from the main menu without selecting the document names by using options 1 and 2.

In this regard, for frequently utilized documents a user may remember the document numbers and using this feature may type in the document numbers to select documents. At block 264, the user enters a document or a reference by name.

A check is then made at 266 to determine whether the operator's entry refers to a reference name which exists. If not, then the prompt window shown in block 268 is displayed for the user. It should be noted that the prompt window in block 268 is identical to the prompt window of block 112 in FIG. 4A under option 1. This menu was accessed directly without having to go through the build menu routine described above in conjunction with block 110 (since the operator knew the document name).

The processing which takes place if the SF7 option is selected (as determined at block 270) and the subsequent processing in blocks 272 and 282 is identical to the previously described operations in blocks 114, 116, and 118 described above with respect to FIG. 4A. Similarly if choice F7 is selected as indicated at block 274, the processing at block 274 and the processing at 276 and 282 is identical to the corresponding blocks described above in FIG. 4, (120, 122, 124). Finally, the operations described associated with blocks 278, 280, and 282 are identical to that previously described with respect to FIG. 4 block 126, 128, 130 and accordingly are not described in detail herein.

Turning back to decision block 266, if the reference does exist, then the prompt window shown at block 284 is displayed for the user. This prompt window is identical to the prompt window previously described above at 156 in FIG. 4B. Similarly, the option processing shown in blocks 286-302 is identical to the processing associated with choice 2 of the main menu and described in detail in blocks 158-180 above in conjunction with FIG. 4B.

If the direct document enter option is not selected as determined by the check at block 260, then a check is made at block 304 to determine whether the user chose to exit the system. If not, the system enters a wait state for the user to select one of the main menu options 1-5 or select the direct document enter function. If the user does choose to exit the system the system is exited as indicated at block 360.

While the flowcharts described in detail above are sufficient to enable a programmer of ordinary skill to make and use the subject matter defined in the appending claims, the appendix which follows includes a source listing of the routines referenced in FIGS. 4A, 4B, 5A, and 5B. It is noted that the appendix which follows includes a listing of the form subroutine described above in FIGS. 7A, 7B, 7C, and 7D and a listing of the scrform routine described above in FIGS. 9A and 9B. The routines included in the appendix are listed in the Appendix Table of Contents which follows.

APPENDIX

```
/*******************************************************************
File:     od.c
*********************************************************************
Object modules in file:
 main(),clearmem(),loadmenu(),docenter()
*********************************************************************
Created By: Raymond T. Nygren
Date Created:  3/26/88
*********************************************************************
Edited By:
Date Edited:
*********************************************************************
Purpose:  determine color or mono  open main window and status window
then show main menu form menu  call savref()

*********************************************************************
Input:

*********************************************************************
Output:

*********************************************************************
Restrictions:
```

```
/****************************************************************
Object modules called:
refpick(),idxmnu(),utilmnu(),form(),scrform(),prnform1(),savref()
****************************************************************/
#include <vcstdio.h>
#include <process.h>
char index1[100][14];
struct vartyp {
    char pic[61];
    char func[10];
    char prompt[61];
    char field[13];
    };
struct vartyp var1[120]; /* Structure for variable menu */
struct vartyp var2; /* Structure for variable menu */
struct mnutyp {
    char title[20];
    char call[10];
    char prompt[60];
    };
struct mnutyp menu[5];   /* Structure form volume menu */
struct mnutyp menu1[25]; /* Structure for chapter menus */
int flag1,flag0,numfld,numdoc;
char chr[2],buffer[12];
char edit[120][61],file[13];
char ref[13],index[50][80],index2[100][14],docu[25][20][12];
char ch,c,fil[12],buff[100],doc[13];
int color,i,j,k,l,m,n,q,r,s,t,x,word,w0,w1,w2,w3,flag,flag3,off;
COUNT fldx,fldindx[25][20][50],sel[25];
COUNT mark[25][50],numsel,numitm,newint=1;
TEXT *globstr;
COUNT data,globint=37;
VCMENU *corp,*corp2,*corp3,*corp4;
COUNT subfunc(),intfunc(),func2(),toggle(),normal(),copy(),cut();
COUNT prnform1(),savword(),wpmnu(),vcmhf3(),clock12(),vchelp();
COUNT savref(),idxmnu(),selmnu(),selmnu(),form(),scrform(),shsel(),called()
COUNT creatidx(),mvced(),mainmnu(),prnform(),dentry(),bldmnu(),mtoggle();
COUNT rv,sw,m1,m2,new;
PFI setloop();
PFI sethelp();
PFI oldhlp();
VCMENU *crp,*crp2,*crp3,*crp4,*crp5,*crp6;
VCMENU *menunew();
VCMENU *menuxnew();
VCMENU *mainmenu,*mainmenu1,*mainmenu2,*mainmenu3,*mainmenu4,*mainmenu5;
MENUITEM *menuxitem();
COUNT vchelp();
FILE *f1,*f2,*f4,*f5;
int wdo,colors;
char od[50],wp[50],vol1[50],vol2[50],vol3[50],vol4[50],vol5[50],prnt[2],
    vers[4],str[3];
struct VCED_NODE *ednode,*vcedopen();
/****************************************************************/
main(argc)
int argc;
    {
    PFI setkeyfunc();
    COUNT vcprokey();
    int home_end();
    vcstart(CLRSCRN);
    if(argc>1)
       {
       nocolor();
       vc.blue=vc.black;
       }
    colors=vc.white+vc.bold+(vc.bg*vc.blue);
    wdokey(NULL);
```

```
   helpkey(F3);
   vcghook2=home_end;
   sethelp(vchelp);
   dflthlp("DEFAULT");
   hopen("od.hlp","od.ndx");
   sw=wxxopen(22,0,24,79,"<Prompt Window>",ACTIVE+BORDER+BD2,0,0,1,32);
   if(sw == -1)
      terror("Unable to open prompt window");
   setswdo(sw);
   vckey.done=F7;
   setkeyfunc(vcprokey);
   addprokey(F9,shsel,NULL);

w0=wxopen(0,0,21,79,"(c)1988 TurboSoft(tm)(V.1.1) MIDAS Technology(tm)",
   ACTIVE+CURSOR+BORDER+BD1,0,0);
   if(w0 == -1)
      terror("Unable to open main window");
/***************************************************************
Main menu
***************************************************************/
top:
   dflthlp("MAINMENU");
   wdo=wxopen(2,12,18,65,"OverDrive (tm)",
   ACTIVE+CENTER+BORDER+BD3,0,0);
   atsay(1,20,"Main Menu");
   atsay(5,15,"1. Select Documents");
   atsay(6,15,"2. Select Reference");
   atsay(7,15,"3. Library Manager");
   atsay(8,15,"4. Print Library Reports");
   atsay(9,15,"5. Exit/WordPerfect(tm)");

wselect(sw);
   atsay(0,0,"
");
   atsay(0,0,"Enter(1-5)   <Shift-F10>Retrieve   <F3>Help");
retry0:
   while(keyrdy())
     getone();
     switch(getone())
     {
        case '1':
             wclose(wdo);
             empty(ref,13);
             atsay(0,0,"
");
             clearmem();
             break;
        case '2':
             wclose(wdo);
             atsay(0,0,"
");
             clearmem();
             refpick();
             goto top;
             break;
        case '3':
             wclose(wdo);
             atsay(0,0,"
");
             clearmem();
             idxmnu();
             goto top;
        case '4':
             wclose(wdo);
             atsay(0,0,"
");
             clearmem();
             utilmnu();
```

```
                    goto top;
                    break;
            case SF10:
                    wclose(wdo);
                    atsay(0,0,"
");
                    clearmem();
                    docenter();
                    goto top;
                    break;
            case '5':
                    wclose(wdo);
                    wclose(w0);
                    wclose(sw);
                    vcend(CLOSE);
                    exit(0);
            case ESC:
                    wclose(wdo);
                    wclose(w0);
                    wclose(sw);
                    vcend(CLOSE);
                    exit(0);
            default:
                    bell();
                    goto retry0;
        }
    dflthlp("DEFAULT");
/********************************************************************
 Load menu files
 ********************************************************************/
    loadmenu();
    wselect(sw);
    atsay(0,59,"<<>[Enter]Select");
    vcmenu(mainmenu);
    atsay(0,59,"                    ");
    atsay(0,0,"
");
/********************************************************************
 Form creation menu
 ********************************************************************/
seldoc:
    if(numsel == 0)
        goto top;
    dflthlp("SELOPTION");
    wselect(sw);
    atsay(0,0,"<F7>Enter/Merge <Shift-F7>Print Worksheet <F8>Review <F3>Help
<ESC>Quit");
retry1:
    flag0=0;
    while(keyrdy())
        getone();
    switch(getone())
    {
            case SF7 :
                    atsay(0,0,"
");
                    wclose(m2);
                    wselect(w0);
                    loadmenu();
                    form();
                    prnform1();
                    goto seldoc;
                    break;
            case F7 :
                    wclose(m2);
                    atsay(0,0,"
");
                    wclose(m2);
```

```
                    wselect(w0);
                    loadmenu();
                    form();
                    scrform();
                    break;
            case F8 :
                    wclose(m2);
                    atsay(0,0,"
");
                    wclose(m2);
                    wselect(w0);
                    loadmenu();
                    form();
                    flag0=1;
                    scrform();
                    break;
            case ESC:
                    atsay(0,0,"
");
                    goto top;
            default:
                    bell();
                    goto retry1;
        }
    if(numsel != 0)
        savref();
    goto top;
}
/***************************************************************/
/* End main */
/***************************************************************/

/****************************************************************
File:   od.c
****************************************************************
Object modules in file:
  main(),clearmem(),loadmenu(),docenter()
****************************************************************
Created By: Raymond T. Nygren
Date Created: 3/26/88
****************************************************************
Edited By:
Date Edited:
****************************************************************
Purpose:   Allow user to enter Reference or 7 document names to merge

****************************************************************
Input:

****************************************************************
Output:

****************************************************************
Restrictions:

****************************************************************
Object modules called:
```

```
**********************************************************************/
docenter()
{
   empty(ref,13);
   atsay(0,0,"<>Select<> <F7> to Save/Exit <Esc>Quit");
   dflthlp("WPSTYLE");
   wselect(w0);
   loadmenu();
   l=wxopen(3,25,5,55,"Enter Reference Name",
   ACTIVE+CURSOR+BORDER+BD1,0,0);
   atget(0,9,ref,"XXXXXXXX.REF");
   m2=wxopen(8,30,18,50,"Enter Document Name",
   ACTIVE+CURSOR+BORDER+BD1,0,0);
   for(i=0;i<7;i++)
      atget(i+1,6,index1[i],"XXXX999");
   readgets();
   wclose(m2);
   wclose(l);
   if (ref[0] == ' ' && ref[1] == ' ' && ref[2] == ' ' && ref[3] == ' '
   && ref[4] == ' ' && ref[5] == ' ' && ref[6] == ' ' && ref[7] == ' ')
      goto file;
   refdata();
   goto skipl;
file:
   for(i=0;i<7;i++)
      if(index1[i][0] != ' ')
           numsel++;
      if(numsel == 0)
           return(0);
seloptl:
   dflthlp("SELOPTION");
   wselect(sw);
   atsay(0,0,"                                                   ");
   atsay(0,0,"<F7>Enter/Merge <Shift-F7>Print Worksheet <F8>Review <F3>Help
<ESC>Quit");
retry1:
   while(keyrdy())
      getone();
      switch(getone())
      {
           case SF7 :
                atsay(0,0,"
");
                form();
                prnform1();
                goto seloptl;
                break;
           case F7 :
                atsay(0,0,"
");
                form();
                scrform();
                break;
           case F8 :
                atsay(0,0,"
");
                loadmenu();
                form();
                flag0=1;
                scrform();
                break;
           case ESC:
                atsay(0,0,"
");
                return(0);
           default:
                bell();
```

```
                goto retry1;
        }
        savref();
skip1:
        return(0);
}

/******************************************************************
File:   od.c
*******************************************************************
Object modules in file:
 main(),clearmem(),loadmenu(),docenter()
*******************************************************************
Created By: Raymond T. Nygren
Date Created:   3/26/88
*******************************************************************
Edited By:
Date Edited:
*******************************************************************
Purpose:   load chapter and volume menus into global structures from
 user.def,user1.def,user2.def,user3.def,user4.def,user5.def

*******************************************************************
Input:

*******************************************************************
Output:

*******************************************************************
Restrictions:

*******************************************************************
Object modules called:

*******************************************************************/
/******************************************************************
   User defined Selected Main menu
*******************************************************************/
loadmenu()
{
   vselect(v0);
   addvcmstyle("STDHORIZ",HORIZONTAL | TITLECENTER,80,
               vc.cyan+vc.bold+vc.bg*vc.blue,          /* Normal
               vc.blue+vc.bg*vc.white,                 /* Bar
               vc.cyan+vc.bg*vc.blue,                  /* Unavailable
               vc.white+vc.blue*vc.bg,                 /* Border
               0);                                     /* Permlvl
mainmenu1=menunew(3,0,"Chapters","CHAPTER","STDHORIZ");
mainmenu2=menunew(3,0,"Chapters","CHAPTER","STDHORIZ");
mainmenu3=menunew(3,0,"Chapters","CHAPTER","STDHORIZ");
mainmenu4=menunew(3,0,"Chapters","CHAPTER","STDHORIZ");
mainmenu5=menunew(3,0,"Chapters","CHAPTER","STDHORIZ");

for(i=0;i<25;i++)
```

```
empty(menu1[i].title,20);
empty(menu1[i].call,10);
empty(menu1[i].prompt,60);

j=0;
or(x=1;x<6;x++)

strcpy(buffer,"user");
sprintf(chr,"%d",x);
strcat(buffer,chr);
strcat(buffer,".def");
if((f1=fopen(buffer,"r")) == NULL)
     goto emp;
k=0;
i=0;
ch='C';
while(ch != EOF)
{
     while(((ch =fgetc(f1)) != EOF) && (ch != '\n'))
     {
          buff[i] = ch;
          i++;
     }
     buff[i] ='\0';
     trim(buff);
     if(k == 0)
          strcpy(menu1[j].title,buff);
     if(k == 1)
          strcpy(menu1[j].call,buff);
     if(k == 2)
          strcpy(menu1[j].prompt,buff);
     empty(buff,100);
     trim(buff);
     k++;
     if(k == 3)
     {
          k=0;
          j++;
     }
     i=0;
     if(j>24)
          break;
}
if(x==1)
{
     for(i=0;i<5;i++)
          {
               if(menu1[i].title[0]!=' ' && menu1[i].title[0]!='\0')
               menuxitem(mainmenu1,menu1[i].title,NULL,0,bldmnu,
                    menu1[i].call,menu1[i].prompt,"CHAPTER",STRPARM);
          }
}
if(x==2)
{
     for(i=5;i<10;i++)
     {
          if(menu1[i].title[0]!=' ' && menu1[i].title[0]!='\0')
          menuxitem(mainmenu2,menu1[i].title,NULL,0,bldmnu,
               menu1[i].call,menu1[i].prompt,"CHAPTER",STRPARM);
     }
}
if(x==3)
{
     for(i=10;i<15;i++)
     {
          if(menu1[i].title[0]!=' ' && menu1[i].title[0]!='\0')
          menuxitem(mainmenu3,menu1[i].title,NULL,0,bldmnu,
```

```
                    menu1[i].call,menu1[i].prompt,"CHAPTER",STRPARM);
            }
        }
        if(x==4)
        {
            for(i=15;i<20;i++)
            {
                if(menu1[i].title[0]!=' ' && menu1[i].title[0]!='\0')
                    menuxitem(mainmenu4,menu1[i].title,NULL,0,bldmnu,
                    menu1[i].call,menu1[i].prompt,"CHAPTER",STRPARM);
            }
        }
        if(x==5)
        {
            for(i=20;i<25;i++)
            {
                if(menu1[i].title[0]!=' ' && menu1[i].title[0]!='\0')
                    menuxitem(mainmenu5,menu1[i].title,NULL,0,bldmnu,
                    menu1[i].call,menu1[i].prompt,"CHAPTER",STRPARM);
            }
        }
emp:    fclose(f1);
    }
/*****************************************************************
  main index file
menu*****************************************************************
*/
    mainmenu=menunew(1,0,"Volumes","VOLUME","STDHORIZ");

if((f2=fopen("user.def","r")) == NULL)
    {
      w1=wxopen(10,20,13,60,NULL,ACTIVE,0,0);
      atsay(0,5,"Unable to find user.def file");
      atsay(1,5,"Press any key to continue");
      ch=getone();
      wclose(w1);
      return (0);
    } k=0;
    j=0;
    i=0;
    ch='C';
    while(ch != EOF)
    {
      while(((ch =fgetc(f2)) != EOF) && (ch != '\n')&&i<60)
      {
            buff[i] = ch;
            i++;
      }
      buff[i] ='\0';
      trim(buff);
      if(k == 0)
            strcpy(menu[j].title,buff);
      if(k == 1)
            strcpy(menu[j].call,buff);
      if(k == 2)
            strcpy(menu[j].prompt,buff);
      empty(buff,100);
      trim(buff);
      k++;
      if(k == 3)
      {
            k=0;
            j++;
      }
      i=0;
```

```
    if(j>4)
        break;
}
fclose(f2);
i=0;
if(menu[i].title[0]!='\0'&&menu[i].title[0]!=' ')
    menuxitem(mainmenu,menu[i].title,NULL,0,NULLFUNC,mainmenu1,
    menu[i].prompt,"VOLUME",MENU);
i=1;
if(menu[i].title[0]!='\0'&&menu[i].title[0]!=' ')
    menuxitem(mainmenu,menu[i].title,NULL,0,NULLFUNC,mainmenu2,
    menu[i].prompt,"VOLUME",MENU);
i=2;
if(menu[i].title[0]!='\0'&&menu[i].title[0]!=' ')
    menuxitem(mainmenu,menu[i].title,NULL,0,NULLFUNC,mainmenu3,
    menu[i].prompt,"VOLUME",MENU);
i=3;
if(menu[i].title[0]!='\0'&&menu[i].title[0]!=' ')
    menuxitem(mainmenu,menu[i].title,NULL,0,NULLFUNC,mainmenu4,
    menu[i].prompt,"VOLUME",MENU);
i=4;
if(menu[i].title[0]!='\0'&&menu[i].title[0]!=' ')
    menuxitem(mainmenu,menu[i].title,NULL,0,NULLFUNC,mainmenu5,
    menu[i].prompt,"VOLUME",MENU);
}

/*********************************************************************
File:    od.c
**********************************************************************
Object modules in file:
 main(),clearmem(),loadmenu(),docenter()
**********************************************************************
Created By: Raymond T. Nygren
Date Created:  3/26/88
**********************************************************************
Edited By:
Date Edited:
**********************************************************************
Purpose:   clear global memory and read setup.cfg file into global
 variables

**********************************************************************
Input:

**********************************************************************
Output:

**********************************************************************
Restrictions:

**********************************************************************
Object modules called:

**********************************************************************/
```

```
clearmem()
{
   numfld=0;
   numsel=0;
   for(i=0;i<25;i++)
   {
      sel[i]=0;
      for(j=0;j<20;j++)
      {
           empty(docu[i][j],12);
           for(k=0;k<50;k++)
                fldindx[i][j][k]=0;
      }
   }
      for(k=0;k<120;k++)
      {
         empty(edit[k],60);
         empty(var1[k].pic,60);
         empty(var1[k].prompt,60);
         empty(var1[k].func,10);
         empty(var1[k].field,13);
         if(k<100)
              empty(index1[k],12);
      }
      for(j=0;j<25;j++)
        for(k=0;k<50;k++)
              mark[j][k]=0;
      empty(od,50);
      empty(wp,50);
      empty(vol1,50);
      empty(vol2,50);
      empty(vol3,50);
      empty(vol4,50);
      empty(vol5,50);
      empty(prnt,2);
      empty(vers,4);
      if((f1=fopen("setup.cfg","r")) == NULL)
      {
         w1=wxopen(10,20,13,60,NULL,ACTIVE+BORDER+BD1,0,0);
         atsay(0,7,"Unable to open setup.cfg file");
         atsay(1,9,"Press any key to continue");
         ch=getone();
         wclose(w1);
         wclose(wdo);
         return(0);
      }
      k=0;
      i=0;
      ch='C';
      while(ch != EOF)
      {
         while(((ch =fgetc(f1)) != EOF) && (ch != '\n')&& (ch != '\0'))
         {
                if(k == 0)
                    od[i]=ch;
                if(k == 1)
                    wp[i]=ch;
                if(k == 2)
                    vol1[i]=ch;
                if(k == 3)
                    vol2[i]=ch;
                if(k == 4)
                    vol3[i]=ch;
                if(k == 5)
                    vol4[i]=ch;
                if(k == 6)
                    vol5[i]=ch;
                if(k == 7)
```

```
                prnt[i]=ch;
        if(k == 8)
                vers[i]=ch;
            i++;
        }
        k++;
        i=0;
    }
    trim(od);
    trim(wp);
    trim(vol1);
    trim(vol2);
    trim(vol3);
    trim(vol4);
    trim(vol5);
    trim(prnt);
    trim(vers);
    fclose(f1);
}

/****************************************************************
File:    loadchpt.c
*****************************************************************
Object modules in file:

*****************************************************************
Created By: Raymond T. Nygren
Date Created: 3/26/88
*****************************************************************
Edited By:
Date Edited:
*****************************************************************
Purpose:  load menu system from user?def files and display menu to get
   chapter selection

*****************************************************************
Input:

*****************************************************************
Output:

*****************************************************************
Restrictions:

*****************************************************************
Object modules called:

*****************************************************************/
=include <vcstdio.h>
extern char index1[100][14];
extern struct vartyp {
    char pic[61];
    char func[10];
```

```
    char prompt[61];
    char field[13];
    };
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/**************************************************************
    Load Chapter selection
**************************************************************/
loadchpt()
{
    int mmpik;
    char ret;
    char buff2[12],buff1[12];
    VCMENU *mai,*mnu1,*mnu2,*mnu3,*mnu4,*mnu5;
    addvcmstyle("STDVERT",VERTICAL | TITLECENTER,AUTO,
                        vc.cyan+vc.bold+vc.bg*vc.blue,          /* Normal */
                        vc.blue+vc.bg*vc.white,                 /* Ba */
                        vc.cyan+vc.bg*vc.blue,                  /* Unavailable */
                        vc.white+vc.blue*vc.bg,                 /* Border */
                        0);                                     /* Permlvl */ mnu1=menunew(3,0,"Chapters","CHAPTER","STDVERT");
```

```c
mnu2=menunew(3,16,"Chapters","CHAPTER","STDVERT");
mnu3=menunew(3,32,"Chapters","CHAPTER","STDVERT");
mnu4=menunew(3,48,"Chapters","CHAPTER","STDVERT");
mnu5=menunew(3,64,"Chapters","CHAPTER","STDVERT");

for(i=0;i<25;i++)
{
    empty(menu1[i].title,20);
    empty(menu1[i].call,10);
    empty(menu1[i].prompt,60);
}
j=0;
for(x=1;x<6;x++)
{
    strcpy(buffer,"user");
    sprintf(chr,"%d",x);
    strcat(buffer,chr);
    strcat(buffer,".def");
    if((f1=fopen(buffer,"r")) == NULL)
        goto emp;
    k=0;
    i=0;
    ch='C';
    while(ch != EOF)
    {
        while(((ch =fgetc(f1)) != EOF) && (ch != '\n'))
        {
            buff[i] = ch;
            i++;
        }
        buff[i] ='\0';
        if(k == 0)
        {
            strcpy(menu1[j].title,buff);
            trim(menu1[j].title);
        }
        if(k == 1)
        {
            strcpy(menu1[j].call,buff);
            trim(menu1[i].call);
        }
        if(k == 2)
        {
            strcpy(menu1[j].prompt,buff);
            trim (menu1[j].prompt);
        }
        empty(buff,100);
        trim(buff);
        k++;
        if(k == 3)
        {
            k=0;
            j++;
        }
        i=0;
    }
    if(x==1)
    {
        for(i=0;i<5;i++)
        {
            if(menu1[i].title[0]!=' '&& menu1[i].title[0]!='\0
                menuxitem(mnu1,menu1[i].title,NULL,0,toggle,
                &mark[0][i],"<><>[ENTER]Select <ESC>Prior Menu",
                "CHAPTER",CHECKED);
        }
    }
    if(x==2)
```

```c
        {
                for(i=5;i<10;i++)
                {
                        if(menu1[i].title[0]!=' '&& menu1[i].title[0]!='\0
                            menuxitem(mnu2,menu1[i].title,NULL,0,toggle,
                            &mark[0][i],"<><>[ENTER]Select <ESC>Prior
Menu",
                            "CHAPTER",CHECKED);
                }
        }
        if(x==3)
        {
                for(i=10;i<15;i++)
                {
                        if(menu1[i].title[0]!=' '&& menu1[i].title[0]!='\0
                            menuxitem(mnu3,menu1[i].title,NULL,0,toggle,
                            &mark[0][i],"<><>[ENTER]Select <ESC>Prior
Menu",
                            "CHAPTER",CHECKED);
                }
        }
        if(x==4)
        {
                for(i=15;i<20;i++)
                {
                        if(menu1[i].title[0]!=' '&& menu1[i].title[0]!='\0
                            menuxitem(mnu4,menu1[i].title,NULL,0,toggle,
                            &mark[0][i],"<><>[ENTER]Select <ESC>Prior
Menu",
                            "CHAPTER",CHECKED);
                }
        }
        if(x==5)
        {
                for(i=20;i<25;i++)
                {
                        if(menu1[i].title[0]!=' '&& menu1[i].title[0]!='\0
                            menuxitem(mnu5,menu1[i].title,NULL,0,toggle,
                            &mark[0][i],"<><>[ENTER]Select <ESC>Prior
Menu",
                            "CHAPTER",CHECKED);
                }
        }
emp:
        fclose(f1);
}
/*************************************************************
  main index file menu
*************************************************************/
    addvcmstyle("STDHORIZ",HORIZONTAL | TITLECENTER,80,
                    vc.cyan+vc.bold+vc.bg*vc.blue,      /* Normal     */
                    vc.blue+vc.bg*vc.white,             /* Ba */
                    vc.cyan+vc.bg*vc.blue,              /* Unavailable */
                    vc.white+vc.blue*vc.bg,             /* Border     */
                    0);                                 /* Permlvl    */ mai=menunew(1,0,"Volumes","VOLUME","STDHORIZ");

if((f1=fopen("user.def","r")) == NULL)
    {
        w1=wxopen(4,4,10,60,NULL,ACTIVE,0,0);
        atsay(1,15,"Unable to find user.def file");
        atsay(4,15,"Press any key to continue");
```

```c
        ch=getone();
        wclose(w1);
        return(0);
} k=0;
j=0;
i=0;
ch='C';
while(ch != EOF)
{
        while(((ch =fgetc(f1)) != EOF) && (ch != '\n'))
        {
                buff[i] = ch;
                i++;
        }
        buff[i] ='\0';
        if(k == 0)
                strcpy(menu[j].title,buff);
        if(k == 1)
                strcpy(menu[j].call,buff);
        if(k == 2)
                strcpy(menu[j].prompt,buff);
        strcpy(buff,"");
        k++;
        if(k == 3)
        {
                k=0;
                j++;
        }
        i=0;
}
fclose(f1);
i=0;
if(menu[i].title[0]!='\0'&&menu[i].title[0]!=' ')
        menuxitem(mai,menu[i].title,NULL,0,NULLFUNC,mnu1,
        menu[i].prompt,"VOLUME",MENU);
i=1;
if(menu[i].title[0]!='\0'&&menu[i].title[0]!=' ')
        menuxitem(mai,menu[i].title,NULL,0,NULLFUNC,mnu2,
        menu[i].prompt,"VOLUME",MENU);
i=2;
if(menu[i].title[0]!='\0'&&menu[i].title[0]!=' ')
        menuxitem(mai,menu[i].title,NULL,0,NULLFUNC,mnu3,
        menu[i].prompt,"VOLUME",MENU);
i=3;
if(menu[i].title[0]!='\0'&&menu[i].title[0]!=' ')
        menuxitem(mai,menu[i].title,NULL,0,NULLFUNC,mnu4,
        menu[i].prompt,"VOLUME",MENU);
i=4;
if(menu[i].title[0]!='\0'&&menu[i].title[0]!=' ')
        menuxitem(mai,menu[i].title,NULL,0,NULLFUNC,mnu5,
        menu[i].prompt,"VOLUME",MENU);

vcmenu(mai);
wselect(sw);
atsay(0,60,"                              ");
atsay(0,0,"
");
empty(fil,12);
empty(file,12);
empty(doc,13);
for(i=0;i<25;i++)
{
        if(mark[0][i] == 1)
        {
                strcpy(fil,menu1[i].title);
                strcpy(file,menu1[i].call);
```

```c
            if(i<5)
                strcpy(doc,menu[0].title);
            if(i>4 && i<10)
                strcpy(doc,menu[1].title);
            if(i>9 && i<15)
                strcpy(doc,menu[2].title);
            if(i>14 && i<20)
                strcpy(doc,menu[3].title);
            if(i>19 && i<25)
                strcpy(doc,menu[4].title);
            break;
        }
    )
    for(i=0;i<25;i++)
        mark[0][i] = 0;

}
/****************************************************************
File:    refrep.c
****************************************************************
Object modules in file:

****************************************************************
Created By: Raymond T. Nygren
Date Created:  3/26/88
****************************************************************
Edited By:
Date Edited:
****************************************************************
Purpose:  printout reference report

****************************************************************
Input:

****************************************************************
Output:

****************************************************************
Restrictions:

****************************************************************
Object modules called:

****************************************************************/
=include <vcstdio.h>
extern char index1[100][14];
extern struct vartyp (
    char pic[61];
    char func[10];
    char prompt[61];
    char field[13];
    );
```

```c
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/****************************************************************
   if old reference file read
****************************************************************/
refrep()
{
    char sdate[12],pag[3],ref1[13],num[5],buff1[12];
    int line,nm,ind,counter,page;
    empty(sdate,12);
    getdate(sdate);
    page=1;
    line=0;
    rw=wxopen(10,20,12,60,NULL,ACTIVE+BORDER+BD1,0,0);
    if(rw == -1)
        terror("Unable to open reference entry window");
    atsay(0,7,"Printing Reference Report");
    w1=wxopen(10,20,14,60,NULL,ACTIVE+BORDER+BD1,0,0);
    atsay(0,11,"Is Printer Ready ?");
    atsay(1,12,"<ESC> to Quit or");
    atsay(2,9,"any other key to continue");
    ch=getone();
    wclose(w1);
    if(ch==ESC)
    {
        wclose(rw);
        return(0);
```

```c
}
for(i=0;i<100;i++)
{
    empty(index1[i],14);
    empty(index2[i],14);
}
if(flag0==2)
{
    strcpy(index2[0],ref);
    strcpy(index2[1],"");
    goto single;
}
system("dir *.REF > referenc.cfg");
if((f1=fopen("referenc.cfg","r")) == NULL)
{
    w1=wxopen(4,4,10,60,NULL,ACTIVE,0,0);
    atsay(1,15,"Unable to find Reference file config file");
    atsay(4,15,"Press any key to continue");
    ch=getone();
    wclose(rw);
    wclose(w1);
    return (0);
}
i=0;
j=0;
ch='C';
while(ch != EOF)
{
    while(((ch =fgetc(f1)) != EOF) && (ch != '\n'))
    {
        buff[i] = ch;
        i++;
    }
    buff[i] ='\0';
    if(buff[0] > 32 && buff[0] <127)
    {
        strncpy(index1[j],buff,8);
        trim(index[j]);
        if(j<100)
            j++;
    }
    i=0;
}
fclose(f1);
if(index[0][0]==' ')
{
    flag1=1;
    return(0);
}
for(j=0;j<100;j++)
{
    empty(buff,100);
    for(l=0;l<100;l++)
        if(index1[l][0] != ' '&& strcmp(index2[j-1],index1[l]))
        {
            strcpy(buff,index1[l]);
            break;
        }
        for(i=0;i<100;i++)
        {
            if(index1[i][0] != ' ')
            {
                if(index1[i][0] < buff[0])
                    strcpy(buff,index1[i]);
                else
                    if(index1[i][0] == buff[0])
                        if(index1[i][1] < buff[1])
                            strcpy(buff,index1[i]);
```

```
;

buff[3])

buff[4])

index1[i]);

[4] == buff[4])

x1[i][5] < buff[5])

rcpy(buff,index1[i]);

(index1[i][5] == buff[5])

f(index1[i][6] < buff[6])

strcpy(buff,index1[i]);

lse if(index1[i][6] == buff[6])

if(index1[i][7] < buff[7])

strcpy(buff,index1[i]);
            }
        }
        strcpy(index2[j],buff);
        for(k=0;k<100;k++)
        if(!strcmp(buff,index1[k]))
            empty(index1[k],14);
    }
    trim(index2[0]);
    if(index2[0][0],'\0')
        return(0);
single:
    if((f2=fopen("prn","w")) == NULL)
    {
        w1=wxopen(4,4,10,60,NULL,ACTIVE,0,0);
        atsay(1,18,"Printer not ready");
        atsay(4,15,"Press any key to continue");
        ch=getone();
        wclose(w1);
        wclose(rw);
        return(0);
    }
    if(prnt[0] == 'M')
    {
        whide(rw);
        w1=wxopen(10,20,14,60,NULL,ACTIVE+BORDER+BD1,0,0);
        atsay(0,12,"Is Printer Ready ?");
        atsay(1,12,"<ESC> to Quit or");
        atsay(2,9,"any other key to continue");
        ch=getone();
        wclose(w1);
```

```
                    else
                        if(index1[i][1] == buff[1])
                            if(index1[i][2] < buff[2])
                                strcpy(buff,index1[i]);
                            else
                                if(index1[i][2] == buff[2])
                                    if(index1[i][3] < buff[3]
                                        strcpy(buff,index1[i
                                    else
                                        if(index1[i][3] ==
                                            if(index1[i][4]
                                                strcpy(buff,
                                            else
                                                if(index1[ if(inde else
```

```c
            wshow(rw);
            if(ch==ESC)
            {
                    fclose(f2);
                    wclose(rw);
                    return;
            }
    }
    if(kbhit())
    {
            c=getone();
            if(c == ESC)
            {
                    fclose(f2);
                    wclose(rw);
                    return;
            }
    }
    fputs("                         OverDrive Library Report\n",f2);
    fputs("                       Reference File Document Information
",f2);
    fputc('\n',f2);
    fputs(sdate,f2);
    fputs("                                                     Page:  ",f2);
    sprintf(pag,"%d",page);
    fputs(pag,f2);
    fputc('\n',f2);
    fputs("Reference Files   Documents  Description",f2);
    fputc('\n',f2);
    for(nm=1,k=0;k<100;k++)
    {
            for(i=0;i<50;i++)
            {
                    empty(index[i],60);
                    empty(index1[i],14);
            }
            sprintf(num,"%d",nm);
            trim(index2[k]);
            if(index2[k][0] != '\0'&& index2[k][0] != ' '&&
            strcmp(index2[k],"NULL"))
            {
                    nm++;
                    if(flag0 == 0)
                            strcat(index2[k],".REF");
                    for(i=0,x=0;x<13;x++)
                    {
                            ref1[i]=index2[k][x];
                            i++;
                            if(index2[k][x] == 32)
                                    i--;
                    }
                    ref1[i]='\0';
                    i=strlen(ref1);
                    j=12-i;
                    strcpy(index2[k],"");
                    for(i=0;i<j;i++)
                            strcat(index2[k]," ");
                    strcpy(index2[k],ref1);

if((f1=fopen(index2[k],"r")) == NULL)
                    {
                            w1=wxopen(4,4,10,60,NULL,ACTIVE,0,0);
                            atsay(1,15,"Unable to find Reference file");
                            atsay(4,15,"Press any key to continue");
                            ch=getone();
                            wclose(w1);
                            return (0);
                    }
                    m=0;
```

```
i=0;
ch='C';
j=0;
while(ch != EOF)
{
    empty(buff,60);
    while(((ch =fgetc(f1)) != EOF) && (ch != '\n'))
    {
        buff[i] = ch;
        i++;
    }
    if(buff[0] == '+')
        for(l=1;l<=i;l++)
            index1[j][l-1]=buff[l];
    trim(index1[j]);
    strcpy(buff,"");
    j++;
    i=0;
}
fclose(f1);
m=strlen(index2[k]);
n=12-m;
for(i=0;i<n;i++)
    strcat(index2[k]," ");
strcat(num,". ");
m=strlen(num);
if(m==3)
    strcat(num," ");
fputc('\n',f2);
fputc('\n',f2);
line=line + 2;
fputs(num,f2);
fputs(index2[k],f2);   /* reference file name */
fputs(" ",f2);
counter=0;
for(ind=0;ind<25;ind++)
{
    trim(index1[ind]);
    if(index1[ind][0] != '\0')
    {
        empty(buff1,12);
        strncpy(buff1,index1[ind],4);
        trim(buff1);
        strcat(buff1,".IDX");
        if((f4=fopen(buff1,"r")) == NULL)
        {
            w1=wxopen(10,10,13,70,NULL,ACTIVE,0,0);
            atsay(0,7,"Unable to open       chapter index file");
            atsay(0,22,buff1);
            atsay(1,15,"Press any key to continue");
            ch=getone();
            wclose(w1);
            return (0);
        }
        i=0;
        ch='C';
        j=0;
        while(ch != EOF)
        {
            empty(buff,100);
            while(((ch =fgetc(f4)) != EOF) && (ch != '\n'
            {
                buff[i] = ch;
                i++;
            }
            trim(buff);
            strcpy(index[j],buff);
```

```
            j++;
            i=0;
    }
    fclose(f4);
    for(j=0;j<50;j++)
    {
            empty(buff1,12);
            strncpy(buff1,index[j],7);
            trim(buff1);
            if(!strcmp(index1[ind],buff1))
                    break;
    }
    empty(buff,100);
    for(i=10,q=0;i<69&& buff[i]!='\0';i++,q++)
            buff[q] = index[j][i];
    trim(buff);
    line++;
    if(line>52)
    {
            if(prnt[0] == 'M')
            {
                    whide(rw);
                    w1=wxopen(10,20,13,60,NULL,ACTIVE+BORDER D1,0,0);
                    atsay(0,4,"Have Printer Ready for Next Page");
                    atsay(1,8,"Press any key to continue");
                    ch=getone();
                    wclose(w1);
                    wshow(rw);
            }
            if(kbhit())
            {
                    c=getone();
                    if(c == ESC)
                    {
                            fclose(f2);
                            wclose(rw);
                            return(0);
                    }
            }
            page++;
            fputc('\f',f2);
            fputs("                          OverDrive Library Report\n",f2);
            fputs("                          Reference File Document Information ",f2);
            fputc('\n',f2);
            fputs(sdate,f2);
            fputs("                                          Page: ",f2);
            sprintf(pag,"%d",page);
            fputs(pag,f2);
            fputc('\n',f2);
            fputs("Reference Files   Documents Description",f2);
            fputc('\n',f2);
            line=0;
    }
    if(counter!=0)
            fputs("\n                       ",f2);
    fputs(index1[ind],f2);
    fputs("    ",f2);
    fputs(buff,f2);        /* IDX file Description   */
    counter++;
        }
    }
}
```

```
    }
    fputc('\f',f2);
    fclose(f2);
    wclose(rw);
}
/*********************************************************************
File:     shsel.c
**********************************************************************
Object modules in file:

**********************************************************************
Created By: Raymond T. Nygren
Date Created: 3/26/88
**********************************************************************
Edited By:
Date Edited:
**********************************************************************
Purpose:  show selected documents

**********************************************************************
Input:

**********************************************************************
Output:

**********************************************************************
Restrictions:

**********************************************************************
Object modules called:

**********************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
char call[10];
    char prompt[60];
    };
extern struct mnutyp menu[5]; /* Structure form volume menu */
extern struct mnutyp menu1[25]; /* Structure for chapter menus  */
extern int flag1,flag0,numfld,numdoc;
extern char chr[2],buffer[12];
extern char edit[50][61],file[13];
extern char ref[13],index[50][80],index2[100][14],docu[25][20][12];
```

```c
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*******************************************************************
   show items selected
*******************************************************************/
shsel()
{
    int vcprokey(),error;
    setkeyfunc(NULLFUNC);
    w3=wxopen(5,64,22,79,"Docs. Selected",CENTER+BORDER+BD1+ACTIVE,20,0);
    for(i=0;i<numsel;i++)
    {
        sprintf(buff,"%d",(i+1));
        strcat(buff,".");
        atsay(i,0,buff);
        trim(index1[i]);
        atsay(i,4,index1[i]);
    }
    if(numsel > 20)
    {
        error=wxopen(10,20,12,60,NULL,ACTIVE+BORDER+BD1,0,0);
        atsay(0,5,"More than 20 Documents selected");
        ch=getone();
        wclose(error);
    }
repeat:
    ch=getone();
    if(ch == '\110')
    {
        wscroll(w3,CUP,1);
            goto repeat;
    }
    if(ch == '\120')
    {
        wscroll(w3,CDOWN,1);
        goto repeat;
    }
    wclose(w3);
    setkeyfunc(vcprokey);
    return(0);
}
```

```
/****************************************************************
File:     utilmnu.c
****************************************************************
Object modules in file:

****************************************************************
Created By: Raymond T. Nygren
Date Created:  3/26/88
****************************************************************
Edited By:
Date Edited:
****************************************************************
Purpose:   Print reports menu

****************************************************************
Input:

****************************************************************
Output:

****************************************************************
Restrictions:

****************************************************************
Object modules called:

****************************************************************/
#include <vcstdio.h>
extern char index1[100][14];
extern struct vartyp {
     char pic[61];
     char func[10];
     char prompt[61];
     char field[13];
     };
extern struct vartyp var1[120]; /* Structure for variable menu */
extern struct vartyp var2; /* Structure for variable menu */
extern struct mnutyp {
     char title[20];
     char call[10];
     char prompt[60];
     };
extern struct mnutyp menu[5]; /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
```

```c
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/****************************************************************
   Create reports for library
****************************************************************/
utilmnu()
{
    int chptr;
idxtop:
    dflthlp("LIBREPORT");
    wdo=wxopen(2,12,18,65,"OverDrive (tm)",
    ACTIVE+CENTER+BORDER+BD3,0,0);
    atsay(1,18,"Library Reports");
    atsay(5,12,"1. Library Table of Contents");
    atsay(6,12,"2. Table of Contents by Chapter");
    atsay(7,12,"3. Field Information by Chapter");
    atsay(8,12,"4. Field Information by Document");
    atsay(9,12,"5. Library References ");
    atsay(10,12,"6. Individual Reference");
    atsay(11,12,"7. Return to MAIN MENU");
    wselect(sw);
    atsay(0,0,"Enter (1-7)   <F3>Help ");
retry0:
    flag1=0;
    flag0=0;
    while(keyrdy())
        getone();
    switch(getone())
    {
        case '1':
            atsay(0,0,"                                    ");
            wclose(wdo);
            loadmenu();
            w1=wxopen(10,20,14,60,NULL,ACTIVE+BORDER+BD1,0,0);
            atsay(0,12,"Is Printer Ready ?");
            atsay(1,12,"<ESC> to Quit or");
            atsay(2,8,"any other key to continue");
            ch=getone();
            wclose(w1);
            if(ch==ESC)
                goto idxtop;
            rw=wxopen(10,20,13,60,NULL,ACTIVE+BORDER+BD1,0,0);
            if(rw == -1)
                terror("Unable to open reference entry window");
            atsay(0,5,"Printing Table of Contents Report");
            atsay(1,15,"<ESC>Quit");
```

```c
for(chptr=0;chptr<25;chptr++)
{
    if(flag0==1)
        break;
    empty(fil,12);
    empty(file,12);
    empty(doc,13);
    strcpy(fil,menu1[chptr].title);
    strcpy(file,menu1[chptr].call);
    if(chptr<5)
        strcpy(doc,menu[0].title);
    if(chptr>4 && chptr<10)
        strcpy(doc,menu[1].title);
    if(chptr>9 && chptr<15)
        strcpy(doc,menu[2].title);
    if(chptr>14 && chptr<20)
        strcpy(doc,menu[3].title);
    if(chptr>19 && chptr<25)
        strcpy(doc,menu[4].title);
    trim(fil);
    trim(file);
    trim(doc);
    flag1=1;
    printdoc();
}
    wclose(rw);
    goto idxtop;
case '2':
    atsay(0,0,"                                    ");
    wclose(wdo);
    loadchpt();
    w1=wxopen(10,20,14,60,NULL,ACTIVE+BORDER+BD1,0,0);
    atsay(0,12,"Is Printer Ready ?");
    atsay(1,12,"<ESC> to Quit or");
    atsay(2,8,"any other key to continue");
    ch=getone();
    wclose(w1);
    if(ch==ESC)
        goto idxtop;
    rw=wxopen(10,10,13,70,NULL,ACTIVE+BORDER+BD1,0,0);
    if(rw == -1)
        terror("Unable to open reference entry window");
    atsay(0,10,"Printing Table of Contents Report by Chapter");
    atsay(1,25,"<ESC>Quit");
    printdoc();
    wclose(rw);
    goto idxtop;
case '3':
    atsay(0,0,"                                    ");
    wclose(wdo);
    printvar();
    goto idxtop;
case '4':
    atsay(0,0,"                                    ");
    wclose(wdo);
    printval();
    goto idxtop;
case '5':
    atsay(0,0,"                                    ");
    wclose(wdo);
    refrep();
    goto idxtop;
case '6':
    atsay(0,0,"                                    ");
    wclose(wdo);
    flag0=2;
    empty(ref,13);
```

```
                refpick();
                wselect(sw);
                atsay(0,0,"                                                    ");
                wselect(w0);
                trim(ref);
                if(ref[0] !='\0')
                    refrep();
                goto idxtop;
            case '7':
                atsay(0,0,"                                                    ");
                wclose(wdo);
                return(0);
                break;
            case ESC :
                atsay(0,0,"                                                    ");
                wclose(wdo);
                return(0);
                break;
            default:
                bell();
                goto retry0;
        }
    return(0);
}
/********************************************************************
File:    refpick.c
********************************************************************
Object modules in file:

********************************************************************
Created By: Raymond T. Nygren
Date Created:  3/26/88
********************************************************************
Edited By:
Date Edited:
********************************************************************
Purpose:  sort and list reference files and select from menu

********************************************************************
Input:

********************************************************************
Output:

********************************************************************
Restrictions:

********************************************************************
Object modules called:

*********************************************************************/
```

```c
include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm,newint;
extern TEXT *globstr;
extern COUNT data,globint;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*******************************************************************
   if old reference file read
*******************************************************************/
refpick()
{
    char refl[12];
    int quit1();
    PFI setkeyfunc ();
    COUNT vcprokey ();
    dflthlp("REFPICK");
    addvcmstyle("STDVERT",VERTICAL,AUTO,
                  vc.cyan+vc.bold+vc.bg*vc.blue,        /* Normal     */
                  vc.blue+vc.bg*vc.white,              /* Ba
*/
```

```
                        vc.cyan+vc.bg*vc.blue,            /*
Unavailable  */
                        vc.white+vc.blue*vc.bg,           /*
Border       */
                        0);                               /*
Permlvl      */
    crp=menunew(2,1,NULL,"REFPICK","STDVERT");
    crp2=menunew(2,17,NULL,"REFPICK","STDVERT");
    crp3=menunew(2,33,NULL,"REFPICK","STDVERT");
    crp4=menunew(2,49,NULL,"REFPICK","STDVERT");
    crp5=menunew(2,65,NULL,"REFPICK","STDVERT");
    crp6=menunew(2,2,NULL,"REFPICK","STDVERT");
    for(i=0;i<100;i++)
    {
            empty(index1[i],14);
            empty(index2[i],14);
    }
    wselect(w0);
    system("dir *.REF > referenc.cfg");
    if((f1=fopen("referenc.cfg","r")) == NULL)
    {
            w1=wxopen(4,4,10,60,NULL,ACTIVE,0,0);
            atsay(1,15,"Unable to find Reference file config file");
            atsay(4,15,"Press any key to continue");
            ch=getone();
            wclose(w1);
            return(0);
    }
    atsay(0,0,"                              ");
    at(0,0);
    i=0;
    j=0;
    ch='C';
    while(ch != EOF)
    {
            while(((ch =fgetc(f1)) != EOF) && (ch != '\n'))
            {
                    buff[i] = ch;
                    i++;
            }
            buff[i] ='\0';
            if(buff[0] > 32 && buff[0] <127)
            {
                    strncpy(index1[j],buff,8);
                    index1[j][8]='\0';
                    strcat(index1[j],".REF");
                    trim(index1[j]);
                    j++;
                    if(j>100)
                            break;
            }
            i=0;
    }
    fclose(f1);

if(index1[0][0]==' ')
        {
                flag1=1;
                return(0);
        }
        for(j=0;j<100;j++)
        {
                empty(buff,100);
                for(l=0;l<100;l++)
                if(index1[l][0] != ' '&& strcmp(index2[j-1],index1[l]))
                {
                        strcpy(buff,index1[l]);
                        break;
```

```c
)
for(i=0;i<100;i++)
{
    if(index1[i][0] != ' ')
    {
        if(index1[i][0] < buff[0])
            strcpy(buff,index1[i]);
        else
            if(index1[i][0] == buff[0])
                if(index1[i][1] < buff[1])
                    strcpy(buff,index1[i]);
                else
                    if(index1[i][1] == buff[1])
                        if(index1[i][2] < buff[2])
                            strcpy(buff,index1[i]);
                        else
                            if(index1[i][2] == buff[2])
                                if(index1[i][3] < buff[3])
                                    strcpy(buff,index1[i]);
                                else
                                    if(index1[i][3] == buff[3])
                                        if(index1[i][4] < buff[4])
                                            strcpy(buff,index1[i]);
                                        else
                                            if(index1[i][4] == buff[4])
                                                if(index1[i][5] < buff[5])
                                                    strcpy(buff,index1[i]);
                                                else
                                                    if(index1[i][5] == buff[5])
                                                        if(index1[i][6] < buff[6])
                                                            strcpy(buff,index1[i]);
                                                        else
                                                            if(index1[i][6] == buff[6])
                                                                if(index1[i][7] < buff[7])
                                                                    strcpy(buff,index1[i]);
    }
    strcpy(index2[j],buff);
    for(k=0;k<100;k++)
        if(!strcmp(buff,index1[k]))
            empty(index1[k],14);
}
for(j=0;j<17;j++)
{
    if(index2[j][0] !=' ')
        menuxitem(crp,index2[j],NULL,0,toggle,
            &mark[0][j],"<><>[ENTER]Select  <F3>Help <ESC>Done",
            "REFPICK",CHECKED);
}
if(index2[j][0] !=' ')
    menuxitem(crp,"   Continue..",NULL,0,NULLFUNC,
        crp2,"More Reference Files","REFPICK",MENU);
for(j=17;j<34;j++)
```

```
        {
            if(index2[j][0] !=' ' )
                menuxitem(crp2,index2[j],NULL,0,toggle,
                    &mark[0][j],"<><>[ENTER]Select   <F3>Help <F7>Done
                    <ESC>Prior Menu","REFPICK",CHECKED);
        }
        if(index2[j][0] !=' ' )
            menuxitem(crp2,"  Continue..",NULL,0,NULLFUNC,
                crp3,"More Reference Files","REFPICK",MENU);
        for(j=34;j<50;j++)
        {
            if(index2[j][0] !=' ' )
                menuxitem(crp3,index2[j],NULL,0,toggle,
                    &mark[0][j],"<><>[ENTER]Select   <F3>Help
                    <F7>Done <ESC>Prior Menu","REFPICK",CHECKED);
        }
        if(index2[j][0] !=' ' )
            menuxitem(crp3,"  Continue..",NULL,0,NULLFUNC,
                crp4,"More Reference Files","REFPICK",MENU);
        for(j=50;j<67;j++)
        {
            if(index2[j][0] !=' ' )
                menuxitem(crp4,index2[j],NULL,0,toggle,
                    &mark[1][j-50],"<><>[ENTER]Select   <F3>Help
                    <F7>Done <ESC>Prior Menu","REFPICK",CHECKED);
        }
        if(index2[j][0] !=' ' )
            menuxitem(crp4,"  Continue..",NULL,0,NULLFUNC,
                crp5,"More Reference Files","REFPICK",MENU);
        for(j=67;j<84;j++)
        {
        if(index2[j][0] !=' ' )
            menuxitem(crp5,index2[j],NULL,0,toggle,
                &mark[1][j-50],"<><>[ENTER]Select   <F3>Help
                <F7>Done <ESC>Prior Menu","REFPICK",CHECKED);
        }
        if(index2[j][0] !=' ' )
            menuxitem(crp5,"  Continue..",NULL,0,NULLFUNC,
                crp6,"More Reference Files","REFPICK",MENU);
        for(j=84;j<100;j++)
        {
        if(index2[j][0] !=' ' )
            menuxitem(crp6,index2[j],NULL,0,toggle,
                &mark[1][j-50],"<><>[ENTER]Select   <F3>Help
                <F7>Done <ESC>Prior Menu","REFPICK",CHECKED);
        }
        vselect(w0);
        atsay(0,32,"Reference Files");
        setkeyfunc(vcprokey);
        addprokey(F7,quit1,NULL);
        vcmenu(crp);
        delprokey(F7);
        vcmfree(crp);
        for(j=0,i=0;i<50;i++)
        {
            if(mark[0][i] == 1)
            {
                j=1;
                strcpy(ref,index2[i]);
            }
            if(mark[1][i] == 1)
            {
                j=1;
                strcpy(ref,index2[i+50]);
                ;
            }
        }
        if(j == 0)
        {
```

```
        vselect(w0);
        atsay(0,0,"                                                    ");
        return(0);
    }
    for(i=0;i<50;i++)
    {
        mark[0][i]=0;
        mark[1][i]=0;
    }
    atsay(0,0,"
");
    if(flag0 != 2)
        refdata();
;

/*******************************************************************
File:    refpick.c
*******************************************************************
Object modules in file:

*******************************************************************
Created By: Raymond T. Nygren
Date Created:  3/26/88
*******************************************************************
Edited By:
Date Edited:
*******************************************************************
Purpose:   sort and list reference files and select from menu

*******************************************************************
Input:

*******************************************************************
Output:

*******************************************************************
Restrictions:

*******************************************************************
Object modules called:

*******************************************************************/
quit1()
{
    char buf0[20],buf1[20];
    empty(buf1,20);
    strncpy(buf1,crp->curitmptr->itemname,7);
    trim(buf1);
    if(!strcmp(buf1,"  Conti")).
    {
        empty(buf1,20);
        strncpy(buf1,crp2->curitmptr->itemname,7);
        trim(buf1);
    }
```

```c
    else
    {
        ungetone(ESC);
        return(0);
    }
    if(!strcmp(buf1,"  Conti"))
    {
        empty(buf1,20);
        strncpy(buf1,crp3->curitmptr->itemname,7);
        trim(buf1);
    }
    else
    {
        ungetone(ESC);
        ungetone(ESC);
        return(0);
    }
    if(!strcmp(buf1,"  Conti"))
    {
        empty(buf1,20);
        strncpy(buf1,crp4->curitmptr->itemname,7);
        trim(buf1);
    }
    else
    {
        ungetone(ESC);
        ungetone(ESC);
        ungetone(ESC);
        return(0);
    }
    if(!strcmp(buf1,"  Conti"))
    {
        empty(buf1,20);
        strncpy(buf1,crp5->curitmptr->itemname,7);
        trim(buf1);
    }
    if(!strcmp(buf1,"  Conti"))
    {
        ungetone(ESC);
        ungetone(ESC);
        ungetone(ESC);
        ungetone(ESC);
        ungetone(ESC);
        ungetone(ESC);
        return(0);
    }
    else
    {
        ungetone(ESC);
        ungetone(ESC);
        ungetone(ESC);
        ungetone(ESC);
        ungetone(ESC);
        return(0);

}
}

/*******************************************************************
File:    creatmnu.c
*********************************************************************
Object modules in file:

*********************************************************************
Created By: Raymond T. Nygren
Date Created:  3/26/88
*********************************************************************
```

```
Edited By:
Date Edited:
*****************************************************************
Purpose:   edit chapter menu defenition files

*****************************************************************
Input:

*****************************************************************
Output:

*****************************************************************
Restrictions:

*****************************************************************
Object modules called:

*****************************************************************/
#include <vcstdio.h>
extern char index1[100][14];
extern struct vartyp {
     char pic[61];
     char func[10];
     char prompt[61];
     char field[13];
     };
extern struct vartyp var1[120]; /* Structure for variable menu */
extern struct vartyp var2;   /* Structure for variable menu */
extern struct mnutyp {
     char title[20];
     char call[10];
     char prompt[60];
     };
extern struct mnutyp menu[5];  /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
```

```
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/********************************************************************
   Create user defined main menu parameters
   and save to user1-5.def
********************************************************************/
creatmnu(fi)
    char fi;
{
    int mnuchpt();
    char ret;
    char buff2[12];
    wselect(w0);
    dflthlp("LIBCHAPTER");
    loadmenu();
    for(i=0;i<5;i++)
    {
        empty(menu[i].title,20);
        empty(menu[i].call,5);
        empty(menu[i].prompt,60);
    }
    empty(buff2,12);
    strcpy(buff2,"user");
    buff2[4]=fi;
    buff2[5]='\0';
    strcat(buff2,".def");
    if((f1=fopen(buff2,"r+")) != NULL)
        i=0;
    else
    {
        if((f1=fopen(buff2,"w")) == NULL)
        {
            erase();
            return(0);
        }
    }
    k=0;
    j=0;
    i=0;
    ch='C';
    while(ch != EOF)
    {
        while(((ch =fgetc(f1)) != EOF) && (ch != '\n'))
        {
            buff[i] = ch;
            i++;
        }
        buff[i] ='\0';
        if(k == 0)
            for(n=0;n<15&&buff[n]!='\0';n++)
                menu[j].title[n]=buff[n];
        if(k == 1)
            for(n=0;n<9&&buff[n]!='\0';n++)
                menu[j].call[n]=buff[n];
```

```
            if(k == 2)
                for(n=0;n<60&&buff[n]!='\0';n++)
                    menu[j].prompt[n]=buff[n];
            k++;
            if(k > 2)
            {
                k=0;
                j++;
            }
            i=0;     .
}
rewind(f1);
box(3,0,6,70,SINGLE,vc.dflt);
xatget(4,12,menu[0].title,"xxxxxxxxxxxxxx",NULLFUNC,
"Enter/Edit Chapter Heading <F7>Save/Exit <><>
<ESC>Quit",NULL,vc.dflt,vc.dflt);
xatget(4,47,menu[0].call,"XXXX",mnuchpt,
"Enter/Edit Unique Index Code <F7>Save/Exit <><>
<ESC>Quit",NULL,vc.dflt,vc.dflt);
xatget(5,12,menu[0].prompt,
"xxxxxxxxxxxxxxxxxxxxxxxxxxxxxxxxxxxxxxxxxxxxxxxxxx",NULLFUNC,
"Enter/Edit Prompt Window for Chapter <F7>Save/Exit <><>
<ESC>Quit",NULL,vc.dflt,vc.dflt);
xatsay(4,1, "Chapter 1.",vc.dflt);
xatsay(4,40,"Index: ",vc.dflt);
xatsay(5,1, "Prompt:",vc.dflt);

box(6,0,9,70,SINGLE,vc.dflt);
xatget(7,12,menu[1].title,"xxxxxxxxxxxxxx",NULLFUNC,
"Enter/Edit Chapter Heading <F7>Save/Exit <><>
<ESC>Quit",NULL,vc.dflt,vc.dflt);
xatget(7,47,menu[1].call,"XXXX",mnuchpt,
"Enter/Edit Unique Index Code <F7>Save/Exit <><>
<ESC>Quit",NULL,vc.dflt,vc.dflt);
xatget(8,12,menu[1].prompt,
"xxxxxxxxxxxxxxxxxxxxxxxxxxxxxxxxxxxxxxxxxxxxxxxxxx",NULLFUNC,
"Enter/Edit Prompt Window for Chapter <F7>Save/Exit <><>
<ESC>Quit",NULL,vc.dflt,vc.dflt);
xatsay(7,1,"Chapter 2.",vc.dflt);
xatsay(7,40,"Index: ",vc.dflt);
xatsay(8,1,"Prompt:",vc.dflt);

box(9,0,12,70,SINGLE,vc.dflt);
xatget(10,12,menu[2].title,"xxxxxxxxxxxxxx",NULLFUNC,
"Enter/Edit Chapter Heading <F7>Save/Exit <><>
<ESC>Quit",NULL,vc.dflt,vc.dflt);
xatget(10,47,menu[2].call,"XXXX",mnuchpt,
"Enter/Edit Unique Index Code <F7>Save/Exit <><>
<ESC>Quit",NULL,vc.dflt,vc.dflt);
xatget(11,12,menu[2].prompt,
"xxxxxxxxxxxxxxxxxxxxxxxxxxxxxxxxxxxxxxxxxxxxxxxxxx",NULLFUNC,
"Enter/Edit Prompt Window for Chapter <F7>Save/Exit <><>
<ESC>Quit",NULL,vc.dflt,vc.dflt);
xatsay(10,1,"Chapter 3.",vc.dflt);
xatsay(10,40,"Index:",vc.dflt);
xatsay(11,1,"Prompt:",vc.dflt);

box(12,0,15,70,SINGLE,vc.dflt);
xatget(13,12,menu[3].title,"xxxxxxxxxxxxxx",NULLFUNC,
"Enter/Edit Chapter Heading <F7>Save/Exit <><>
<ESC>Quit",NULL,vc.dflt,vc.dflt);
xatget(13,47,menu[3].call,"XXXX",mnuchpt,
"Enter/Edit Unique Index Code <F7>Save/Exit <><>
<ESC>Quit",NULL,vc.dflt,vc.dflt);
xatget(14,12,menu[3].prompt,
"xxxxxxxxxxxxxxxxxxxxxxxxxxxxxxxxxxxxxxxxxxxxxxxxxx",NULLFUNC,
"Enter/Edit Prompt Window for Chapter <F7>Save/Exit <><>
<ESC>Quit",NULL,vc.dflt,vc.dflt);
```

```
xatsay(13,1,"Chapter 4.",vc.dflt);
xatsay(13,40,"Index: ",vc.dflt);
xatsay(14,1,"Prompt:",vc.dflt);
box(15,0,18,70,SINGLE,vc.dflt);
xatget(16,12,menu[4].title,"xxxxxxxxxxxxxx",NULLFUNC,
"Enter/Edit Chapter Heading <F7>Save/Exit <><>
<ESC>Quit",NULL,vc.dflt,vc.dflt);
xatget(16,47,menu[4].call,"XXXX",mnuchpt,
"Enter/Edit Unique Index Code <F7>Save/Exit <><>
<ESC>Quit",NULL,vc.dflt,vc.dflt);
xatget(17,12,menu[4].prompt,
"xxxxxxxxxxxxxxxxxxxxxxxxxxxxxxxxxxxxxxxxxxxxxxxxxxx",NULLFUNC,
"Enter/Edit Prompt Window for Chapter <F7>Save/Exit <><>
<ESC>Quit",NULL,vc.dflt,vc.dflt);
xatsay(16,1,"Chapter 5.",vc.dflt);
xatsay(16,40,"Index: ",vc.dflt);
xatsay(17,1,"Prompt:",vc.dflt);
empty(chr,2);
chr[0]=fi;
readgets();
for(i=0;i<5;i++)
{
      trim(menu[i].title);
      fputs(menu[i].title,f1);
      fputc('\n',f1);
      trim(menu[i].call);
      fputs(menu[i].call,f1);
      fputc('\n',f1);
      trim(menu[i].prompt);
      fputs(menu[i].prompt,f1);
      fputc('\n',f1);
}
fclose(f1);
erase();
}

/*******************************************************************/
COUNT mnuchpt(str,gt)   /* No duplicate Document numbers allowed */
TEXT str[];
GETTABLE *gt;
{
      int a,b,numb;
      GETITEM *ptr = gt->head;
      for(numb=0,a=0,b=-1;a<15;a++)
      {
            if(!strcmp(str,ptr->tmpfld)&&ptr->tmpfld[0] != ' ')
            {
                  if(a==1)
                        b=0;
                  if(a==4)
                        b=1;
                  if(a==7)
                        b=2;
                  if(a==10)
                        b=3;
                  if(a==13)
                        b=4;
                  numb++;
            }
            ptr=ptr->next;
      }
      for(a=0;a<25;a++)
            if((!strcmp(str,menu1[a].call))&&(str[0]!='\0'))
                  numb++;
      for(a=0;a<5;a++)
```

```
            if(!strcmp(str,menu1[a].call)&&chr[0]=='1'&& b==a)
                    numb--;
        for(a=5;a<10;a++)
            if(!strcmp(str,menu1[a].call)&&chr[0]=='2'&& b==(a-5))
                    numb--;
        for(a=10;a<15;a++)
            if(!strcmp(str,menu1[a].call)&&chr[0]=='3'&& b==(a-10))
                    numb--;
        for(a=15;a<20;a++)
            if(!strcmp(str,menu1[a].call)&&chr[0]=='4'&& b==(a-15))
                    numb--;
        for(a=20;a<25;a++)
            if(!strcmp(str,menu1[a].call)&&chr[0]=='5'&& b==(a-20))
                    numb--;
        if(numb>1)
        {
                bell();
                w1=wxopen(10,20,13,60,NULL,ACTIVE+BORDER+BD1,0,0);
                atsay(0,11,"Duplicate Chapters");
                atsay(1,8,"Press any key to continue");
                ch=getone();
                wclose(w1);
                return(1);
        }
        else
                return(0);
}

/**************************************************************
File:      printdoc.c
***************************************************************
Object modules in file:

***************************************************************
Created By: Raymond T. Nygren
Date Created:   3/26/88
***************************************************************
Edited By:
Date Edited:
***************************************************************
Purpose:   print out document index

***************************************************************
Input:

***************************************************************
Output:

***************************************************************
Restrictions:

***************************************************************
Object modules called:
```

```c
/****************************************************************/
#include <vcstdio.h>
extern char index1[100][14];
extern struct vartyp {
      char pic[61];
      char func[10];
      char prompt[61];
      char field[13];
      };
extern struct vartyp var1[120]; /* Structure for variable menu */
extern struct vartyp var2; /* Structure for variable menu */
extern struct mnutyp {
      char title[20];
      char call[10];
      char prompt[60];
      };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
       idx(),mvced(),mainmnu(),prnform(),dentry(),bldmnu(),mtoggle();
     rn COUNT rw,sw,m1,m2,new;
     rn PFI setloop();
     rn PFI sethelp();
     rn PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int vdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/********************************************************************
  Create user defined index files
  and save to user.idx
*********************************************************************/
printdoc()
{
    int mmpik;
    char ret;
    char sdate[12],buff2[12],buff1[12];
    empty(sdate,12);
    getdate(sdate);
    trim(file);
    trim(doc);
    if(file[0] == '\0')
          return(0);
```

```
if(doc[0] == '\0')
    return(0);
strcpy(buff2,file);
trim(buff2);
strcat(buff2,".IDX");
n=strlen(buff2);
if(n == 4)
{
    wclose(rw);
    rw=wxopen(6,10,8,70,NULL,ACTIVE+CURSOR+BORDER+BD1,0,0);
    if(rw == -1)
        terror("Unable to open reference entry window");
    atsay(0,3,"No such Chapter exists ");
    ch=getone();
    atsay(0,3,"                              ");
    wclose(rw);
    erase();
    return(0);
}
if((f1=fopen(buff2,"r")) == NULL)
{
    wclose(rw);
    return(0);
}
for(i=0;i<50;i++)
{
    empty(var1[i].pic,61);
    empty(var1[i].func,10);
}
k=0;
j=0;
i=0;
ch='C';
while(ch != EOF)
{
    empty(buff,100);
    while(((ch =fgetc(f1)) != EOF) && (ch != '\n'))
    {
        buff[i]=ch;
        i++;
    }
    buff[i]='\0';
    trim(buff);
    strncpy(var1[j].func,buff,7);
    for(i=10,l=0;i<69&& buff[i]!='\0';i++,l++)
    var1[j].pic[l] = buff[i];
    j++;
    i=0;
}
fclose(f1);
for(i=0;i<50;i++)
{
    trim(var1[i].func);
    n=strlen(var1[i].func);
    m=7-n;
    for(j=0;j<m;j++)
    strcat(var1[i].func," ");
}
f1=fopen("prn","w");
fputs("                         OverDrive Library Report\n",f1);
fputs("                         Volume, Chapter & Document Index",f1)
fputs("\n\n",f1);
fputs(sdate,f1);
fputs("           Volume: ",f1);
fputs(doc,f1);
fputs("  Chapter: ",f1);
fputs(fil,f1);
```

```c
        fputs("\n\n",f1);
        for(i=0;i<50;i++)
        {
            if(var1[i].func[0] != ' ')
            {
                fputs("      ",f1);
                fputs(var1[i].func,f1);
                fputs("     ",f1);
                fputs(var1[i].pic,f1);
                fputc('\n',f1);
            }
        }
        fputc('\f',f1);
        fclose(f1);
        if(kbhit())
        {
            c=getone();
            if(c == ESC)
            {
                fclose(f2);
                flag0=1;
                wclose(rw);
                return(0);
            }
        }
        if(prnt[0] == 'M')
        {
            whide(rw);
            w1=wxopen(10,20,13,60,NULL,ACTIVE+BORDER+BD1,0,0);
            atsay(0,4,"Have Printer Ready for Next Page");
            atsay(1,0,"Press any key to continue or <ESC>Quit");
            ch=getone();
            wclose(w1);
            wshow(rw);
            if(ch == ESC)
            {
                fclose(f2);
                flag0=1;
                wclose(rw);
                return(0);
            }
        }

}
}

/*******************************************************************
File:     refdata.c
*********************************************************************
Object modules in file:

*********************************************************************
Created By: Raymond T. Nygren
Date Created:  3/26/88
*********************************************************************
Edited By:
Date Edited:
*********************************************************************
Purpose:  read in reference data

*********************************************************************
Input:
```

```
/*******************************************************************
Output:

*******************************************************************
Restrictions:

*******************************************************************
Object modules called:

*******************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
cd[50],wp[50],vol1[50],vol2[50],vol3[50],vol4[50],vol5[50],prnt[2],vers[4],
r[3];
extern struct VCED NODE *ednode,*vcedopen();
```

```c
/******************************************************************
    read in reference data
******************************************************************/
refdata()
{
    char ref1[13];
    int flg1,vcmfree();
    flg1=0;
    vselect(sw);
    atsay(0,0,"<F7>New Data <Shift-F7>Print Worksheet <Shift-F10>Retrieve
      Data <F8>Review");
retry:
    flag0=0;
    dflthlp("REFPICKDATA");
    while(keyrdy())
            getone();
    switch(getone())
    {
        case SF7 :
                atsay(0,0,"
");
                data=1;
                flg1=0;
                break;
        case SF10 :
                atsay(0,0,"
");
                data=1;
                flg1=1;
                break;
        case F7 :
                atsay(0,0,"
");
                flg1=1;
                data=0;
                break;
        case F8 :
                atsay(0,0,"
");
                flag0=1;
                flg1=1;
                data=0;
                break;
        case ESC :
                flag1=1;
                atsay(0,0,"
");
                return(0);
        default:
                bell();
                goto retry;
    }
    dflthlp("DEFAULT");

for(i=0,x=0;x<13;x++)
    {
        ref1[i]=ref[x];
        i++;
        if(ref[x] == 32)
                i--;
    }
    ref1[i]='\0';
    i=strlen(ref1);
    j=12-i;
    strcpy(ref,"");
    for(i=0;i<j;i++)
        strcat(ref," ");
    strcpy(ref,ref1);
```

```c
        if((f1=fopen(ref,"r")) == NULL)
        {
                w1=wxopen(4,4,10,60,NULL,ACTIVE,0,0);
                atsay(1,15,"Unable to find Reference file");
                atsay(4,15,"Press any key to continue");
                ch=getone();
                wclose(w1);
                return (0);
        }
        numsel=0;
        m=0;
        i=0;
        ch='C';
        j=0;
        while(ch != EOF)
        {
                empty(buff,100);
                while(((ch =fgetc(f1)) != EOF) && (ch != '\n')&&i<60)
                {
                        buff[i] = ch;
                        i++;
                }
                buff[i]='\0';
                if(buff[0] == '+')
                {
                        for(k=1;k<=i;k++)
                                index1[j][k-1]=buff[k];
                        numsel++;
                }
                if(buff[0] != '+'&& data == 1)
                {
                        if(buff[0]!=NULL && buff[0]!=' ')
                                for(k=0;k<60&&buff[k]!='\0';k++)
                                        edit[m][k]=buff[k];
                        m++;
                }
                strcpy(buff,"");
                j++;
                i=0;
        }
        fclose(f1);
        loadmenu();
        if(flg1 == 0)
        {
                form();
                prnform1();
        }
        if(flg1 == 1)
        {
                form();
                scrform();
                savref();
        }
        vcmfree(mainmenu);

}

/***********************************************************************
File:      idxmnu.c
************************************************************************
Object modules in file:

************************************************************************
Created By: Raymond T. Nygren
Date Created:  3/26/88
************************************************************************
```

Edited By:
Date Edited:
`*********************************************************************`
Purpose: library manager menu `*********************************************************************`
Input:

`*********************************************************************`
Output:

`*********************************************************************`
Restrictions:

`*********************************************************************`
Object modules called:

`*********************************************************************/`

```c
include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT savref(),idxmnu(),selmnu(),selmnu(),form(),scrform(),shsel(),called();
extern COUNT creatidx(),mvced(),mainmnu(),prnform(),dentry(),bldmnu(),mtoggle();
extern COUNT rw,sw,m1,m2,new;
```

```c
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*****************************************************************
   Create new menu catagories index file and variable file menu
*****************************************************************/
idxmnu()
{
    int newdoc();
    char ref[14];
    empty(ref,14);
idxtop:
    dflthlp("LIBRARY");
    wdo=wxopen(2,12,18,65,"OverDrive (tm)",
    ACTIVE+CENTER+BORDER+BD3,0,0);
    atsay(1,12,"Library & Document Manager");
    atsay(6,12,"1. Volume & Chapter Headings");
    atsay(7,12,"2. Document Name & Descriptions");
    atsay(8,12,"3. Document Field Information");
    atsay(9,12,"4. New Document Worksheet");
    atsay(10,12,"5. System Configuration");
    atsay(11,12,"6. Exit to MAIN MENU");
    wselect(sw);
    atsay(0,0,"Enter (1-6)    <F3>Help");
retry0:
    while(keyrdy())
        getone();
    switch(getone())
    {
        case '1':
            atsay(0,0,"                                  ");
            wclose(wdo);
            showvol();
            if(flag1 == 1)
            goto idxtop;
            creatmnu(ch);
            goto idxtop;
        case '2':
            atsay(0,0,"                                  ");
            wclose(wdo);
            creatidx();
            goto idxtop;
        case '3':
            atsay(0,0,"                                  ");
            wclose(wdo);
            creatvar();
            goto idxtop;
        case '4':
            atsay(0,0,"                                  ");
            wclose(wdo);
            newdoc();
            goto idxtop;
        case '5':
            atsay(0,0,"                                  ");
            wclose(wdo);
```

```
                setup();
                goto idxtop;
        case '6':
                atsay(0,0,"                                        ");
                wclose(wdo);
                return(0);
                break;
        case ESC :
                atsay(0,0,"                                        ");
                wclose(wdo);
                return(0);
                break;
                default:
                bell();
                goto retry0;
        }
        return(0);

}

/*********************************************************************
File:      idxmnu.c
**********************************************************************
Object modules in file:

**********************************************************************
Created By: Raymond T. Nygren
Date Created:  3/26/88
**********************************************************************
Edited By:
Date Edited:
**********************************************************************
Purpose:   Print out new document variable information worksheet

**********************************************************************
Input:

**********************************************************************
Output:

**********************************************************************
Restrictions:

**********************************************************************
Object modules called:

**********************************************************************/
newdoc()
{
        char num[3],buff6[12];
        loadchpt();
        if(file[0] == ' ')
                return(0);
```

```
if(doc[0] == ' ')
    return(0);
trim(file);
strcpy(buff6,file);
strcat(buff6,".IDX");
if((fl=fopen(buff6,"r")) != NULL)
    i=0;
w1=wxopen(10,20,14,60,NULL,ACTIVE+BORDER+BD1,0,0);
atsay(0,12,"Is Printer Ready ?");
atsay(1,12," <ESC> to Quit or");
atsay(2,8,"any other key to continue");
ch=getone();
wclose(w1);
if(ch==ESC)
    return(0);
for(i=0;i<50;i++)
{
    empty(var1[i].pic,61);
    empty(var1[i].func,3);
}
k=0;
j=0;
i=0;
ch='C';
while(ch != EOF)
{
    empty(buff,100);
    trim(buff);
    while(((ch =fgetc(fl)) != EOF) && (ch != '\n'))
    {
        buff[i]=ch;
        i++;
    }
    buff[i]='\0';
    if(buff[4]!='\0')
        var1[j].func[0] = buff[4];
    if(buff[5]!='\0')
        var1[j].func[1] = buff[5];
    if(buff[6]!='\0')
        var1[j].func[2] = buff[6];
    var1[j].func[3] = '\0';
    for(i=10,l=0;i<69&& buff[i]!='\0';i++,l++)
        var1[j].pic[l] = buff[i];
    j++;
    if(j>49)
        break;
    i=0;
}
fclose(fl);
wselect(w0);
for(i=0;i<50;i++)
    sscanf(var1[i].func,"%d",&mark[0][i]);
for(i=0,j=0;i<50;i++)
    if(mark[0][i]>j)
        j=mark[0][i];
for(i=0;i<50;i++)
    mark[0][i]=0;
empty(buff,100);
j++;
sprintf(buff,"%d",j);
strcat(file,buff);
if(!strcmp(doc,menu[0].title))
    strcpy(buff,vol1);
if(!strcmp(doc,menu[1].title))
    strcpy(buff,vol2);
if(!strcmp(doc,menu[2].title))
    strcpy(buff,vol3);
```

```
        if(!strcmp(doc,menu[3].title))
                strcpy(buff,vol4);
        if(!strcmp(doc,menu[4].title))
                strcpy(buff,vol5);
        strcat(buff,"\\");
        strcat(buff,file);
        strcat(buff,".PEP");
        if((f2=fopen("prn","w")) == NULL)
        {
                w1=wxopen(4,4,10,60,NULL,ACTIVE,0,0);
                atsay(1,18,"Printer not ready");
                atsay(4,15,"Press any key to continue");
                ch=getone();
                wclose(w1);
                wclose(rw);
                return(0);
        }
        fputs("                        OverDrive New Document
         Worksheet\n",f2);
        fputc('\n',f2);
        fputs("                Volume: ",f2);
        fputs(doc,f2);
        fputs("       Chapter: ",f2);
        fputs(fil,f2);
        fputc('\n',f2);
        fputs("                New Document Name: ",f2);
        fputs(buff,f2);
        fputc('\n',f2);
        fputc('\n',f2);
        fputs("     Steps to convert your WordPerfect Document:\n\n",f2);
        fputs("1. In WordPerfect press <Alt-O> for OverDrive Macro
Menu.\n\n",f2);
        fputs("2. Select <C>onvert a Document and press [Enter]. Follow
        Instructions \non the screen.\n\n",f2);
        fputs("3. Complete the field information for each ^F#^ you locate
in your document",f2);
        fputs("\non this worksheet.\n\n",f2);
        fputs("Field   Field           Data    Field   Prompt (up to 57
         characters)\n",f2);
        fputs("=       . Name          Type    Length  Description\n\n",f2);
        for(k=0;k<20;k++)
        {
                sprintf(num,"%d",(k+1));
                if(num[1]=='\0')
                        strcat(num," ");
                fputs(num,f2);
                fputc('\n',f2);
                fputs("    ------------    ----    ----    ----------------------
--------------------\n",f2);
        }
        fputs("\nData Types: <B>lock-<T>ext-<D>ate-<N>umber-<S>S#-<P>hone",f2)
        fputc('\f',f2);
        fclose(f2);
}

/******************************************************************
File:       scrform.c
*******************************************************************
Object modules in file:

*******************************************************************
Created By: Raymond T. Nygren
Date Created: 3/26/88
*******************************************************************
Edited By:
Date Edited:
*******************************************************************
Purpose:    create entry screen and output macro and merge files
```

```
***************************************************************
Input:

***************************************************************
Output:

***************************************************************
Restrictions:

***************************************************************
Object modules called:

***************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2;      /* Structure for variable menu */
extern struct mnutyp {
    char title[20];
    char call[10];
    char prompt[60];
    };
extern struct mnutyp menu[5];   /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm,newint;
extern TEXT *globstr;
extern COUNT data,globint;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
```

```c
extern int wdo,colors;
extern char
cd[50],wp[50],vol1[50],vol2[50],vol3[50],vol4[50],vol5[50],prnt[2],vers[4],
r[3];
extern struct VCED_NODE *ednode,*vcedopen();
/******************************************************************
   scrform creates a form on screen for unique variables and
   then creates merge files for each document
*******************************************************************/
scrform()
{
    int docnmb,w5,ret,e1,e2,e3,e4,e5,e6,e7,e8,e9,e10,e11,e12,
    chpt,numflds,valdate();
    char out1[16],out[16],head[68],file1[12],file2[12],file3[12],
    macfil[60],prime[60],sec[60];
    dflthlp("ENTRY");
    head[0]='\377';
    head[1]='\127';
    head[2]='\120';
    head[3]='\103';
    head[4]='\71';
    head[5]='\0';
    head[6]='\0';
    head[7]='\0';
    head[8]='\1';
    head[9]='\1';
    head[10]='\0';
    head[11]='\0';
    head[12]='\0';
    head[13]='\0';
    head[14]='\0';
    head[15]='\0';
    head[16]='\373';
    head[17]='\377';
    head[18]='\4';
    head[19]='\0';
    head[20]='\50';
    head[21]='\0';
    head[22]='\0';
    head[23]='\0';
    head[24]='\0';
    head[25]='\0';
    head[26]='\1';
    head[27]='\0';
    head[28]='\1';
    head[29]='\0';
    head[30]='\0';
    head[31]='\0';
    head[32]='\70';
    for(i=0,j=33;i<24;i++,j++)
         head[j]='\0';
    head[57]='\14';
    head[58]='\374';
    head[59]='\46';
    head[60]='\200';
    head[61]='\156';
    head[62]='\0';
    head[63]='\156';
    head[64]='\0';
    head[65]='\65';
    head[66]='\200';
    head[67]='\0';
    if(numfld == 1)
         return;
    if(flag0==1)
    {
         for(i=0;i<(numfld-1);i++)
         {
```

```c
            strcpy(edit[i],"[");
            strcat(edit[i],var1[i].field);
            strcat(edit[i],"]");
            if(!strcmp(var1[i].pic,
        "Xxxxxxxxxxxxxxxxxxxxxxxxxxxxxxxxxxxxxxxxxxxxxxxx"))
            strcpy(edit[i],"BLOCK");
        }
        goto skip_entry;
    }
    e1=wxopen(1,2,21,79,"OverDrive Entry Window  Page
     1",CURSOR+BORDER+BD1,0,0);
    whide(e1);
    if(numfld >10)
    {
        e2=wxopen(1,2,21,79,"OverDrive Entry Window  Page
         2",CURSOR+BORDER+BD1,0,0);
        whide(e2);
    }
    if(numfld >20)
    {
        e3=wxopen(1,2,21,79,"OverDrive Entry Window  Page
         3",CURSOR+BORDER+BD1,0,0);
        whide(e3);
    }
    if(numfld >30)
    {
        e4=wxopen(1,2,21,79,"OverDrive Entry Window  Page
         4",CURSOR+BORDER+BD1,0,0);
        whide(e4);
    }
    if(numfld >40)
    {
        e5=wxopen(1,2,21,79,"OverDrive Entry Window  Page
         5",CURSOR+BORDER+BD1,0,0);
        whide(e5);
    }
    if(numfld >50)
    {
        e6=wxopen(1,2,21,79,"OverDrive Entry Window  Page
         6",CURSOR+BORDER+BD1,0,0);
        whide(e6);
    }
    if(numfld >60)
    {
        e7=wxopen(1,2,21,79,"OverDrive Entry Window  Page
         7",CURSOR+BORDER+BD1,0,0);
        whide(e7);
    }
    if(numfld >70)
    {
        e8=wxopen(1,2,21,79,"OverDrive Entry Window  Page
         8",CURSOR+BORDER+BD1,0,0);
        whide(e8);
    }
    if(numfld >80)
    {
        e9=wxopen(1,2,21,79,"OverDrive Entry Window  Page
         9",CURSOR+BORDER+BD1,0,0);
        whide(e9);
    }
    if(numfld >90)
    {
        e10=wxopen(1,2,21,79,"OverDrive Entry Window  Page
         10",CURSOR+BORDER+BD1,0,0);
        whide(e10);
    }
    if(numfld >100)
    {
```

```
        e11=wxopen(1,2,21,79,"OverDrive Entry Window  Page
        11",CURSOR+BORDER+BD1,0,0);
        whide(e11);
    }
    if(numfld >110)
    {
        e12=wxopen(1,2,21,79,"OverDrive Entry Window  Page
        12",CURSOR+BORDER+BD1,0,0);
        whide(e12);
    }
    /* loop for number of unique fields  */ for (s=0,q=0;q<10;q++)
    {
        if(q>=numfld)
            break;
        wselect(e1);
        if(!strcmp(var1[q].func,"NULLFUNC"))
            xxatget(vcdgt,e1,s,15,edit[q],var1[q].pic,NULLFUNC,
            var1[q].prompt,NULL,vc.dflt,vc.dflt);
        if(!strcmp(var1[q].func,"valdate"))
        {
            edit[q][8]='\0';
            xxatget(vcdgt,e1,s,15,edit[q],"99/99/99",valdate,
            var1[q].prompt,NULL,vc.dflt,vc.dflt);
        }
        xatsay(s,1,var1[q].field,vc.dflt);
        s=s+2;
    }
    for(s=0,q=10;q<20;q++)
    {
        if(q>=numfld)
            break;
        wselect(e2);
        if(!strcmp(var1[q].func,"NULLFUNC"))
            xxatget(vcdgt,e2,s,15,edit[q],var1[q].pic,NULLFUNC,var1[q].p
mpt,
            NULL,vc.dflt,vc.dflt);
        if(!strcmp(var1[q].func,"valdate"))
        {
            edit[q][8]='\0';
            xxatget(vcdgt,e2,s,15,edit[q],"99/99/99",valdate,var1[q].pro
t,
            NULL,vc.dflt,vc.dflt);
        }
        xatsay(s,1,var1[q].field,vc.dflt);
        s=s+2;
    }
    for (s=0,q=20;q<30;q++)
    {
        if(q>=numfld)
            break;
        wselect(e3);
        if(!strcmp(var1[q].func,"NULLFUNC"))
            xxatget(vcdgt,e3,s,15,edit[q],var1[q].pic,NULLFUNC,var1[q].p
mpt,
            NULL,vc.dflt,vc.dflt);
        if(!strcmp(var1[q].func,"valdate"))
        {
            edit[q][8]='\0';
            xxatget(vcdgt,e3,s,15,edit[q],"99/99/99",valdate,var1[q].pro
t,
            NULL,vc.dflt,vc.dflt);
        }
        xatsay(s,1,var1[q].field,vc.dflt);
        s=s+2;
    }
    for(s=0,q=30;q<40;q++)
```

```
            {
                if(q>=numfld)
                    break;
                wselect(e4);
                if(!strcmp(var1[q].func,"NULLFUNC"))
                    xxatget(vcdgt,e4,s,15,edit[q],var1[q].pic,NULLFUNC,var1[q].p
mpt,
                    NULL,vc.dflt,vc.dflt);
                if(!strcmp(var1[q].func,"valdate"))
                {
                    edit[q][8]='\0';
                    xxatget(vcdgt,e4,s,15,edit[q],"99/99/99",valdate,var1[q].pro
t,
                    NULL,vc.dflt,vc.dflt);
                }
                xatsay(s,1,var1[q].field,vc.dflt);
                s=s+2;
            }
            for(s=0,q=40;q<50;q++)
            {
                if(q>=numfld)
                    break;
                wselect(e5);
                if(!strcmp(var1[q].func,"NULLFUNC"))
                    xxatget(vcdgt,e5,s,15,edit[q],var1[q].pic,NULLFUNC,var1[q].p
mpt,
                    NULL,vc.dflt,vc.dflt);
                if(!strcmp(var1[q].func,"valdate"))
                {
                    edit[q][8]='\0';
                    xxatget(vcdgt,e5,s,15,edit[q],"99/99/99",valdate,var1[q].pro
t,
                    NULL,vc.dflt,vc.dflt);
                }
                xatsay(s,1,var1[q].field,vc.dflt);
                s=s+2;
            }
            for (s=0,q=50;q<60;q++)
            {
                if(q>=numfld)
                    break;
                wselect(e6);
                if(!strcmp(var1[q].func,"NULLFUNC"))
                    xxatget(vcdgt,e6,s,15,edit[q],var1[q].pic,NULLFUNC,var1[q].p
mpt,
                    NULL,vc.dflt,vc.dflt);
                if(!strcmp(var1[q].func,"valdate"))
                {
                    edit[q][8]='\0';
                        xxatget(vcdgt,e6,s,15,edit[q],"99/99/99",valdate,var1[q
prompt,
                    NULL,vc.dflt,vc.dflt);
                }
                xatsay(s,1,var1[q].field,vc.dflt);
                s=s+2;
            }
            for(s=0,q=60;q<70;q++)
            {
                if(q>=numfld)
                    break;
                wselect(e7);
                if(!strcmp(var1[q].func,"NULLFUNC"))
                    xxatget(vcdgt,e7,s,15,edit[q],var1[q].pic,NULLFUNC,var1[q].p
mpt,
                    NULL,vc.dflt,vc.dflt);
                if(!strcmp(var1[q].func,"valdate"))
                {
                    edit[q][8]='\0';
                    xxatget(vcdgt,e7,s,15,edit[q],"99/99/99",valdate,var1[q].pro
```

```
                        NULL,vc.dflt,vc.dflt);
                }
                xatsay(s,1,var1[q].field,vc.dflt);
                s=s-2;
        }
        for(s=0,q=70;q<80;q++)
        {
                if(q>=numfld)
                        break;
                wselect(e8);
                if(!strcmp(var1[q].func,"NULLFUNC"))
                xxatget(vcdgt,e8,s,15,edit[q],var1[q].pic,NULLFUNC,var1[q].prompt
t,
                NULL,vc.dflt,vc.dflt);
                if(!strcmp(var1[q].func,"valdate"))
                {
                        edit[q][8]='\0';
                        xxatget(vcdgt,e8,s,15,edit[q],"99/99/99",valdate,var1[q].pro
t,
                        NULL,vc.dflt,vc.dflt);
                }
                xatsay(s,1,var1[q].field,vc.dflt);
                s=s+2;
        }
        for(s=0,q=80;q<90;q++)
        {
                if(q>=numfld)
                        break;
                wselect(e9);
                if(!strcmp(var1[q].func,"NULLFUNC"))
                        xxatget(vcdgt,e9,s,15,edit[q],var1[q].pic,NULLFUNC,var1[q].p
mpt,
                NULL,vc.dflt,vc.dflt);
                if(!strcmp(var1[q].func,"valdate"))
                {
                        edit[q][8]='\0';
                        xxatget(vcdgt,e9,s,15,edit[q],"99/99/99",valdate,var1[q].pro
t,
                        NULL,vc.dflt,vc.dflt);
                }
                xatsay(s,1,var1[q].field,vc.dflt);
                s=s+2;
        }
        for(s=0,q=90;q<100;q++)
        {
                if(q>=numfld)
                        break;
                wselect(e10);
                if(!strcmp(var1[q].func,"NULLFUNC"))
                        xxatget(vcdgt,e10,s,15,edit[q],var1[q].pic,NULLFUNC,var1[q].
ompt,
                NULL,vc.dflt,vc.dflt);
                if(!strcmp(var1[q].func,"valdate"))
                {
                        edit[q][8]='\0';
                        xxatget(vcdgt,e10,s,15,edit[q],"99/99/99",valdate,var1[q].pr
pt,
                        NULL,vc.dflt,vc.dflt);
                }
                xatsay(s,1,var1[q].field,vc.dflt);
                s=s+2;
        }
        for(s=0,q=100;q<110;q++)
        {
                if(q>=numfld)
                        break;
                wselect(e11);
                if(!strcmp(var1[q].func,"NULLFUNC"))
```

```
                    xxatget(vcdgt,e11,s,15,edit[q],var1[q].pic,NULLFUNC,var1[q].
ompt,
                    NULL,vc.dflt,vc.dflt);
            if(!strcmp(var1[q].func,"valdate"))
            {
                    edit[q][8]='\0';
                    xxatget(vcdgt,e11,s,15,edit[q],"99/99/99",valdate,var1[q].pr
pt,
                    NULL,vc.dflt,vc.dflt);
            }
            xatsay(s,1,var1[q].field,vc.dflt);
            s=s+2;
    }
    for(s=0,q=110;q<120;q++)
    {
            if(q>=numfld)
                    break;
            wselect(e12);
            if(!strcmp(var1[q].func,"NULLFUNC"))
                    xxatget(vcdgt,e12,s,15,edit[q],var1[q].pic,NULLFUNC,var1[q].
ompt,
                    NULL,vc.dflt,vc.dflt);
            if(!strcmp(var1[q].func,"valdate"))
            {
                    edit[q][8]='\0';
                    xxatget(vcdgt,e12,s,15,edit[q],"99/99/99",valdate,var1[q].pr
                    NULL,vc.dflt,vc.dflt);
            }
            xatsay(s,1,var1[q].field,vc.dflt);
            s=s+2;
    }
    wshow(e12);
    wshow(e11);
    wshow(e10);
    wshow(e9);
    wshow(e8);
    wshow(e7);
    wshow(e6);
    wshow(e5);
    wshow(e4);
    wshow(e3);
    wshow(e2);
    wshow(e1);
    ret=readgets();
    wclose(e1);
    if(numfld >10)
            wclose(e2);
    if(numfld >20)
            wclose(e3);
    if(numfld >30)
            wclose(e4);
    if(numfld >40)
            wclose(e5);
    if(numfld >50)
            wclose(e6);
    if(numfld >60)
            wclose(e7);
    if(numfld >70)
            wclose(e8);
    if(numfld >80)
            wclose(e9);
    if(numfld >90)
            wclose(e10);
    if(numfld >100)
            wclose(e11);
    if(numfld >110)
            wclose(e12);
```

```
        if(ret == ESC)
            return(0);
skip_entry:
    w5=wxopen(11,20,13,60,NULL,ACTIVE+BORDER+BD1,0,0);
    atsay(0,8,"Writing Merge & Macro Files");
    docnmb=1;
    strcpy(buff,wp);
    strcat(buff,"\\doc.lis");
    f1=fopen(buff,"w"); /* open document list file */
    for(chpt=0;chpt<25;chpt++) /* loop for number of chapters */
    {
            for(numdoc=0;numdoc<sel[chpt];numdoc++) /* loop for number of sel
doc. in chpt */
            {
                for(numflds=0,m=1;m<50;m++) /*number of fields in document *
                {
                    numflds++;
                    if(fldindx[chpt][numdoc][m] == 0)
                            break;
                }
                empty(file,12);
                empty(file1,12);
                empty(file2,12);
                empty(file3,12);
                empty(macfil,60);
                empty(prime,60);
                empty(sec,60);
                strcpy(file,docu[chpt][numdoc]); /* current document */
                trim(file);
                sprintf(out,"%d",docnmb);
                docnmb++;
                stropy(macfil,wp);
                strcat(macfil,"\\");
                strcat(macfil,out);
                strcpy(file1,out);
                if(vers[0] != '5')
                     strcat(macfil,".MAC");
                else
                     strcat(macfil,".WPM");
                strcat(out,".MRG");
                strcat(file1,". ");
                strcat(file1,file);
                fputs(file1,f1);
                fputc('\n',f1);
                if((f2=fopen(out,"wb")) == NULL) /* open merge file */
                {
                    wclose(w5);
                    atsay(4,15,"Unable to open                              2ndar
merge file");
                    atsay(4,30,out);
                    atsay(5,15,"Press any key to continue");
                    c=getche();
                    atsay(4,15,"
");
                    atsay(5,15,"                                             ");
                    return(0);
                }
                for(j=0;j<numflds;j++)
                {
                    k = fldindx[chpt][numdoc][j]; /*index in common field
array */
                    strcpy(buff,edit[k-1]);
                    trim(buff);
                    l=strlen(buff);
                    if((!strcmp(var1[k-1].pic,
"Xxxxxxxxxxxxxxxxxxxxxxxxxxxxxxxxxxxxxxxxxxxx
```

```
xxxx"))
                          && l==0)
                              goto skipsp;
                          if(l == 0 )
                          {
                              empty(buff,100);
                              trim(buff);
                              strcpy(buff,"[ ]");
                              l=3;
                          }
skipsp:
                          buff[l] = '\022';/*cntrl-R */
                          l++;
                          for(q=0; q<l; q++)
                              ch=fputc(buff[q],f2);
                          putc('\012',f2);     /* line feed   */
                  }
                  fputc('\5',f2); /* cntrl-E  */
                  fclose(f2);
                  if(.(f4=fopen(macfil,"wb")) == NULL) /* open macro file */
                  {
                      wclose(w5);
                      atsay(4,15,"Unable to open                       Single
MAC file");
                      atsay(4,30,macfil);
                      atsay(5,15,"Press any key to continue");
                      c=getche();
                      atsay(4,15,"                                                       85
");
                      atsay(5,15,"                                       ");
                      return(0);
                  }
                  if(chpt < 5)
                      strcpy(prime,vol1);
                  if(chpt >4 && chpt<10)
                      strcpy(prime,vol2);
                  if(chpt >9 && chpt<15)
                      strcpy(prime,vol3);
                  if(chpt >14 && chpt<20)
                      strcpy(prime,vol4);
                  if(chpt >19 && chpt<25)
                      strcpy(prime,vol5);
                  strcat(prime,"\\");
                  strcat(prime,file);
                  trim(prime);
                  strcat(prime,".PEP");
                  if(vers[0] != '5')
                  {
                      fputc('\353',f4);
                      fputc('\156',f4);
                      fputc('\156',f4);
                      fputc('\242',f4);
                      fputc('\061',f4);
                      fputs(prime,f4);
                      fputc('\012',f4);
                      strcpy(sec,od);
                      strcat(sec,"\\");
                      strcat(sec,out);
                      fputs(sec,f4);
                      fputc('\012',f4);
                  }
                  else
                  {
                      for(i=0;i<67;i++)
                          fputc(head[i],f4);
                      strcpy(sec,od);
                      strcat(sec,"\\");
                      strcat(sec,out);
```

```c
            for(i=0;i<60,sec[i]!='\0';i++)
            {
                fputc(sec[i],f4);
                fputc('\0',f4);
            }
            fputc('\12',f4);
            fputc('\200',f4);
            fputc('\46',f4);
            fputc('\200',f4);
            fputc('\12',f4);
            fputc('\200',f4);
            fputc('\15',f4);
            fputc('\0',f4);
            fputc('\12',f4);
            fputc('\200',f4);
            fputc('\171',f4);
            fputc('\0',f4);
            fputc('\156',f4);
            fputc('\0',f4);
            fputc('\114',f4);
            fputc('\200',f4);
            fputc('\61',f4);
            fputc('\0',f4);
            for(i=0;i<60,prime[i]!='\0';i++)
            {
                fputc(prime[i],f4);
                fputc('\0',f4);
            }
            fputc('\12',f4);
            fputc('\200',f4);
            fputc('\15',f4);
            fputc('\0',f4);
            for(i=0;i<60,sec[i]!='\0';i++)
            {
                fputc(sec[i],f4);
                fputc('\0',f4);
            }
            fputc('\12',f4);
            fputc('\200',f4);
            fputc('\15',f4);
            fputc('\374',f4);
            fputc('\10',f4);
            fputc('\200',f4);
            fputc('\10',f4);
            fputc('\200',f4);
            fputc('\27',f4);
            fputc('\200',f4);
            fputc('\0',f4);
            fputc('\0',f4);
        }
        fclose(f4);
skip:
        n=0;
        }
    }
    fclose(f2);
    fclose(f1);
    empty(macfil,60);
    strcpy(macfil,wp);
    strcat(macfil,"\\");
    if(vers[0] != '5')
        strcat(macfil,"AOD.MAC");
    else
        strcat(macfil,"AOD.WPM");
    if((f1=fopen(macfil,"wb")) == NULL)  /* open chain macro file  */
    {
        wclose(w5);
```

```
            atsay(4,15,"Unable to open AOD.MAC file");
            atsay(5,15,"Press any key to continue");
            c=getche();
            atsay(4,15,"                                              ");
            atsay(5,15,"                                    ");
        }
        if(vers[0] != '5')
        {
            empty(macfil,60);
            strcpy(macfil,wp);
            strcat(macfil,"\\");
            strcat(macfil,"RESET.MAC");
            if((f2=fopen(macfil,"wb")) == NULL) /* open macro file   */
            {
                wclose(w5);
                atsay(4,15,"Unable to open RESET.MAC file");
                atsay(5,15,"Press any key to continue");
                c=getche();
                atsay(4,15,"                                              ");
                atsay(5,15,"                                    ");
            }
        }
    numdoc=0;
    for(i=0;i<25;i++)
            if(index1[i][0]!=' ' && index1[i][0]!='\0')
                    numdoc++;
    docnmb=1;
    for(i=0;i<numdoc;i++)
    {
            sprintf(out1,"%d",docnmb);
            docnmb++;
            if(vers[0] != '5')   /* Version 4.XX   */
            {
                    empty(macfil,60);
                    strcpy(macfil,wp);
                    strcat(macfil,"\\");
                    strcat(macfil,out1);
                    strcat(macfil,".LNK");
                    if((f4=fopen(macfil,"wb")) == NULL) /* open LNK file  */
                    {
                            wclose(w5);
                            atsay(4,15,"Unable to open            LINK file");
                            atsay(4,30,macfil);
                            atsay(5,15,"Press any key to continue");
                            c=getche();
                            atsay(4,15,"                                              
");
                            atsay(5,15,"                                    ");
                    }
                    fputc('\024',f4);
                    fputc('\007',f4);
                    if(i == (numdoc-1))
                            fputs("RESET",f4);
                    else
                    {
                            sprintf(out,"%d",docnmb);
                            strcat(out,".MAC");
                            fputs(out,f4);
                    }
                    fputc('\007',f4);
                    fclose(f4);
            }
/*****************************************************/
            empty(file1,12);
            strncpy(file1,index1[i],4);
            trim(file1);
```

```c
        for(j=0;j<25;j++)
            if(!strcmp(file1,menu1[j].call))    /*get chapter  */
                chpt=j;
        if(chpt < 5)                            /* get volume   */
            strcpy(prime,vol1);
        if(chpt >4 && chpt<10)
            strcpy(prime,vol2);
        if(chpt >9 && chpt<15)
            strcpy(prime,vol3);
        if(chpt >14 && chpt<20)
            strcpy(prime,vol4);
        if(chpt >19 && chpt<25)
            strcpy(prime,vol5);
        strcat(prime,"\\");
        strcat(prime,index1[i]);   /* add document to path  */
        trim(prime);
        strcat(prime,".PEP");      /* creat primary merge file path */
        trim(prime);
/***********************************************************/
/*      OUTPUT CHAIN FILE                                  */
/***********************************************************/
        if(vers[0] != '5')/* Below Version 5.0   */
        {
            if(i==0)
            {
                fputc('\353',f1);
                fputc('\156',f1);
                fputc('\156',f1);
            }
            fputc('\351',f1);
            fputs(prime,f1);
            fputc('\012',f1);
            fputc('\361',f1);
            fputc('\017',f1);
            fputc('\017',f1);
            fputc('\361',f1);
            fputc('\031',f1);
            fputc('\031',f1);
            fputc('\366',f1);
            fputc('\010',f1);
            fputc('\010',f1);
            fputc('\032',f1);
            fputc('\222',f1);
            fputc('\171',f1);
            fputc('\351',f1);
            trim(out1);
            fputs(out1,f1);
            fputs(".LNK",f1);
            fputc('\012',f1);
            fputc('\353',f1);
            fputc('\012',f1);
            fputc('\012',f1);
            fputc('\171',f1);
            fputc('\012',f1);
        }
        else /*  Version 5.0 and above   */
        {
            if(i==0)
            {
                for(j=0;j<67;j++)
                    fputc(head[j],f1);
            }
            strcpy(sec,od);
            strcat(sec,"\\");
            strcat(sec,out1);
            strcat(sec,".MRG");
            trim(sec);
            for(j=0;j<60,sec[j]!='\0';j++)
```

```c
{
    fputc(sec[j],f1);
    fputc('\0',f1);
}
fputc('\12',f1);
fputc('\200',f1);
fputc('\46',f1);
fputc('\200',f1);
fputc('\12',f1);
fputc('\200',f1);
fputc('\15',f1);
fputc('\0',f1);
fputc('\12',f1);
fputc('\200',f1);
fputc('\171',f1);
fputc('\0',f1);
fputc('\156',f1);
fputc('\0',f1);
fputc('\114',f1);
fputc('\200',f1);
fputc('\61',f1);
fputc('\0',f1);
for(j=0;j<60,prime[j]!='\0';j++)
{
    fputc(prime[j],f1);
    fputc('\0',f1);
    fputc('\12',f1);
    fputc('\200',f1);
    fputc('\15',f1);
    fputc('\0',f1);
    for(j=0;j<60,sec[j]!='\0';j++)
    {
        fputc(sec[j],f1);
        fputc('\0',f1);
    }
    if((i+1)!=numdoc)
    {
        fputc('\12',f1);        /* code to call next one */
        fputc('\200',f1);
        fputc('\10',f1);
        fputc('\200',f1);
        fputc('\10',f1);
        fputc('\200',f1);
        fputc('\27',f1);
        fputc('\200',f1);
        fputc('\14',f1);
        fputc('\374',f1);
        fputc('\62',f1);
        fputc('\200',f1);
        fputc('\61',f1);
        fputc('\0',f1);
        fputc('\12',f1);
        fputc('\200',f1);
        fputc('\46',f1);
        fputc('\200',f1);
        fputc('\156',f1);
        fputc('\0',f1);
        fputc('\156',f1);
        fputc('\0',f1);
        fputc('\14',f1);
        fputc('\374',f1);
        fputc('\65',f1);
        fputc('\200',f1);
        fputc('\15',f1);
        fputc('\0',f1);
    }
    else
    {
```

```c
                    fputc('\12',f1);        /* Last one to call menu */
                    fputc('\200',f1);
                    fputc('\14',f1);
                    fputc('\374',f1);
                    fputc('\15',f1);
                    fputc('\0',f1);
                    fputc('\62',f1);
                    fputc('\200',f1);
                    fputc('\61',f1);
                    fputc('\0',f1);
                    fputc('\12',f1);
                    fputc('\200',f1);
                    fputc('\46',f1);
                    fputc('\200',f1);
                    fputc('\156',f1);
                    fputc('\0',f1);
                    fputc('\156',f1);
                    fputc('\0',f1);
                    fputc('\15',f1);
                    fputc('\374',f1);
                    fputc('\117',f1);
                    fputc('\376',f1);
                    fputc('\0',f1);
                    fputc('\0',f1);
            }
        }
/***********************************************************/
/*      OUTPUT RESET FILE
*/
/***********************************************************/
        if(vers[0] != '5')
        {
                fputc('\351',f2);
                fputs(prime,f2);
                fputc('\012',f2);
                fputc('\361',f2);
                fputc('\024',f2);
                fputc('\007',f2);
                fputc('\361',f2);
                fputc('\031',f2);
                fputc('\031',f2);
                fputc('\366',f2);
                fputc('\010',f2);
                fputc('\010',f2);
                fputc('\032',f2);
                fputc('\222',f2);
                fputc('\171',f2);
                fputc('\351',f2);
                fputs("ENDMARK.TXT",f2);
                fputc('\012',f2);
                fputc('\353',f2);
                fputc('\012',f2);
                fputc('\012',f2);
                fputc('\171',f2);
                fputc('\012',f2);
                fputc('\350',f2);
                fputc('\141',f2);
                fputc('\154',f2);
                fputc('\164',f2);
                fputc('\157',f2);
                fputc('\012',f2);
        }
    }
    fputc('\350',f1);
    fputs("1.MAC",f1);
    fputc('\012',f1);
```

```
    fclose(f1);
    fclose(f2);
    wclose(w5);
    return(0);
}

/***********************************************************************.
File:     savref.c
***********************************************************************
Object modules in file:

***********************************************************************
Created By: Raymond T. Nygren
Date Created:  3/26/88
***********************************************************************
Edited By:
Date Edited:
***********************************************************************
Purpose:   save reference and check to see if there already

***********************************************************************
Input:

***********************************************************************
Output:

***********************************************************************
Restrictions:

***********************************************************************
Object modules called:

***********************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
    char call[10];
    char prompt[60];
    };
extern struct mnutyp menu[5]; /* Structure form volume menu */
extern struct mnutyp menu1[25]; /* Structure for chapter menus   */
extern int flag1,flag0,numfld,numdoc;
extern char chr[2],buffer[12];
extern char edit[120][61],file[13];
```

```c
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/****************************************************************
Save reference file
****************************************************************/
savref()
{
    flag1=0;
    dflthlp("SAVEREF");
    vselect(sw);
    atsay(0,0,"<F7>Save Reference <F8>Save Reference & Data
    <F3>Help <ESC>Main Menu/Done");
retry1:
    while(keyrdy())
        getone();
    switch(getone())
    {
                data=0;
                break;
        case F8 :
                atsay(0,0,"                .--
");
                refentry();
                data=1;
                break;
        case ESC :
                atsay(0,0,"
");
                return(0);
                break;
                default:
                bell();
                goto retry1;
    } if(flag1==1)
        return(0);
    if((f1=fopen(ref,"w")) == NULL)
    {
```

```
            w1-wxopen(10,20,13,60,NULL,ACTIVE,0,0);
            atsay(0,3,"unable to save Reference file");
            atsay(1,6,"Press any key to continue");
            ch=getone();
            wclose(w1);
        }
        for(i=0;i<numsel;i++)
        {
            strcpy(buff,"+");
            strcat(buff,index1[i]);
            for(j=0;j<8;j++)
            fputc(buff[j],f1);
            fputc('\n',f1);
        }
        if(data == 1)
        {
            for(i=0;i<(numfld-1);i++)
            {
                trim(edit[i]);
                fputs(edit[i],f1);
                fputc('\n',f1);
            }
        }
        fclose(f1);
        wclose(m2);
        return(0);
    }
```

```
/*******************************************************************/
File:    mvced.c
*********************************************************************
Object modules in file:

*********************************************************************
Created By: Raymond T. Nygren
Date Created:  3/26/88
*********************************************************************
Edited By:
Date Edited:
*********************************************************************
Purpose:  Vitamin C editor

*********************************************************************
Input:

*********************************************************************
Output:

*********************************************************************
Restrictions:

*********************************************************************
Object modules called:
```

```c
/****************************************************************/
#include <vcstdio.h>
extern char index1[100][14];
extern struct vartyp {
      char pic[61];
      char func[10];
      char prompt[61];
      char field[13];
      };
extern struct vartyp var1[120]; /* Structure for variable menu */
extern struct vartyp var2; /* Structure for variable menu */
extern struct mnutyp {
      char title[20];
      char call[10];
      char prompt[60];
};
extern struct mnutyp menu[5]; /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[70],wp[50],vol1[50],vol2[50],vol3[50],vol4[50],vol5[50],prnt[2],vers[4],
r[3];
extern struct VCED_NODE *ednode,*vcedopen();
/****************************************************************
 summary editor
****************************************************************/
mvced(file)
      char file[20];
{
      FILE *fopen();
      PFI setkeyfunc();
      COUNT vcprokey();
      COUNT prted(),tsthook1(),n;
      COUNT ret,ans=0,bytes=0,wno,ch,tmpch,prevsoft;
      TEXT *cp,textch,msg[64];
      dflthlp("NOTEPAD");
      if(!strcmp(file,NULL))
            terror("No filename given");
```

```c
    watsay(sw,0,0,"<F7>Save/Exit <F3>Help <Ins>Insert/Typeover
<PgUp-Dn> <Shift-F7> Print");
    ednode=vcedopen(5,10,21,79,2000);
    setkeyfunc(vcprokey);
    addprokey(SF7,prted,NULL);
    delprokey(F9);
    if( ednode==NULL )
    {
        sprintf(msg,"can't open editor.   error %d",vcerrno);
        terror(msg);
    }
    ednode->key.justmode=F5;
    ednode->key.hibit=F9;
    if( vcedload(ednode,file) )
    {
        ret=vcedclose(ednode);
        delprokey(SF7);
        return(0);
    }
    vcehook1=tsthook1;
    vced(ednode);
    xatsay(0,0,"SAVE FILE TO DISK? y/n",attrag);
    ret=getyn(0);
    if( ret == 'Y' || ret == 'y' )
        vcedsave(ednode,file);
    if( (ret=vcedclose(ednode)) )
    {
        sprintf(msg,"error %d closing editor",vcerrno);
        terror(msg);
    }
    delprokey(SF7);
    dflthlp("INDEX");
    watsay(sw,0,0,"<>To Select<>[ENTER]    <ESC>Prior Menu
<F3>Help   <F7>Done                     ");
    addprokey(F9,shsel,NULL);
    return(0);
}
/*******************************************************************/
tsthook1(ednode)
VCED *ednode;
{
    sprintf(ednode->wptr->title,"Line:%4d   Col:%3d    FC=%d ",
    ednode->row+1,
    ednode->col+1,
    ednode->bufndx);
    if( ednode->insert )
        strcat(ednode->wptr->title,"Insert   ");
    else
        strcat(ednode->wptr->title,"Typeover");
    if( ednode->justify )
        strcat(ednode->wptr->title,"  Justify");
    else
        strcat(ednode->wptr->title,"  Ragged ");
    wborder(ednode->wno,-1);
    wrefrsh(ednode->wno,-1,0);
    return(0);
}
/*******************************************************************/
prted()
{
    TEXT *ptr;
    int wdo,prevwdo;
    prevwdo=wcurrent;
    fl=fopen("prn","w");
    if(fl==NULL)
        return(0);
    wdo=wxopen(ednode->wptr->lower_r,ednode->wptr->upper_c,
    ednode->wptr->lower_r,ednode->wptr->lower_c,NULL,CURSOR+NOADJ,0,0);
```

```c
    atsay(0,0,"Printing file");
    wshow(wdo);
    ptr=ednode->buf;
    fputs("\n\n\n\n",f1);
    fputs("\n          ",f1);
    while( *ptr != 0x1A )
    {
        if(*ptr == NLH || *ptr == NLS )
            fputs("\n          ",f1);
        else
            fputc(*ptr,f1);
        ptr++;
    }
    fputc('\f',f1);
    fclose(f1);
    wclose(wdo);
    wselect(prevwdo);
    return(0);
}
/*******************************************************************
File:     refentry.c
*******************************************************************
Object modules in file:

*******************************************************************
Created By: Raymond T. Nygren
Date Created:  3/26/88
*******************************************************************
Edited By:
Date Edited:
*******************************************************************
Purpose:  enter new reference and check to see if exists

*******************************************************************
Input:

*******************************************************************
Output:

*******************************************************************
Restrictions:

*******************************************************************
Object modules called:

********************************************************************/
#include <vcstdio.h>
extern char index1[100][14];
extern struct vartyp {
    char pic[61];
    char func[10];
    char prompt[61];
    char field[13];
```

```
};
extern struct vartyp var1[120]; /* Structure for variable menu */
extern struct vartyp var2; /* Structure for variable menu */
extern struct mnutyp {
    char title[20];
    char indx2[100][14],ret,ref1[13];
    int p,done;
    struct ffblk ffblk;
    wclose(m1);
    done=0;
for(i=0;i<100;i++)
    empty(indx2[i],14);
start:
    wselect(w0);
    dflthlp("REFSAVE");
    w1=wxopen(8,15,13,65,NULL,ACTIVE+BORDER+BD2,0,0);
    atsay(1,10,"1. Save as System Reference ");
    atsay(2,10,"2. Save as User Reference");
    watsay(sw,0,0,"Select 1-2   <F3>Help");
    c=getone();
    if(c != '1' && c != '2' && c != ESC)
    {
        bell();
        goto start;
    }
    if(c==ESC)
    {
        wclose(w1);
        flag1 = 1;
        return(0);
    }
    wclose(w1);
    watsay(sw,0,0,"                         ");
again:
    rw=wxopen(6,15,8,60,NULL,
        ACTIVE+CURSOR+BORDER+BD1,0,0);
    if(rw == -1)
        terror("Unable to open reference entry window");
    atsay(0,3,"Enter Reference:");
    if(ref[0] == '\0' ||   ref[0] == ' ')
        empty(ref,13);
    for(i=0,j=0;i<8;i++)
    {
        if(ref[i] == '.')
            break;
        j++;
    }
    if(j < 8)
    {
        strcpy(ref1,ref);
        strcpy(ref,"");
        j=8-j;
        for(i=0;i<j;i++)
        strcat(ref," ");
        strcat(ref,ref1);
    }
    xatget(0,21,ref,"XXXXXXXX.REF",NULLFUNC,"Enter File reference file name",
        NULL,vc.dflt,vc.dflt);
    i=readgets();
    if(i==ESC)
    {
        wclose(rw);
        fclose(f1);
        flag1 = 1;
        return(0);
    }
    wclose(rw);
```

```
if (ref[0] == ' ' && ref[1] == ' ' && ref[2] == ' ' && ref[3] == ' '
 && ref[4] == ' ' && ref[5] == ' ' && ref[6] == ' ' && ref[7] == ' ')
    goto again;
trim(ref);
for(i=0,x=0;x<13;x++)
{
    ref1[i]=ref[x];
    i++;
    if(ref[x] == 32)
        i--;
}
ref1[i]='\0';
i=strlen(ref1);
j=12-i;
strcpy(ref,"");
for(i=0;i<j;i++)
    strcat(ref," ");
strcpy(ref,ref1);
wselect(w0);
system("dir *.REF > referenc.cfg");
if((f1=fopen("referenc.cfg","r")) == NULL)
{
    w1=wxopen(6,15,9,70,NULL,ACTIVE,0,0);
    atsay(0,0,"Unable to find Reference file config file");
    atsay(1,10,"Press any key to continue");
    ch=getone();
    wclose(w1);
    return (0);
}
atsay(0,0,"                                        ");
i=0;
j=0;
ch='C';
while(ch != EOF)
{
    while(((ch =fgetc(f1)) != EOF) && (ch != '\n'))
    {
        buff[i] = ch;
        i++;
    }
    buff[i] ='\0';
    if(buff[0] > 32 && buff[0] <127)
    {
        strncpy(index2[j],buff,8);
        trim(index2[j]);
        strcat(index2[j],".REF");
        trim(index2[j]);
        if(j<100);
            j++;
    }
    i=0;
}
fclose(f1);
if (ref[0] == ' ' && ref[1] == ' ' && ref[2] == ' ' && ref[3] == ' '
 && ref[4] == ' ' && ref[5] == ' ' && ref[6] == ' ' && ref[7] == ' ')
{
    flag1 =1 ;
    return(0);
}
k=0;
for(i=0;i<j;i++)
{
    if(!strcmp(index2[i],ref))
    {
        k=1;
        break;
    }
}
```

```c
    if(k==1)
    {
        w1=wxopen(6,15,8,60,NULL,ACTIVE+BORDER+BD1,0,0);
        atsay(0,4,"Reference File Exists, Overwrite <y/n>?");
        ret=getyn(0);
        wclose(w1);
        if( ret == 'N' || ret == 'n' )
            goto start;
    }
    return(0);
}
/*******************************************************************
File:      setup.c
********************************************************************
Object modules in file:

********************************************************************
Created By: Raymond T. Nygren
Date Created:  3/26/88
********************************************************************
Edited By:
Date Edited
********************************************************************
Purpose:  edi setup.cfg file

********************************************************************
Input:

********************************************************************
Output:

********************************************************************
Restrictions:

********************************************************************
Object modules called:

*******************************************************************/
#include <vcstdio.h>
extern char index1[100][14];
extern struct vartyp {
    char pic[61];
    char func[10];
    char prompt[61];
    char field[13];
};
extern struct vartyp var1[120]; /* Structure for variable menu */
extern struct vartyp var2;      /* Structure for variable menu */
extern struct mnutyp {
    char title[20];
    char call[10];
    char prompt[60];
};
```

```c
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/***************************************************************
   Load Chapter selection
***************************************************************/
setup()
{
    dflthlp("SETUP");
    empty(od,50);
    empty(wp,50);
    empty(vol1,50);
    empty(vol2,50);
    empty(vol3,50);
    empty(vol4,50);
    empty(vol5,50);
    empty(prnt,2);
    empty(vers,4);
    if((f1=fopen("setup.cfg","r+")) == NULL)
    {
        w1=wxopen(10,20,13,60,NULL,ACTIVE+BORDER+BD1,0,0);
        atsay(0,7,"Unable to open setup.cfg file");
        atsay(1,9,"Press any key to continue");
        ch=getone();
        wclose(w1);
        wclose(wdo);
        return(0);
    }
    k=0;
    i=0;
    ch='C';
    while(ch != EOF)
    {
        while(((ch =fgetc(f1)) != EOF) && (ch != '\n')&& (ch != '\0'))
        {
```

```
                    if(k == 0)
                            od[i]=ch;
                    if(k == 1)
                            wp[i]=ch;
                    if(k == 2)
                            vol1[i]=ch;
                    if(k == 3)
                            vol2[i]=ch;
                    if(k == 4)
                            vol3[i]=ch;
                    if(k == 5)
                            vol4[i]=ch;
                    if(k == 6)
                            vol5[i]=ch;
                    if(k == 7)
                            prnt[i]=ch;
                    if(k == 8)
                            vers[i]=ch;
                    i++;
            }
            k++;
            i=0;
    }
    rewind(f1);
    wdo=wxopen(2,6,20,74,"System Configuration
     Window",CURSOR+ACTIVE+CENTER+BORDER+BD3,0,0);
    atsay(1,0,"OverDrive(tm)");
    atsay(3,0,"WordPerfect(tm)");
    atsay(4,0,"Library");
    atsay(5,3,"Volume 1");
    atsay(7,3,"Volume 2");
    atsay(9,3,"Volume 3");
    atsay(11,3,"Volume 4");
    atsay(13,3,"Volume 5");
    atsay(15,3,"Printer");
    atsay(15,25,"WordPerfect Version");
    xatget(1,16,od,
    "XXXXXXXXXXXXXXXXXXXXXXXXXXXXXXXXXXXXXXXXXXXXXXXX",NULLFUNC,
    "Enter Drive & Path for OverDrive(tm) <F7>Save/Exit <><>
    <F3>Help <ESC>Quit",NULL,vc.dflt,vc.dflt);
    xatget(3,16,wp,
    "XXXXXXXXXXXXXXXXXXXXXXXXXXXXXXXXXXXXXXXXXXXXXXXX",NULLFUNC,
    "Enter Drive & Path for WordPerfect(tm) <F7>Save/Exit <><>
    <F3>Help <ESC>Quit",NULL,vc.dflt,vc.dflt);
    xatget(5,16,vol1,
    "XXXXXXXXXXXXXXXXXXXXXXXXXXXXXXXXXXXXXXXXXXXXXXXX",NULLFUNC,
    "Enter Drive & Path for Library Volume 1 <F7>Save/Exit<><>
    <F3>Help <ESC>Quit",NULL,vc.dflt,vc.dflt);
    xatget(7,16,vol2,
     "XXXXXXXXXXXXXXXXXXXXXXXXXXXXXXXXXXXXXXXXXXXXXXXX",NULLFUNC,
     "Enter Drive & Path for Library Volume 2 <F7>Save/Exit<><> <F3>Help
<ESC>Quit",NULL,vc.dflt,vc.dflt);
    xatget(9,16,vol3,
     "XXXXXXXXXXXXXXXXXXXXXXXXXXXXXXXXXXXXXXXXXXXXXXXX",NULLFUNC,
     "Enter Drive & Path for Library Volume 3 <F7>Save/Exit<><> <F3>Help
<ESC>Quit",NULL,vc.dflt,vc.dflt);
    xatget(11,16,vol4,
     "XXXXXXXXXXXXXXXXXXXXXXXXXXXXXXXXXXXXXXXXXXXXXXXX",NULLFUNC,
     "Enter Drive & Path for Library Volume 4 <F7>Save/Exit<><> <F3>Help
<ESC>Quit",NULL,vc.dflt,vc.dflt);
    xatget(13,16,vol5,
     "XXXXXXXXXXXXXXXXXXXXXXXXXXXXXXXXXXXXXXXXXXXXXXXX",NULLFUNC,
     "Enter Drive & Path for Library Volume 5 <F7>Save/Exit<><> <F3>Help
<ESC>Quit",NULL,vc.dflt,vc.dflt);
    xatget(15,16,prnt,
     "X",NULLFUNC,"<C>ontinous Printer or <M>anual Feed <F3>Help
<F7>Save/Exit <><> <ESC>Quit",NULL,vc.dflt,vc.dflt);
    xatget(15,45,vers,
     "9.9",NULLFUNC,"Enter Version Number <F7>Save/Exit <><> <F3>Help
```

```
<ESC>Quit",NULL,vc.dflt,vc.dflt);
        readgets();
    trim(od);
        trim(wp);
    trim(vol1);
      trim(vol2);
      trim(vol3);
      trim(vol4);
      trim(vol5);
        trim(prnt);
        vclose(wdo);
        fputs(od,f1);
        fputc('\n',f1);
        fputs(wp,f1);
        fputc('\n',f1);
        fputs(vol1,f1);
        fputc('\n',f1);
        fputs(vol2,f1);
        fputc('\n',f1);
        fputs(vol3,f1);
        fputc('\n',f1);
        fputs(vol4,f1);
        fputc('\n',f1);
        fputs(vol5,f1);
        fputc('\n',f1);
        fputs(prnt,f1);
        fputc('\n',f1);
        fputs(vers,f1);
        fputc('\n',f1);
        fclose(f1);
}
/*********************************************************************
File:    creatidx.c
**********************************************************************
Object modules in file:

**********************************************************************
Created By: Raymond T. Nygren
Date Created:  3/26/88
**********************************************************************
Edited By:
Date Edited:
**********************************************************************
Purpose:  edit chpt.IDX files

**********************************************************************
Input:

**********************************************************************
Output:

**********************************************************************
Restrictions:

**********************************************************************
Object modules called:
```

```c
/****************************************************************************/
#include <vcstdio.h>
extern char index1[100][14];
extern struct vartyp {
     char pic[61];
     char func[10];
     char prompt[61];
     char field[13];
     };
extern struct vartyp var1[120]; /* Structure for variable menu */
extern struct vartyp var2; /* Structure for variable menu */
extern struct mnutyp {
     char title[20];

char call[10];
     char prompt[60];
     };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/****************************************************************************
  Create user defined index files
  and save to user.idx
****************************************************************************/
creatidx()
{
     int idxnum(),idx1,idx2,idx3,idx4,mmpik;
     char ret;
     char buff2[12],buff1[12],buff3[12];
     dflthlp("LIBINDEX");
     Loadchpt();
if(file[0] == ' ')
          return(0);
if(doc[0] == ' ')
          return(0);
```

```
wselect(sw);
atsay(0,75,"    ");
wselect(w0);
atsay(0,32,"OverDrive");
atsay(1,28,"Volume: ");
atsay(1,36,doc);
atsay(2,27,"Chapter: ");
atsay(2,36,fil);
strcpy(buff3,file);
trim(buff3);
strcat(buff3,".IDX");
n=strlen(buff3);
if(n == 4)
{
    rw=wxopen(6,10,8,70,NULL,ACTIVE+CURSOR+BORDER+BD1,0,0);
    if(rw == -1)
    terror("Unable to open reference entry window");
    atsay(0,3,"No such Chapter exists ");
    ch=getone();
    atsay(0,3,"                        ");
    wclose(rw);
    erase();
    return(0);
}
for(i=0;i<50;i++)
{
    empty(var1[i].pic,61);
    empty(var1[i].func,4);
}
if((f1=fopen(buff3,"r+")) != NULL)
    i=0;
else
    goto skip1;

k=0;
j=0;
i=0;
ch='C';
while(ch != EOF)
{
    empty(buff,100);
    trim(buff);
    while(((ch =fgetc(f1)) != EOF) && (ch != '\n'))
    {
        buff[i]=ch;
        i++;
    }
    buff[i]='\0';
    if(buff[4]!='\0')
    var1[j].func[0] = buff[4];
    if(buff[5]!='\0')
    var1[j].func[1] = buff[5];
    if(buff[6]!='\0')
    var1[j].func[2] = buff[6];
    var1[j].func[3] = '\0';
    for(i=10,l=0;i<69&& buff[i]!='\0';i++,l++)
        var1[j].pic[l] = buff[i];
    j++;
    if(j>49)
        break;
    i=0;
}
for(i=0;i<50;i++)
{
    n=strlen(var1[i].func);
    m=3-n;
    for(j=0;j<m;j++)
        strcat(var1[i].func," ");
```

```
            n=strlen(var1[i].pic);
            m=60-n;
            for(j=0;j<m;j++)
                    strcat(var1[i].pic," ");
        }
        fclose(f1);
skip1:
    empty(buff1,12);
    strncpy(buff1,buff3,4);
    trim(buff1);
    wselect(w0);
    xatsay(3,2,"Document",vc.dflt);
    xatsay(3,32,"Document Description",vc.dflt);
    idx1=wxopen(5,0,21,79,"Page 1",CURSOR+BORDER+BD1,0,0);
    idx2=wxopen(5,0,21,79,"Page 2",CURSOR+BORDER+BD1,0,0);
    idx3=wxopen(5,0,21,79,"Page 3",CURSOR+BORDER+BD1,0,0);
    idx4=wxopen(5,0,21,79,"Page 4",CURSOR+BORDER+BD1,0,0);
    whide(idx1);
    whide(idx2);
    whide(idx3);
    whide(idx4);
    wselect(idx1);
    wselect(idx2);
    wselect(idx3);
    wselect(idx4);
    for(j=0,i=0;i<15;i++)
    {
            wselect(idx1);
            xxatget(vcdgt,idx1,j,5,var1[i].func,"999",idxnum,
            "Enter Document Number   <F3>Help <F7>Save/Exit <ESC>Quit    <PgUp>
<PgDn>",NULL,vc.dflt,vc.dflt);
            xatsay(j,1,buff1,vc.dflt);
            xxatget(vcdgt,idx1,j,13,var1[i].pic,
            "xxxxxxxxxxxxxxxxxxxxxxxxxxxxxxxxxxxxxxxxxxxxxxxxxxx",
            NULLFUNC,"Enter Document Description <F7>Save/Exit <ESC>Quit
            <PgUp> <PgDn>",NULL,vc.dflt,vc.dflt);
            j++;
    }
    for(j=0,i=15;i<30;i++)
    {
        wselect(idx2);
        xxatget(vcdgt,idx2,j,5,var1[i].func,"999",idxnum,
        "Enter Document Number   <F3>Help <F7>Save/Exit <ESC>Quit    <PgUp>
        <PgDn>",NULL,vc.dflt,vc.dflt);
        xatsay(j,1,buff1,vc.dflt);
        xxatget(vcdgt,idx2,j,13,var1[i].pic,
        "xxxxxxxxxxxxxxxxxxxxxxxxxxxxxxxxxxxxxxxxxxxxxxxxxxx",
        NULLFUNC,"Enter Document Description <F7>Save/Exit <ESC>Quit
        <PgUp> <PgDn>",NULL,vc.dflt,vc.dflt);
          j++;
    }
for(j=0,i=30;i<45;i++)
{
    wselect(idx3);
    xxatget(vcdgt,idx3,j,5,var1[i].func,"999",idxnum,
    "Enter Document Number   <F3>Help <F7>Save/Exit <ESC>Quit    <PgUp>
    <PgDn>",NULL,vc.dflt,vc.dflt);
    xatsay(j,1,buff1,vc.dflt);
    xxatget(vcdgt,idx3,j,13,var1[i].pic,
    "xxxxxxxxxxxxxxxxxxxxxxxxxxxxxxxxxxxxxxxxxxxxxxxxxxx",
    NULLFUNC,"Enter Document Description <F7>Save/Exit <ESC>Quit
    <PgUp> <PgDn>",NULL,vc.dflt,vc.dflt);
    j++;
}
for(j=0,i=45;i<50;i++)
{
    wselect(idx4);
```

```c
            xxatget(vcdgt,idx4,j,5,var1[i].func,"999",idxnum,
            "Enter Document Number  <F3>Help <F7>Save/Exit <ESC>Quit    <PgUp>
             <PgDn>",NULL,vc.dflt,vc.dflt);
            xatsay(j,1,buff1,vc.dflt);
            xxatget(vcdgt,idx4,j,13,var1[i].pic,
            "xxxxxxxxxxxxxxxxxxxxxxxxxxxxxxxxxxxxxxxxxxxxxxxxx",
            NULLFUNC,"Enter Document Description <F7>Save/Exit <ESC>Quit
             <PgUp> <PgDn>",NULL,vc.dflt,vc.dflt);
            j++;
    }
    wshow(idx4);
    wshow(idx3);
    wshow(idx2);
    wshow(idx1);
    readgets();
    wclose(idx1);
    wclose(idx2);
    wclose(idx3);
    wclose(idx4);
    if((fl=fopen(buff3,"w")) == NULL)
    {
        w1=wxopen(10,20,13,60,NULL,ACTIVE+BORDER+BD2,0,0);
        atsay(0,7,"Unable to open      chapter index file");
        atsay(0,22,buff3);
        atsay(1,17,"Press any key to continue");
        ch=getone();
        atsay(3,7,"                              ");

wclose(w1);
    }
    for(i=0;i<50;i++)
    {
        trim(var1[i].pic);
        trim(var1[i].func);
        if(!(var1[i].pic[0] == '\0'&& var1[i].func[0] == '\0'))
        {
            strcpy(buff2,var1[i].func);
            strcpy(var1[i].func,buff1);
            strcat(var1[i].func,buff2);
            n=strlen(var1[i].func);
            if(n==4)
                strcat(var1[i].func,"   ");
            fputs(var1[i].func,fl);
            fputs("   ",fl);
            for(j=0;j<60&&var1[i].pic!='\0';j++)
                fputc(var1[i].pic[j],fl);
            fputc('\n',fl);
        }
    }
    wclose(w1);
    fclose(fl);
    erase();
}

/****************************************************************
File:    creatidx.c
*****************************************************************
Object modules in file:

*****************************************************************
Created By: Raymond T. Nygren
Date Created: 3/26/88
*****************************************************************
   ted By:
   e Edited:
*****************************************************************
    pose: edit chpt.IDX files
```

```
*********************************************************************
Input:

*********************************************************************
Output:

*********************************************************************
Restrictions:

*********************************************************************
Object modules called:

*********************************************************************/
COUNT idxnum(str,gt)   /* No duplicate Document numbers allowed */
TEXT str[];
GETTABLE *gt;
{
    int a,numb;
    GETITEM *ptr = gt->head;
    for(numb=0,a=0;a<50;a++)
    {
        if(!(str[0]==' '&&str[1]==' '&&str[2]==' '))
            if(!strcmp(str,ptr->tmpfld)&&ptr->tmpfld[0] != ' ')
                numb++;
        ptr=ptr->next;
    }
    if(numb>1)
    {
        bell();
        w1=wxopen(10,20,13,60,NULL,ACTIVE+BORDER+BD1,0,0);
        atsay(0,7,"Duplicate Document Numbers");
        atsay(1,8,"Press any key to continue");
        ch=getone();
        wclose(w1);
        return(1);
    }
    else
        return(0);
/*********************************************************************/;

/*Name:    vcmfree                              (VCMFREE.C)

Synopsis:

include <vcstdio.h> rc = vcmfree(menuptr);

VCMENU *menuptr;    \* Pointer to the menu to free *\
    short int rc;

Returns:

rc == 0 if the operation was successfull.
       != 0 if an error occured.
```

Description:

This function will release the memory used by a menu.

Uses:

Cautions:

Version 01.00 18-MAR-87 bga Initial release by Billy G. Allie.

**/

```c
include <vcstdio.h> short int vcmfree(mptr)
VCMENU *mptr;
{
    MENUITEM *mp;

if (mptr->magic != MENUMAGIC)      /* Check for a valid menu */
    {
        vcerrno = VCBADMNU;
        return (1);
    }

/*********************************************************\
    | Go thru the linked list of menu items and release the memory |
    | used by them.                                                |
    \*********************************************************/ mp = mptr->itemhead;               /* Start with the first item ... */
    while (mp != (MENUITEM *)NULL)     /* ... until we reach the end */
    {
        if (mp->magic != MENUITEMMAGIC)
        {
            vcerrno = VCBADMITM;
            return (1);
        }
        mp->magic = 0;                 /* Reset the magic number for this item
        mptr->itemhead = mp->next;     /* Make the next item the first ite
*/
        vcfree((char *)mp);            /* Free the memory used by the one we ju
unlinked */
        mp = mptr->itemhead;           /* Set up for the next pass */
    }

/*********************************************************\
    | Now that all the menu items are freed, unlink the menu from  |
    | the list of menus and release it's memory.                   |
    \*********************************************************/ if (mptr->prev != (VCMENU *)NULL)
        (mptr->prev)->next = mptr->next;
    else
        vcmchain = mptr->next;

if (mptr->next != (VCMENU *)NULL)
        (mptr->next)->prev = mptr->prev;

mptr->magic = 0;                   /* Reset the menu's magic number */
    vcfree((char *)mptr);              /* ... and free the memory it used.
*/
    return (0);
}
```

```
/************************************************************************
File:     prnform1.c
*************************************************************************
Object modules in file:

*************************************************************************
Created By: Raymond T. Nygren
Date Created: 3/26/88
*************************************************************************
Edited By:
Date Edited:
*************************************************************************
Purpose:  print overdrive entry worksheet

*************************************************************************
Input:

*************************************************************************
Output:

*************************************************************************
Restrictions:

*************************************************************************
Object modules called:

*************************************************************************/
#include <vcstdio.h>
extern char index1[100][14];
extern struct vartyp (
     char pic[61];
     char func[10];
     char prompt[61];
     char field[13];
     );
extern struct vartyp var1[120]; /* Structure for variable menu */
extern struct vartyp var2; /* Structure for variable menu */
extern struct mnutyp (
     char title[20];
     char call[10];
     char prompt[60];
     );
extern struct mnutyp menu[5]; /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
```

```c
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/***********************************************************************
  Save form to a file
***********************************************************************/ prnform1()
{
    char sdate[12],buffer[200],buff1[9];
    int wq,len[50];
    if(numfld == 1)
        return(0);
    wq=wxopen(10,20,12,60,NULL,ACTIVE+BORDER+BD1,0,0);
    atsay(0,9,"Printing Worksheet");
    empty(sdate,12);
    getdate(sdate);
    if((f4=fopen("prn","w")) == NULL)
    {
        w1=wxopen(4,1,10,60,NULL,ACTIVE,0,0);
        atsay(1,15,"Printer not ready");
        atsay(4,15,"Press any key to continue");
        ch=getone();
        wclose(w1);
    }
    w1=wxopen(10,20,14,60,NULL,ACTIVE+BORDER+BD1,0,0);
    atsay(0,12,"Is Printer Ready ?");
    atsay(1,8,"Press <ESC> to Quit or");
    atsay(2,8,"any other key to continue");
    ch=getone();
    wclose(w1);
    if(ch==ESC)
    {
        wclose(wq);
        return(0);
    }
    ch=' ';
    fputs("                              OverDrive (tm)\n",f4);
    fputs(sdate,f4);
    fputs("              Work Sheet                              page 1\n",f4);
    fputc('\n',f4);
    fputs("====================================================================\n",f4);
    fputs("Reference File: ",f4);
```

```c
            fputs(ref,f4);
            fputc('\n',f4);
            fputs("Documents Selected: ",f4);
            for(j=0,i=0;i<numsel;i++)
            {
                    empty(buff1,12);
                    strncpy(buff1,index1[i],8);
                    trim(buff1);
                    fputs(buff1,f4);
                    fputs("    ",f4);
                    j++;
                    if(j>5 && i<(numsel-1))
                    {
                            l++;
                            j=0;
                            fputs("\n                    ",f4);
                    }
            }
            fputc('\n',f4);
            fputs("-------------------------------------------------------------------------\n",f4);
            fputc('\n',f4);
            for(i=0;i<(numfld-1);i++)
                    len[i]=strlen(var1[i].pic);
            for(i=0,l=0,m=2;i<(numfld-1);i++)
            {
                    q=strlen(var1[i].field);

r=13-q;
                    for (q=0;q<r;q++)
                            strcat(var1[i].field," ");
                    fputs("   ",f4);
                    fputs(var1[i].field,f4);
                    fputs("   ",f4);
                    if(edit[i][0]!=' ')
                            fputs(edit[i],f4);
                    fputs("\n                    ",f4);
                    for(j=0;j<len[i];j++)
                    {
                            fputc('-',f4);
                    }
                    fputs("\n                    ",f4);
                    fputs(var1[i].prompt,f4);
                    fputc('\n',f4);
                    l++;
                    if (l >16)
                    {
                            if(prnt[0] == 'M')
                            {
                                    w1=wxopen(10,20,13,60,NULL,ACTIVE+BORDER+BD1,0,0);
                                    atsay(0,5,"Have Printer Ready for Next Page");
                                    atsay(1,9,"Press any key to continue");
                                    ch=getone();
                                    wclose(w1);
                            }
                            l=0;
                            sprintf(buff,"%d",m);
                            fputc('\f',f4);
                            fputs("                              OverDrive (tm)\n",f4
                            fputs("                                Work Sheet    page ",f4);
                            fputs(buff,f4);
                            fputc('\n',f4);
                            fputs("-----------------------------------------------------\n",f4);
                            fputc('\n',f4);
                            fputc('\n',f4);
                            m++;
```

```
        }
    fputc('\f',f4);
    fclose(f4);
    wclose(wq);
    for(i=0;i<25;i++)
    sel[i]=0;
    return(0);
}
```

```
/*******************************************************************
File:    printval.c
********************************************************************
Object modules in file:

********************************************************************
Created By: Raymond T. Nygren
Date Created:  3/26/88
********************************************************************
Edited By:
Date Edited:
********************************************************************
Purpose:  print Overdrive variable information report by document

********************************************************************
Input:

********************************************************************
Output:

********************************************************************
Restrictions:

********************************************************************
Object modules called:
loadchpt()

*******************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];
```

```
        char call[10];
        char prompt[60];
        };
extern struct mnutyp menu[5];  /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
    ern COUNT rw,sw,m1,m2,new;
      n PFI setloop();
      n PFI sethelp();
      n PFI oldhlp();
e.   n VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/************************************************************************
   Create user defined variable files
   and save to user.var
*************************************************************************/
printval()
{
    char ret,type[50][2],length[50][8];
    char sdate[12],order[50][4],buff2[12],buff1[12],buff3[12],buff4[12];
    int flag2,flag3,counter;
    empty(sdate,12);
    getdate(sdate);
    loadchpt();
    flag3=0;
    if(file[0] == ' ')
         return(0);

if(doc[0] == ' ')
     return(0);
wselect(w0);
strcpy(buff2,file);
trim(buff2);
strcat(buff2,".VAR");
n=strlen(buff2);
if(n == 4)
{
     rw=wxopen(6,10,8,70,NULL,ACTIVE+CURSOR+BORDER+BD1,0,0);
     if(rw == -1)
          terror("Unable to open reference entry window");
     atsay(0,3,"No such Chapter exists ");
```

```
            ch=getone();
            atsay(0,3,"                                  ");
            wclose(rw);
            erase();
            return(0);
    }
    empty(buff1,12);
    strncpy(buff1,buff2,4);
    trim(buff1);
    empty(buff3,12);
    rw=wxopen(10,10,12,70,NULL,ACTIVE+CURSOR+BORDER+BD1,0,0);
    if(rw == -1)
            terror("Unable to open reference entry window");
    xatsay(3,1,"Enter Document Number : ",vc.dflt);
    xatsay(3,27,buff1,vc.dflt);
    xatget(4,31,buff3,"999",NULLFUNC,
    "Enter Document Number",NULL,vc.dflt,vc.dflt);
    i=readgets();
    xatsay(3,1,"                                              ",vc.dflt);
    wclose(rw);
    if(i==ESC)
            return(0);
    trim(buff3);
    if(buff3[0]  == '\0')
            return(0);
    strcat(buff1,buff3);
    strcpy(buff3,"@");
    strcat(buff3,buff1);
    f1=fopen(buff2,"r");       /* *.VAR file  */
    f2=fopen("prn","w");
    for(i=0;i<50;i++)
    {
            empty(order[i],4);
            empty(type[i],2);
            empty(length[i],8);
            empty(var1[i].pic,61);
            empty(var1[i].func,10);
            empty(var1[i].prompt,61);
            empty(var1[i].field,13);
    }
    k=0;

j=0;
    i=0;
    ch='C';
    flag2=0;
    flag1=0;
    while(ch != EOF)
    {
            empty(buff,100);
            while(((ch =fgetc(f1)) != EOF) && (ch != '\n'))
            {
                    buff[i]=ch;
                    i++;
            }
            buff[i]='\0';
            trim(buff);
            if(buff[0] == '@' )
            if(!strcmp(buff,buff3))
                    flag2 = 1;
            else
                    flag2 = 0;
            if(flag2 == 1 && buff[0] != '@')
            {
                    flag3=1;
                    if( k == 0)
                            strcpy(var1[j].pic,buff);
```

```
            if( k == 1)
                  strcpy(var1[j].func,buff);
            if( k == 2)
                  strcpy(var1[j].prompt,buff);
            if( k == 3)
                  strcpy(var1[j].field,buff);
            k++;
            if (k>3)
            {
                  k=0;
                  j++;
            }
      }
      i=0;
}
fclose(f1);
trim(var1[0].pic);
if(flag3==0)
{
      w1=wxopen(10,15,13,65,NULL,ACTIVE+BORDER+BD1,0,0);
      atsay(0,4,"Unable to Find         Field Information");
      atsay(0,20,buff1);
      atsay(1,16,"any key to continue");
      ch=getone();
      wclose(w1);
      fclose(f2);
      return(0);
}
w1=wxopen(10,20,14,60,NULL,ACTIVE+BORDER+BD1,0,0);
      atsay(0,12,"Is Printer Ready ?");
      atsay(1,8,"Press <ESC> to Quit or");
      atsay(2,8,"any other key to continue");
      ch=getone();
      wclose(w1);
      if(ch==ESC)
            return(0);
      fputs("                      OverDrive Library Report\n",f2);
      fputs("                      Field Information by Document ",f2);
      fputc('\n',f2);
      fputc('\n',f2);
      fputs(sdate,f2);
      fputs("                   Volume: ",f2);
      fputs(doc,f2);
      fputc('\n',f2);
      fputs("                   Chapter: ",f2);
      fputs(fil,f2);
      fputs(" Document:",f2);
      file[0]=buff3[1];
      file[1]=buff3[2];
      file[2]=buff3[3];
      file[3]=buff3[4];
      file[4]=buff3[5];
      file[5]=buff3[6];
      file[6]=buff3[7];
      file[7]='\0';
      fputs(file,f2);
      fputc('\n',f2);
      fputs("                Data\n",f2);
      fputs("    Field",f2);
      fputs("       Type",f2);
      fputs(" Length       ",f2);
      fputs("Prompt Window",f2);
      fputc('\n',f2);
      fputc('\n',f2);
      for(i=0,j=0;i<50;i++)
      ;
```

```c
            sprintf(order[i],"%d",i+1);
            if(var1[i].pic[0] == 'x')
            type[i][0] = 'T';
            if(var1[i].pic[0] == '9')
            type[i][0] = 'N';
            if(!strcmp(var1[i].pic,"99/99/99"))
                type[i][0] = 'D';
            if(!strcmp(var1[i].pic,"999-99-9999"))
                type[i][0] = 'S';
            if(!strcmp(var1[i].pic,"(999)999-9999"))
                type[i][0] = 'P';
            if(!strcmp(var1[i].pic,"Xxxxxxxxxxxxxxxxxxxxxxxxxxxxxxxxxxxxxxxx
xxxxxxxxxxxxxxxx"))
                type[i][0] = 'B';
            m=strlen(var1[i].field);
            n=12-m;
            for(k=0;k<n;k++,m++)
            var1[i].field[m]=' ';
        m=strlen(var1[i].prompt);
        n=60-m;
        for(k=0;k<n;k++,m++)
            var1[i].prompt[m]=' ';
        m=strlen(var1[i].pic);
        if(var1[i].pic[0] == ' ')
            m=0;
        sprintf(length[i],"%d",m);
        if(type[i][0] == 'D' || type [i][0] == 'C'||
        type[i][0] == 'P' || type [i][0] == 'S')
            strcpy(length[i],"0");
        if(var1[i].field[0] != ' ')
        {
            if(order[i][1] == '\0')
                strcat(order[i]," ");
            fputs(order[i],f2);
            fputs(" ",f2);
            fputs(var1[i].field,f2);
            fputs(" ",f2);
            fputs(type[i],f2);
            fputs("  ",f2);
            if(length[i][1] == '\0')
                strcat(length[i]," ");
            fputs(length[i],f2);
            fputs(" ",f2);
            trim(var1[i].prompt);
            fputs(var1[i].prompt,f2);
            fputc('\n',f2);
        }
}
fputc('\f',f2);
fclose(f2);

/*****************************************************************
File:   showvol.c
******************************************************************
Object modules in file:

******************************************************************
Created By: Raymond T. Nygren
Date Created: 3/26/88
******************************************************************
Edited By:
Date Edited:
******************************************************************
    pose:
```

```
/***************************************************************
Input:

***************************************************************
Output:

***************************************************************
Restrictions:

***************************************************************
Object modules called:

***************************************************************/
#include <vcstdio.h>
extern char index1[100][14];
extern struct vartyp {
    char pic[61];
    char func[10];
    char prompt[61];
    char field[13];
    };
extern struct vartyp var1[120]; /* Structure for variable menu */
extern struct vartyp var2; /* Structure for variable menu */
extern struct mnutyp {
    char title[20];

char call[10];
    char prompt[60];
    };
extern struct mnutyp menu[5]; /* Structure form volume menu */
extern struct mnutyp menu1[25]; /* Structure for chapter menus   */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
```

```c
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/************************************************************
   Show volumes Available
*************************************************************/
showvol()
{
    dflthlp("LIBVOLUME");
    for(i=0;i<5;i++)
    {
        empty(menu[i].title,20);
        empty(menu[i].call,10);
        empty(menu[i].prompt,60);
    }
    if((f1=fopen("user.def","r+")) == NULL)
    {
        w1=wxopen(4,4,10,60,NULL,ACTIVE,0,0);

atsay(1,15,"Unable to find user.def file");
        atsay(4,15,"Press any key to continue");
        ch=getone();
        wclose(w1);
        erase();
        return (0);

}
    k=0;
    j=0;
    i=0;
    ch='C';
    while(ch != EOF)
    {
        empty(buff,100);
        while(((ch =fgetc(f1)) != EOF) && (ch != '\n'))
        {
            buff[i] = ch;
            i++;

}
        buff[i] ='\0';
        if(k == 0)
            for(n=0;n<15&&buff[n]!='\0';n++)
                menu[j].title[n]=buff[n];
        if(k == 1)
            for(n=0;n<9&&buff[n]!='\0';n++)
                menu[j].call[n]=buff[n];
        if(k == 2)
            for(n=0;n<60&&buff[n]!='\0';n++)
                menu[j].prompt[n]=buff[n];
        k++;
        if(k > 2)
        {
            k=0;
            j++;
        }
        i=0;
    }
    rewind(f1);
    wselect(w0);
```

```
    atsay(0,32,"OverDrive");
    box(1,0,3,25,SINGLE,vc.dflt);
    box(5,0,7,25,SINGLE,vc.dflt);
    box(9,0,11,25,SINGLE,vc.dflt);
    box(13,0,15,25,SINGLE,vc.dflt);
    box(17,0,19,25,SINGLE,vc.dflt);
    atsay(2,2,menu[0].title);
    atsay(6,2,menu[1].title);
    atsay(10,2,menu[2].title);
    atsay(14,2,menu[3].title);
    atsay(18,2,menu[4].title);
    atsay(1,12,"1");
    atsay(5,12,"2");
    atsay(9,12,"3");
    atsay(13,12,"4");

atsay(17,12,"5");
        wselect(sw);
        atsay(0,0,"<F3>Help <ESC>Quit");
        wselect(w0);
        rw=wxopen(10,32,12,71,NULL,ACTIVE+CURSOR+BORDER+BD1,0,0);
        if(rw == -1)
            terror("Unable to open reference entry window");
        xatsay(0,0,"Enter Volume Number to Edit [1-5]: ",vc.dflt);
again:
        ch=getone();
        if(ch == ESC)
        {
            wclose(rw);
            erase();
            wselect(sw);
            atsay(0,0,"           ");
            flag1=1;
            return(0);
        }
        if(ch != '1' && ch != '2' && ch != '3' && ch != '4' && ch !='5')
        {
            bell();
            goto again;
        }
        xatsay(3,1,"                                        ",vc.dflt);
        wclose(rw);
        flag1=0;
        at(1,0);
        eraeos();
        xatsay(1,1,"Volume: ",vc.dflt);
        xatsay(2,1,"Prompt: ",vc.dflt);
        if(ch == '1')
        {
            xatget(1,9,menu[0].title,"xxxxxxxxxxxxxxx",NULLFUNC,
            "Enter/Edit Volume Heading  <F3>Help <F7>Save/Exit <><>
              <ESC>Quit",NULL,vc.dflt,vc.dflt);
            xatget(2,9,menu[0].prompt,"xxxxxxxxxxxxxxxxxxxxxxxxxxxxxxxxx
xxxxxxxxxxxxxxxxxxxx",NULLFUNC,
            "Enter/Edit Prompt Window for Volume <F7>Save/Exit <><>
              <ESC>Quit",NULL,vc.dflt,vc.dflt);
        }
        if(ch == '2')
        {
            xatget(1,9,menu[1].title,"xxxxxxxxxxxxxxx",NULLFUNC,
            "Enter/Edit Volume Heading  <F3>Help <F7>Save/Exit <><>
              <ESC>Quit",NULL,vc.dflt,vc.dflt);
            xatget(2,9,menu[1].prompt,"xxxxxxxxxxxxxxxxxxxxxxxxxxxxxxxxx
xxxxxxxxxxxxxxxxxxxx",NULLFUNC,
            "Enter/Edit Prompt Window for Volume  <F7>Save/Exit <><>
              <ESC>Quit",NULL,vc.dflt,vc.dflt);
```

```
}
if(ch == '3')
{
    xatget(1,9,menu[2].title,"xxxxxxxxxxxxxx",NULLFUNC,

"Enter/Edit Volume Heading <F7>Save/Exit <><>
         <ESC>Quit",NULL,vc.dflt,vc.dflt);
    xatget(2,9,menu[2].prompt,"xxxxxxxxxxxxxxxxxxxxxxxxxxxxxxxx
xxxxxxxxxxxxxxxxxxx",NULLFUNC,
        "Enter/Edit Prompt Window for Volume <F7>Save/Exit <><>
         <ESC>Quit",NULL,vc.dflt,vc.dflt);
}
if(ch == '4')
{
    xatget(1,9,menu[3].title,"xxxxxxxxxxxxxx",NULLFUNC,
        "Enter/Edit Volume Heading  <F3>Help <F7>Save/Exit <><>
         <ESC>Quit",NULL,vc.dflt,vc.dflt);
    xatget(2,9,menu[3].prompt,"xxxxxxxxxxxxxxxxxxxxxxxxxxxxxxxx
xxxxxxxxxxxxxxxxxxx",NULLFUNC,
        "Enter/Edit Prompt Window for Volume <F7>Save/Exit <><>
         <ESC>Quit",NULL,vc.dflt,vc.dflt);
}
if(ch == '5')
{
    xatget(1,9,menu[4].title,"xxxxxxxxxxxxxx",NULLFUNC,
        "Enter/Edit Volume Heading  <F3>Help <F7>Save/Exit <><>
         <ESC>Quit",NULL,vc.dflt,vc.dflt);
    xatget(2,9,menu[4].prompt,"xxxxxxxxxxxxxxxxxxxxxxxxxxxxxxxx
xxxxxxxxxxxxxxxxxxx",NULLFUNC,
        "Enter/Edit Prompt Window for Volume <F7>Save/Exit <><>
         <ESC>Quit",NULL,vc.dflt,vc.dflt);
}
readgets();
for(i=0;i<5;i++)
{
    trim(menu[i].title);
    fputs(menu[i].title,f1);
    fputc('\n',f1);
    for(j=0;j<10;j++)
        fputc(menu[i].call[j],f1);
    fputc('\n',f1);
    for(j=0;j<60;j++)
        fputc(menu[i].prompt[j],f1);
    fputc('\n',f1);

}
fclose(f1);
wselect(sw);
atsay(0,0,"         ");

/********************************************************************
File:    creatvar.c
*********************************************************************
Object modules in file:
creatvar(),    orddoc()
*********************************************************************
Created By: Raymond T. Nygren
Date Created: 3/26/88
*********************************************************************
Edited By:
Date Edited:
*********************************************************************
Purpose:  Edit /create /copy Variable information by document number
```

```
/****************************************************************
Input:

****************************************************************
Output:

****************************************************************
Restrictions:

****************************************************************
Object modules called:
loadchpt(),orddoc()

****************************************************************/
#include <vcstdio.h>
extern char index1[100][14];
extern struct vartyp {
     char pic[61];
     char func[10];
     char prompt[61];
     char field[13];
     };
extern struct vartyp var[120]; /* Structure for variable menu */
extern struct vartyp var2; /* Structure for variable menu */
extern struct mnutyp {
     char title[20];
     char call[10];
     char prompt[60];
     };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
```

```c
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*******************************************************************
   Create user defined variable files
   and save to user.var
*******************************************************************/
creatvar()
{
    char ret,type[50][2],length[50][8];
    char order[50][3],buff2[12],buff1[12],buff3[12],buff4[12];
    int orddoc(),rtn,v1,v2,v3,v4,flag2,counter;
    loadchpt();
    dflthlp("LIBVAR");
    if(file[0] == ' ')
        return(0);
    if(doc[0] == ' ')
        return(0);

wselect(w0);
    atsay(0,32,"OverDrive");
    atsay(1,28,"Volume: ");
    atsay(1,36,doc);
    atsay(2,20,"Chapter: ");
    atsay(2,29,fil);
    strcpy(buff2,file);
    trim(buff2);
    strcat(buff2,".VAR");
    n=strlen(buff2);
    if(n == 4)
    {
        rw=wxopen(10,20,13,60,NULL,ACTIVE+CURSOR+BORDER+BD1,0,0);
        atsay(0,3,"No such Chapter exists ");
        atsay(1,23,"Press any key to continue");
        ch=getone();
        atsay(0,3,"                        ");
        wclose(rw);
        erase();
        return(0);
    }
    empty(buff1,12);
    strncpy(buff1,buff2,4);
    trim(buff1);
    empty(buff3,12);
    rw=wxopen(10,10,12,70,NULL,ACTIVE+CURSOR+BORDER+BD1,0,0);
    if(rw == -1)
        terror("Unable to open reference entry window");
    xatsay(3,1,"Enter Document Number : ",vc.dflt);
    xatsay(3,27,buff1,vc.dflt);
    xatget(4,31,buff3,"999",NULLFUNC,
    "Enter Document Number   <F7>Save/Exit <F3>Help
     <ESC>Quit",NULL,vc.dflt,vc.dflt);
    readgets();                                              ",vc.dflt);
    xatsay(3,1,"                                             ",vc.dflt);
    wclose(rw);
    trim(buff3);
    if( buff3[0] == '\0')
    {
        xatsay(0,0,"                                             ",vc.dflt);
        xatsay(1,0,"                                             ",vc.dflt);
        xatsay(2,0,"                                             ",vc.dflt);
        xatsay(3,0,"                                             ",vc.dflt);
        return(0);
```

```
}
strcat(buff1,buff3);
xatsay(2,45,"Document:",vc.dflt);
xatsay(2,55,buff1,vc.dflt);
strcpy(buff3,"@");
strcat(buff3,buff1);

f1=fopen(buff2,"r");
f2=fopen("tmp","w");
for(i=0;i<50;i++)
{
    empty(order[i],3);
    empty(type[i],2);
    empty(length[i],8);
    empty(var1[i].pic,61);
    empty(var1[i].func,10);
    empty(var1[i].prompt,61);
    empty(var1[i].field,13);
}
k=0;
j=0;
i=0;
ch='C';
flag2=0;
flag1=0;
while(ch != EOF)
{
    empty(buff,100);
    while(((ch =fgetc(f1)) != EOF) && (ch != '\n')&&(i<60))
    {
        buff[i]=ch;
        i++;
    }
    buff[i]='\0';
    trim(buff);
    if(buff[0] == '@' )
        if(!strcmp(buff,buff3))
            flag2 = 1;
        else
            flag2 = 0;
    if(flag2 == 1 && buff[0] != '@')
    {
        if( k == 0)
            strcpy(var1[j].pic,buff);
        if( k == 1)
            strcpy(var1[j].func,buff);
        if( k == 2)
            strcpy(var1[j].prompt,buff);
        if( k == 3)
            strcpy(var1[j].field,buff);
        k++;
        if (k>3)
        {
            k=0;
            j++;
        }
    }
    if(flag2 == 0)
    {
        if(buff[0] != EOF && buff[0] != ' ' && buff[0] != '\0')
        {
            fputs(buff,f2);
            fputc('\n',f2);
        }
    }
    i=0;
    if(j>49)
        break;
```

```
        }
        fclose(f1);
        if(var1[0].pic[0] == ' ')
        {
                dflthlp("LIBVARNEW");
                w1=wxopen(8,15,13,65,NULL,ACTIVE+CURSOR+BORDER+BD2,0,0);
                atsay(1,4,"1. Copy Fields from Another Document");
                atsay(2,4,"2. New Field Entry Window");
                wselect(sw);
                atsay(0,0,"Enter (1-2)     <ESC>Quit <F3>Help");
retry0:
                while(keyrdy())
                        getone();
                switch(getone())
                {
                        case '1':
                                atsay(0,0,"                                                   ");
                                wclose(w1);
                                break;
                        case '2':
                                atsay(0,0,"                                                   ");
                                wclose(w1);
                                goto skip1;
                        case ESC :
                                atsay(0,0,"                                                   ");
                                wclose(w1);
                                goto end;
                        default:
                                bell();
                                goto retry0;
                }
                wclose(w1);
                if( ret == 'N' || ret == 'n' )
                        goto skip1;
        }
        else
                goto skip1;
        empty(buff4,12);
        rw=wxopen(10,10,12,70,NULL,ACTIVE+CURSOR+BORDER+BD1,0,0);
        if(rw == -1)
                terror("Unable to open reference entry window");
        xatsay(1,1,"Enter Document Name: ",vc.dflt);
        xatget(1,27,buff4,"XXXX999",NULLFUNC,
        "Enter Document Name and Number  <F3>Help <F7>Save/Exit
          <ESC>Quit",NULL,vc.dflt,vc.dflt);
        readgets();                                                      ",vc.dflt);
        xatsay(1,1,"

wclose(rw);
        trim(buff4);
        n=strlen(buff4);
        if(n == 0)
                goto skip1;
        empty(buff1,12);
        strncpy(buff1,buff4,4);
        trim(buff1);
        strcat(buff1,".VAR");
        if((f1=fopen(buff1,"r")) == NULL)
        {
                w1=wxopen(10,20,12,60,NULL,ACTIVE+CURSOR+BORDER+BD2,0,0);
                atsay(0,7,"Unable to open             chapter index file");
                atsay(0,22,buff1);
                atsay(1,23,"Press any key to continue");
                c=getone();
                atsay(3,7,"                                        ");
                wclose(w1);
                goto skip1;
        }
```

```
empty(buff1,12);
strcpy(buff1,"@");
strcat(buff1,buff4);
trim(buff1);
k=0;
j=0;
i=0;
ch='C';
flag2=0;
flag1=0;
while(ch != EOF)
{
    empty(buff,100);
    while(((ch =fgetc(f1)) != EOF) && (ch != '\n')&&(i<60))
    {
        buff[i]=ch;
        i++;
    }
    buff[i]='\0';
    trim(buff);
    if(buff[0] == '@' )
        if(!strcmp(buff,buff1))
            flag2 = 1;
        else
            flag2 = 0;
    if(flag2 == 1 && buff[0] != '@')
    {
        if( k == 0)
            strcpy(var1[j].pic,buff);
        if( k == 1)
            strcpy(var1[j].func,buff);
        if( k == 2)
            strcpy(var1[j].prompt,buff);
        if( k == 3)
                strcpy(var1[j].field,buff);
            k++;
            if (k>3)
            {
                k=0;
                j++;
            }
    }
    i=0;
    if(j>49)
        break;
}
fclose(f1);
wselect(w0);
if(var1[0].pic[0] != ' ')
{
    atsay(0,58,"Fields copied from:");
    atsay(1,62,buff4);
}
skip1:
dflthlp("LIBVARFORM");
wselect(w0);
xatsay(3,6,"Field",vc.dflt);
xatsay(2,14,"Data",vc.dflt);
xatsay(3,14,"Type",vc.dflt);
xatsay(3,19,"#",vc.dflt);
xatsay(3,28,"Prompt Window",vc.dflt);
for(i=0,j=0;i<50;i++)
{
    sprintf(order[i],"%d",i+1);
    if(var1[i].pic[0] == 'x')
        type[i][0] = 'T';
    if(var1[i].pic[0] == '9')
        type[i][0] = 'N';
```

```c
            if(!strcmp(var1[i].pic,"99/99/99"))
                type[i][0] = 'D';
            if(!strcmp(var1[i].pic,"999-99-9999"))
                type[i][0] = 'S';
            if(!strcmp(var1[i].pic,"(999)999-9999"))
                type[i][0] = 'P';
            if(!strcmp(var1[i].pic,"Xxxxxxxxxxxxxxxxxxxxxxxxxxxxxxxxxxxxxxxxxxxxxxxxxxxxxxxxxxxx"))
                type[i][0] = 'E';
            m=strlen(var1[i].field);
            n=12-m;
            for(k=0;k<n;k++,m++)
                var1[i].field[m]=' ';
            m=strlen(var1[i].prompt);
            n=60-m;
            for(k=0;k<n;k++,m++)
                var1[i].prompt[m]=' ';
            m=strlen(var1[i].pic);
            if(var1[i].pic[0] == ' ')
                m=0;
            sprintf(length[i],"%d",m);
            if(type[i][0] == 'D' || type [i][0] == 'C'||
            type[i][0] == 'P' || type [i][0] == 'S'|| type[i][0] == 'B')
                strcpy(length[i],"0");
            if(m == 0)
                strcat(length[i]," ");
            m=strlen(length[i]);
            if(m == 1);
                strcat(length[i]," ");
            m=strlen(order[i]);
            if(m == 1);
                strcat(order[i]," ");
            order[i][2]='\0';
    }
    v1=wxopen(5,0,21,79,"Page 1",CURSOR+BORDER+BD1,0,0);
    v2=wxopen(5,0,21,79,"Page 2",CURSOR+BORDER+BD1,0,0);
    v3=wxopen(5,0,21,79,"Page 3",CURSOR+BORDER+BD1,0,0);
    v4=wxopen(5,0,21,79,"Page 4",CURSOR+BORDER+BD1,0,0);
    whide(v1);
    whide(v2);
    whide(v3);
    whide(v4);
    wselect(v1);
    wselect(v2);
    wselect(v3);
    wselect(v4);
    for(j=0,i=0;i<15;i++)
    {
        xxatget(vcdgt,v1,j,0,order[i],"99",orddoc,
        "Enter Field Order   <F3>Help <F7>Save/Exit   <PgUp><PgDn>
         <ESC>Quit",NULL,vc.dflt,vc.dflt);
        xxatget(vcdgt,v1,j,3,var1[i].field,"xxxxxxxxxxxx",NULLFUNC,
        "Enter/Edit Field Name   <F3>Help <F7>Save/Exit   <PgUp><PgDn>
         <ESC>Quit",NULL,vc.dflt,vc.dflt);
        xxatget(vcdgt,v1,j,16,type[i],"X",NULLFUNC,
        "<B>lock-<T>ext-<D>ate-<N>umber-<S>S#-<P>hone <F7>Save/Exit
         <ESC>Quit",NULL,vc.dflt,vc.dflt);
        xxatget(vcdgt,v1,j,18,length[i],"99",NULLFUNC,
        "Enter Length of Field (MAX = 60)   <F3>Help <F7>Save/Exit
         <PgUp><PgDn>",NULL,vc.dflt,vc.dflt);
        xxatget(vcdgt,v1,j,21,var1[i].prompt,
        "xxxxxxxxxxxxxxxxxxxxxxxxxxxxxxxxxxxxxxxxxxxxxxxxxxxxxxxxxxxx",NULLF
C,
        "Enter/Edit Prompt Window Description <F7>Save/Exit   <PgUp><PgDn>
         <ESC>Quit",NULL,vc.dflt,vc.dflt);
        j++;
```

```
        for(j=0,i=15;i<30;i++)
        {
                xxatget(vcdgt,v2,j,0,order[i],"99",orddoc,
                "Enter Field Order   <F3>Help <F7>Save/Exit    <PgUp>
                 <PgDn>",NULL,vc.dflt,vc.dflt);
                xxatget(vcdgt,v2,j,3,var1[i].field,"xxxxxxxxxxx",NULLFUNC,
                "Enter/Edit Field Name  <F3>Help <F7>Save/Exit  <PgUp><PgDn>
                 <ESC>Quit",NULL,vc.dflt,vc.dflt);
                xxatget(vcdgt,v2,j,16,type[i],"X",NULLFUNC,
                "<B>lock-<T>ext-<D>ate-<N>umber-<S>S#-<P>hone <F7>Save/Exit
                 <ESC>Quit",NULL,vc.dflt,vc.dflt);
                xxatget(vcdgt,v2,j,18,length[i],"99",NULLFUNC,
                "Enter Length of Field (MAX = 60)  <F3>Help <F7>Save/Exit
<PgUp>
                 <PgDn>",NULL,vc.dflt,vc.dflt);
                xxatget(vcdgt,v2,j,21,var1[i].prompt,
                "xxxxxxxxxxxxxxxxxxxxxxxxxxxxxxxxxxxxxxxxxxxxxxxx",NULLF "Enter/Edit Prompt Window Description <F7>Save/Exit  <PgUp><PgDn>
                 <ESC>Quit",NULL,vc.dflt,vc.dflt);
                j++;
        }
        for(j=0,i=30;i<45;i++)
        {
                xxatget(vcdgt,v3,j,0,order[i],"99",orddoc,
                "Enter Field Order   <F3>Help <F7>Save/Exit    <PgUp>
                 <PgDn>",NULL,vc.dflt,vc.dflt);
                xxatget(vcdgt,v3,j,3,var1[i].field,"xxxxxxxxxxx",NULLFUNC,
                "Enter/Edit Field Name  <F3>Help <F7>Save/Exit  <PgUp><PgDn>
                 <ESC>Quit",NULL,vc.dflt,vc.dflt);
                xxatget(vcdgt,v3,j,16,type[i],"X",NULLFUNC,
                "<B>lock-<T>ext-<D>ate-<N>umber-<S>S#-<P>hone <F7>Save/Exit
                 <ESC>Quit",NULL,vc.dflt,vc.dflt);
                xxatget(vcdgt,v3,j,18,length[i],"99",NULLFUNC,
                "Enter Length of Field (MAX = 60)  <F3>Help <F7>Save/Exit
<PgUp>
                 <PgDn>",NULL,vc.dflt,vc.dflt);
                xxatget(vcdgt,v3,j,21,var1[i].prompt,
                "xxxxxxxxxxxxxxxxxxxxxxxxxxxxxxxxxxxxxxxxxxxxxxxx",NULLF
C,
                "Enter/Edit Prompt Window Description <F7>Save/Exit  <PgUp><PgDn>
                 <ESC>Quit",NULL,vc.dflt,vc.dflt);
                j++;
        }
        for(j=0,i=45;i<50;i++)
        {
                xxatget(vcdgt,v4,j,0,order[i],"99",orddoc,
                "Enter Field Order   <F3>Help <F7>Save/Exit    <PgUp>
                 <PgDn>",NULL,vc.dflt,vc.dflt);
                xxatget(vcdgt,v4,j,3,var1[i].field,"xxxxxxxxxxx",NULLFUNC,
                "Enter/Edit Field Name  <F3>Help <F7>Save/Exit  <PgUp><PgDn>
                 <ESC>Quit",NULL,vc.dflt,vc.dflt);
                xxatget(vcdgt,v4,j,16,type[i],"X",NULLFUNC,
                "<B>lock-<T>ext-<D>ate-<N>umber-<S>S#-<P>hone <F7>Save/Exit
                 <ESC>Quit",NULL,vc.dflt,vc.dflt);
                xxatget(vcdgt,v4,j,18,length[i],"99",NULLFUNC,
                "Enter Length of Field (MAX = 60)  <F3>Help <F7>Save/Exit
<PgUp>
                 <PgDn>",NULL,vc.dflt,vc.dflt);
                xxatget(vcdgt,v4,j,21,var1[i].prompt,
                "Xxxxxxxxxxxxxxxxxxxxxxxxxxxxxxxxxxxxxxxxxxxxxxxx",NULLF
C,
                "Enter/Edit Prompt Window Description <F7>Save/Exit  <PgUp><PgDn>
                 <ESC>Quit",NULL,vc.dflt,vc.dflt);
                j++;
        }
        vshow(v4);
```

```
        wshow(v3);
        wshow(v2);
        wshow(v1);
        rtn=readgets();
        wclose(v1);
        wclose(v2);
        wclose(v3);
        wclose(v4);
        fclose(f2);
        if(rtn == ESC)
                goto end;
        f2=fopen("tmp","a");
        for(i=0,j=0;i<50;i++)
        {
                strcpy(var1[i].pic,"");
                if(type[i][0]=='D')
                        strcpy(var1[i].pic,"99/99/99");
                if(type[i][0]=='P')
                        strcpy(var1[i].pic,"(999)999-9999");
                if(type[i][0]=='S')
                        strcpy(var1[i].pic,"999-99-9999");
                if(type[i][0]=='B')
                        strcpy(var1[i].pic,
                        "Xxxxxxxxxxxxxxxxxxxxxxxxxxxxxxxxxxxxxxxxxxxxxxxxxxxxxxxxxxxx");
                if(type[i][0]=='N')
                {
                        sscanf(length[i],"%d",&l);
                        if(l>60)
                                l=60;
                        for(k=0;k<l;k++)
                                strcat(var1[i].pic,"9");
                }
                if(type[i][0]=='T')
                {
                        sscanf(length[i],"%d",&l);
                        if(l>60)
                                l=60;
                        for(k=0;k<l;k++)
                                strcat(var1[i].pic,"x");
                }
                if(type[i][0]=='D')
                        strcpy(var1[i].func,"valdate");
                if(type[i][0]!='D')
                if(var1[i].pic[0] != ' ')
                        strcpy(var1[i].func,"NULLFUNC");
                if(var1[i].field[0]==' ' || var1[i].field[0]=='\0')
                        empty(var1[i].pic,60);
                trim(order[i]);
                trim(var1[i].pic);
                trim(var1[i].func);
                trim(var1[i].prompt);
                trim(var1[i].field);
        }
        for(i=0,j=0;j<50;j++)
                if(var1[j].pic[0] != 0)
                        i=1;
        if(i==1)
        {
                atsay(9,20,"Storing Field Information");
                fputs(buff3,f2);    /* append document name if any pic format exists */
                fputc('\n',f2);
        }
        for(i=1;i<51;i++)
        {
                for(j=0;j<50;j++)
                {
```

```
                empty(buff,100);
                sprintf(buff,"%d",i);
                trim(buff);
                if(var1[j].pic[0] != ' ' && var1[j].pic[0] != '\0')
                {
                        if(!strcmp(order[j],buff))
                        {
                                fputs(var1[j].pic,f2);
                                fputc('\n',f2);
                                fputs(var1[j].func,f2);
                                fputc('\n',f2);
                                fputs(var1[j].prompt,f2);
                                fputc('\n',f2);
                                fputs(var1[j].field,f2);
                                fputc('\n',f2);
                        }
                }
            }
        }
        fclose(f2);
        empty(buff,100);
        at(4,1);
        strcpy(buff,"copy tmp ");
        strcat(buff,buff2);
        system(buff);
        system("del tmp");
        erase();
end:
        wselect(w0);
        erase();
        fclose(f1);
}

/********************************************************************
File:     creatvar.c
*********************************************************************
Object modules in file:
creatvar(),    orddoc()
*********************************************************************
Created By: Raymond T. Nygren
Date Created:  3/26/88
*********************************************************************
Edited By:
Date Edited:
*********************************************************************
Purpose:

*********************************************************************
Input:

*********************************************************************
Output:

*********************************************************************
Restrictions:
```

```
/******************************************************************/
COUNT orddoc(str,gt)   /* No duplicate order of Documents allowed */
TEXT str[];
GETTABLE *gt;
{
    int a,b,numb;
    GETITEM *ptr = gt->head;
    for(numb=0,a=0;a<50;a++)
    {
        if(!(str[0]==' '&& str[1]==' '))
            if(!strcmp(str,ptr->tmpfld))
                numb++;
        for(b=0;b<5;b++)
            ptr=ptr->next;
    }
    if(numb>1)
    {
        bell();
        w1=wxopen(10,20,13,60,NULL,ACTIVE+BORDER+BD1,0,0);
        atsay(0,9,"Duplicate Field Number");
        atsay(1,8,"Press any key to continue");
        ch=getone();
        wclose(w1);
        return(1);
    }
    else
        return(0);
}

/******************************************************************
File:    bldmnu.c
*******************************************************************
Object modules in file:

*******************************************************************
Created By: Raymond T. Nygren
Date Created: 3/26/88
*******************************************************************
Edited By:
Date Edited:
*******************************************************************
Purpose:  create menus for document selection

*******************************************************************
Input:

*******************************************************************
Output:

*******************************************************************
Restrictions:
```

```
/*****************************************************************
Object modules called:

*****************************************************************/
#include <vcstdio.h>
#include <ctype.h>
extern char index1[100][14];
extern struct vartyp {
     char pic[61];
     char func[10];
     char prompt[61];
     char field[13];
     };
extern struct vartyp var1[120]; /* Structure for variable menu */
extern struct vartyp var2; /* Structure for variable menu */
extern struct mnutyp {
     char title[20];
     char call[10];
     char prompt[60];
     };
extern struct mnutyp menu[5]; /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm,newint;
extern TEXT *globstr;
extern COUNT data,globint;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*****************************************************************
   Build pop down menus
*****************************************************************/
COUNT bldmnu(m)
     VCMENU *m;
{
     VCMENU *menunew();
     MENUITEM *menuxitem();
     int quit(),w1,chptr,flag1,del;
```

```
    char ch,c,fill[12],fill1[12];
    PFI setkeyfunc();
    COUNT vcprokey();
    addvcmstyle("STDVERT",VERTICAL,AUTO,
                    vc.cyan+vc.bold+vc.bg*vc.blue,       /* Normal */
                    vc.blue+vc.bg*vc.white,              /* Bar */
                    vc.cyan+vc.bg*vc.blue,               /* Unavailable */
                    vc.white+vc.blue*vc.bg,              /* Border */
                    0);                                   /* Permlvl */
    del=0;
    strcpy(file,m->curitmptr->parm.chrptr);
    for(i=0;i<25;i++)
    {
        if (!strcmp(file,menu1[i].call)) /* compare chapter catagories */
            chptr=i;
    }
    strcat(file,".IDX");
    strcpy(buff,"");
    for(i=0;i<50;i++)
    {
        empty(index[i],60);
        trim(index[i]);
    } j=0;
    i=0;
    corp=menunew(5,0,NULL,"INDEX","STDVERT");
    corp2=menunew(5,2,NULL,"INDEX","STDVERT");
    corp3=menunew(5,4,NULL,"INDEX","STDVERT");
    corp4=menunew(5,6,NULL,"INDEX","STDVERT");
    if((f1=fopen(file,"r")) == NULL)
    {
        w1=wxopen(4,1,10,60,NULL,ACTIVE,0,0);
        atsay(1,15,"unable to open index file");
        atsay(4,15,"Press any key to continue");
        ch=getone();
        wclose(w1);
        return(0);
    }
    while(ch != EOF)
    {
        while(((ch =fgetc(f1)) != EOF) && (ch != '\n'))
        {
            buff[i] = ch;
            i++;
        }
        buff[i] ='\0';
        strcpy(index[j],buff);
        trim(index[j]);
        i=0;
        j++;
        if(j>50)
            break;
    }
    numitm=j;
    for(j=0;j<15;j++)
    {
        if (index[j][0]!= '\0')
            menuxitem(corp,index[j],NULL,0,toggle,
            &mark[chptr][j],"<>To Select<>[ENTER]   <ESC>Prior Menu   <F3>Help            <F7>Done                   ","INDEX",CHECKED);
    }
    if (index[15][0]!= '\0')
```

```
        menuxitem(corp," Continued...",NULL,0,NULLFUNC,
        corp2,"[ENTER] for more Documents","INDEX",MENU);
for(j=0;j<15;j++)
{
        if(index[j+15][0]!= '\0')
            menuxitem(corp2,index[j+15],NULL,0,toggle,
            &mark[chptr][j+15],"<>To Select<>[ENTER]   <ESC>Prior Menu
            <F3>Help   <F7>Done                         ","INDEX",CHECKED);
}
if(index[30][0]!= '\0')
    menuxitem(corp2,"  Continued ...",NULL,0,NULLFUNC,
    corp3,"[ENTER] for more Documents","INDEX",MENU);
for(j=0;j<15;j++)
{
        if(index[j+30][0]!= '\0')
            menuxitem(corp3,index[j+30],NULL,0,toggle,
            &mark[chptr][j+30],"<>To Select<>[ENTER]   <ESC>Prior Menu
            <F3>Help   <F7>Done                         ","INDEX",CHECKED);
}
if(index[45][0]!= '\0')
    menuxitem(corp3," Continued...",NULL,0,NULLFUNC,
    corp4,"[ENTER] for more Documents","INDEX",MENU);
for(j=0;j<6;j++)
{
        if(index[j+45][0]!= '\0')
            menuxitem(corp4,index[j+45],NULL,0,toggle,
            &mark[chptr][j+45],"<>To Select<>[ENTER]   <ESC>Prior Menu
            <F3>Help   <F7>Done                         ","INDEX",CHECKED);
}
setkeyfunc(vcprokey);
addprokey(F7,quit,NULL);
addprokey(F10,called,NULL);
addprokey(F9,shsel,NULL);
vcmenu(corp);
delprokey(F10);
delprokey(F7);
empty(fill,12);

for(i=0,k=0;i<numitm;i++)
{
        if(mark[chptr][i] == 1)   /* selected item */
        {
            flag1=0;
            for(q=0;q<numsel+k;q++)
            {
                    if(index[i][0] == index1[q][0] && index[i][1] ==
index1[q][1]
                    && index[i][2] == index1[q][2] && index[i][3] ==
index1[q][3] &&
                    index[i][4] == index1[q][4] && index[i][5] ==
index1[q][5] &&
                    index[i][6] == index1[q][6] )
                    flag1 = 1;  /* item already exists */
            }
            if(flag1 == 0 ) /* add new item  */
            {
                strncpy(index1[k+numsel],index[i],7);
                index1[k+numsel][7]='\0';
                trim(index1);
                k++;
            }
        }
        else /* deselected item */
        {
            for(q=0;q<numsel+k;q++)
            {
                    if(index[i][0] == index1[q][0] && index[i][1] ==
index1[q][1]
                    && index[i][2] == index1[q][2] && index[i][3] ==
```

```
index1[q][3]
                    && index[i][4] == index1[q][4] && index[i][5] ==
index1[q][5]
                    && index[i][6] == index1[q][6] )
                    {
                        for(r=q;r<numsel+k+1;r++)
                            strcpy(index1[r],index1[r+1]);
                                k--;
                    }
                }
            }
        }
        numsel=numsel + k;
        fclose(f1);
        return(0);
}

/*******************************************************************/
called(key,ksp)
    COUNT key;
    VCPROKEY *ksp;
{
    static char buf1[20];
    static int test=0;
    empty(buf1,20);
    if(test==1)
        return(0);
    else
        test=1;
    strncpy(buf1,corp->curitmptr->itemname,7);
    trim(buf1);
    if(!strcmp(buf1,"  Conti"))
    {
        empty(buf1,20);
        strncpy(buf1,corp2->curitmptr->itemname,7);
        trim(buf1);
    }
    if(!strcmp(buf1,"  Conti"))
    {
        empty(buf1,20);
        strncpy(buf1,corp3->curitmptr->itemname,7);
        trim(buf1);
    }
    if(!strcmp(buf1,"  Conti"))
    {
        empty(buf1,20);
        strncpy(buf1,corp4->curitmptr->itemname,7);
        trim(buf1);
    }
    strcat(buf1,".SUM");
    if(isalnum(buf1[0])&&isalnum(buf1[1])&&isalnum(buf1[2])&&isalnum
    (buf1[3])&&isalnum(buf1[4])&&isalnum(buf1[5])&&isalnum(buf1[6]))
        mvced(buf1);
    test=0;
    empty(buf1,20);
        return(0);
}
/* Toggles an option flag and refreshes the menu to display the result */ toggle(m)
VCMENU *m;
    {
    toglchkvar(m);
        return(0);
    }
```

```
/*******************************************************************/
.c.  QUIT.C          9925      04/15/88        2:15P
quit()
{
    char buf0[20],buf1[20];
    empty(buf1,20);
    strncpy(buf1,corp->curitmptr->itemname,7);
    trim(buf1);
    if(!strcmp(buf1,"  Conti"))
    {
        empty(buf1,20);
        strncpy(buf1,corp2->curitmptr->itemname,7);
        trim(buf1);
    }
    else
    {
        ungetone(ESC);
        ungetone(ESC);
        ungetone(ESC);
        return(0);
    }
    if(!strcmp(buf1,"  Conti"))
    {
        empty(buf1,20);
        strncpy(buf1,corp3->curitmptr->itemname,7);
        trim(buf1);
    }
    else
    {
        ungetone(ESC);
        ungetone(ESC);
        ungetone(ESC);
        ungetone(ESC);
         return(0);
    }
    if(!strcmp(buf1,"  Conti"))
    {
        empty(buf1,20);
        strncpy(buf1,corp4->curitmptr->itemname,7);
        trim(buf1);
        ungetone(ESC);
        ungetone(ESC);
        ungetone(ESC);
        ungetone(ESC);
        ungetone(ESC);
        ungetone(ESC);
    }
    else
    {
        ungetone(ESC);
        ungetone(ESC);
        ungetone(ESC);
        ungetone(ESC);
        ungetone(ESC);
        return(0);
    }
;
    char prompt[60];
};
extern struct mnutyp menu[5]; /* Structure form volume menu */
extern struct mnutyp menu1[25]; /* Structure for chapter menus  */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
```

```c
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int wdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*************************************************************
   Create user defined variable files
   and save to user.var
**************************************************************/
printvar()
{
    char ret,type[50][2],length[50][8];
    char sdate[12],order[50][4],buff2[12],buff1[12],buff3[12],buff4[12];
    int flag2,counter;
    empty(sdate,12);
    getdate(sdate);
    loadchpt();
    if(file[0] == ' ')
    return(0);
    if(doc[0] == ' ')
        return(0);
```

```
/*************************************************************
File:      printvar.c
**************************************************************
Object modules in file:

**************************************************************
Created By: Raymond T. Nygren
Date Created: 3/26/88
**************************************************************
Edited By:
Date Edited:
**************************************************************
Purpose:  print OverDrive variable report by chapter

**************************************************************
Input:
```

```
**********************************************************************
Output:

**********************************************************************
Restrictions:

**********************************************************************
Object modules called:
loadchpt()

**********************************************************************/
#include <vcstdio.h>
extern char index1[100][14];
extern struct vartyp {
     char pic[61];
     char func[10];
     char prompt[61];
     char field[13];
     };
extern struct vartyp var1[120]; /* Structure for variable menu */
extern struct vartyp var2; /* Structure for variable menu */
extern struct mnutyp {
     char title[20];
     char call[10];
w1=wxopen(10,20,14,60,NULL,ACTIVE+BORDER+BD1,0,0);
atsay(0,12,"Is Printer Ready ?");
atsay(1,12,"<ESC> to Quit or");
atsay(2,8,"any other key to continue");
ch=getone();
wclose(w1);
if(ch==ESC)
{
     wclose(w1);
     return(0);
}
rw=wxopen(10,15,13,65,NULL,ACTIVE+BORDER+BD1,0,0);
if(rw == -1)
     terror("Unable to open reference entry window");
atsay(0,4,"Printing Field Information Report by Chapter");
atsay(1,17,"<ESC> to Quit");
strcpy(buff2,file);
trim(buff2);
strcat(buff2,".VAR");
for(i=0;i<50;i++)
{
     empty(order[i],4);
     empty(type[i],2);
     empty(length[i],8);
     empty(var1[i].pic,61);
     empty(var1[i].func,10);
     empty(var1[i].prompt,61);
     empty(var1[i].field,13);
}
empty(buff1,12);
f1=fopen(buff2,"r");
f2=fopen("prn","w");
k=0;
j=0;
i=0;
m=0;
ch='C';
flag1=0;
while(ch != EOF)
```

```c
{
    empty(buff,100);
    while(((ch =fgetc(f1)) != EOF) && (ch != '\n'))
    {
        buff[i]=ch;
        i++;
    }
    buff[i]='\0';
    trim(buff);
    k++;
    if (k>4)
    {
        k=1;
        j++;
    }
        if(buff[0] == '@' )
        {
            if(m!=0 )
                goto print1;
ret:
            k=0;
            empty,(fil,12);
            strcpy(buff1,buff);
        }
        m++;
        if(buff[0] != '@')
        {
            if( k == 1)
                strcpy(var1[j].pic,buff);
            if( k == 2)
                strcpy(var1[j].func,buff);
            if( k == 3)
                strcpy(var1[j].prompt,buff);
            if( k == 4)
                strcpy(var1[j].field,buff);
        }
        i=0;
    }
    fclose(f1);
    flag1=1;
print1:
    fputs("                         OverDrive Library Report\n",f2);
    fputs("                       Field Information by Document ",f2);
    fputc('\n',f2);
    fputc('\n',f2);
    fputs(sdate,f2);
    fputs("                 Volume: ",f2);
    fputs(doc,f2);
    fputc('\n',f2);
    fputs("                 Chapter: ",f2);
    fputs(fil,f2);
    fputs("  Document:",f2);
    file[0]=buff1[1];
    file[1]=buff1[2];
    file[2]=buff1[3];
    file[3]=buff1[4];
    file[4]=buff1[5];
    file[5]=buff1[6];
    file[6]=buff1[7];
    file[7]='\0';
    fputs(file,f2);
    fputc('\n',f2);
    fputs("              Data\n",f2);
    fputs("   Field",f2);
    fputs("      Type",f2);
    fputs(" Length     ",f2);
    fputs("Prompt Window",f2);
    fputc('\n',f2);
    fputc('\n',f2);
```

```c
for(i=0,j=0;i<50;i++)
{
    sprintf(order[i],"%d",i+1);
    if(var1[i].pic[0] == 'X')
        type[i][0] = 'T';
    if(var1[i].pic[0] == '9')
        type[i][0] = 'N';
    if(!strcmp(var1[i].pic,"99/99/99"))
        type[i][0] = 'D';
    if(!strcmp(var1[i].pic,"999-99-9999"))
        type[i][0] = 'S';
    if(!strcmp(var1[i].pic,"(999)999-9999"))
        type[i][0] = 'P';
    if(!strcmp(var1[i].pic,
"Xxxxxxxxxxxxxxxxxxxxxxxxxxxxxxxxxxxxxxxxxxxxxxxxxxxxxxxxxxxx"))
    type[i][0] = 'B';
    m=strlen(var1[i].field);
    n=12-m;
    for(k=0;k<n;k++,m++)
        var1[i].field[m]=' ';
    m=strlen(var1[i].prompt);
    n=60-m;
    for(k=0;k<n;k++,m++)
        var1[i].prompt[m]=' ';
    m=strlen(var1[i].pic);
    if(var1[i].pic[0] == ' ')
        m=0;
    sprintf(length[i],"%d",m);
    if(type[i][0] == 'D' || type [i][0] == 'C'||
       type[i][0] == 'P' || type [i][0] == 'S')
        strcpy(length[i],"0");
    if(var1[i].field[0] != ' ')
    {
        if(order[i][1] == '\0')
            strcat(order[i]," ");
        fputs(order[i],f2);
        fputs(" ",f2);
        fputs(var1[i].field,f2);
        fputs(" ",f2);
        fputs(type[i],f2);
        fputs("  ",f2);
        if(length[i][1] == '\0')
            strcat(length[i]," ");
        fputs(length[i],f2);
        fputs("  ",f2);
        trim(var1[i].prompt);
        fputs(var1[i].prompt,f2);
        fputc('\n',f2);
    }
}
fputc('\f',f2);
j=0;
for(i=0;i<50;i++)
{
    empty(order[i],4);
    empty(type[i],2);
    empty(length[i],8);
    empty(var1[i].pic,61);
    empty(var1[i].func,10);
    empty(var1[i].prompt,61);
    empty(var1[i].field,13);
}
if(kbhit())
{
    c=getone();
    if(c == ESC)
    {
        fclose(f2);
```

```
                    wclose(rw);
                    return(0);
                }
            }
            if(flag1 != 1)
            {
                if(prnt[0] == 'M')
                {
                    whide(rw);
                    w1=wxopen(10,20,13,60,NULL,ACTIVE+BORDER+BD1,0,0);
                    atsay(0,4,"Have Printer Ready for Next Page");
                    atsay(1,0,"Press any key to continue or <ESC>Quit");
                    ch=getone();
                    wclose(w1);
                    wshow(rw);
                    if(ch == ESC)
                    {
                        fclose(f2);
                        wclose(rw);
                        return(0);
                    }
                }
                goto ret;
            }
            fclose(f2);
            wclose(rw);
        }
```

```
/*****************************************************************
File:     form.c
******************************************************************
Object modules in file:

******************************************************************
Created By: Raymond T. Nygren
Date Created:  3/26/88
******************************************************************
Edited By:
Date Edited:
******************************************************************
Purpose:  find unique list of fields from documents listed in index1 array

******************************************************************
Input:

******************************************************************
Output:

******************************************************************
Restrictions:

******************************************************************
Object modules called:
```

```c
/******************************************************/
#include <vcstdio.h>
extern char index1[100][14];
extern struct vartyp {
    char pic[61];
    char func[10];
    char prompt[61];
    char field[13];
};
extern struct vartyp var1[120]; /* Structure for variable menu */
extern struct vartyp var2;      /* Structure for variable menu */
extern struct mnutyp {
    char title[20];
    char call[10];
    char prompt[60];
};
extern struct mnutyp menu[5];  /* Structure form volume menu */
extern struct mnutyp menu1[25]; /* Structure for chapter menus */
extern int flag1,flag0,numfld,numdoc;
extern char chr[2],buffer[12];
extern char edit[120][61],file[13];
extern char ref[13],index[50][80],index2[100][14],docu[25][20][12];
extern char ch,c,fil[12],buff[100],doc[13];
extern int color,i,j,k,l,m,n,q,r,s,t,x,word,w0,w1,w2,w3,flag,flag3,off;
extern COUNT fldx,fldindx[25][20][50],sel[25];
extern COUNT mark[25][50],numsel,numitm;
extern TEXT *globstr;
extern COUNT data;
extern VCMENU *corp,*corp2,*corp3,*corp4;
extern COUNT subfunc(),intfunc(),func2(),toggle(),normal(),copy(),cut();
extern COUNT prnform1(),savword(),wpmnu(),vcmhf3(),clock12(),vchelp();
extern COUNT
savref(),idxmnu(),selmnu(),selmnu(),form(),scrform(),shsel(),called();
extern COUNT
creatidx(),mvced(),mainmnu(),prnform(),dentry(),bldmnu(),mtoggle();
extern COUNT rw,sw,m1,m2,new;
extern PFI setloop();
extern PFI sethelp();
extern PFI oldhlp();
extern VCMENU *crp,*crp2,*crp3,*crp4,*crp5,*crp6;
extern VCMENU *menunew();
extern VCMENU *menuxnew();
extern VCMENU
*mainmenu,*mainmenu1,*mainmenu2,*mainmenu3,*mainmenu4,*mainmenu5;
extern MENUITEM *menuxitem();
extern COUNT vchelp();
extern FILE *f1,*f2,*f4,*f5;
extern int vdo,colors;
extern char
od[50],wp[50],vol1[50],vol2[50],vol3[50],vol4[50],vol5[50],prnt[2],vers[4],
r[3];
extern struct VCED_NODE *ednode,*vcedopen();
/*******************************************************
    form extracts doc. variable informatiom from *.var file
    from items selected from <index1> array and creates a unique
    variable list in <edit> array with pointers back to the
    original doc <fldindx>
*******************************************************/ form()
{
    int chpt,w5;
    wselect(w0);
    flag=0;
    if(numsel > 20 )
    {
        w1=vxopen(10,10,13,70,NULL,ACTIVE+BORDER+BD1,0,0);
```

```c
            atsay(0,15,"More than 20 Documents selected");
            atsay(1,19,"Press any key to continue");
            ch=getone();
            wclose(w1);
            numfld=1;
            return(0);
        }
        w5=wxopen(11,20,13,60,NULL,ACTIVE+BORDER+BD1,0,0);
        atsay(0,6,"Reading Document Information");
        numfld=1; /*common field number must start at on to find end of
                        fields in fldindx[i][j][k]   */
        for (q=0;q<numsel;q++) /* for number of selected documents   */
        {
            empty(doc,12);
            strncpy(doc,index1[q],4); /* index1 are selected documents */
            trim(doc);
/*****************************************************************/
            /*compare chpter call to doc 1st 4 char of selected documents
              to sort documents selected by chapter for var files*/
/*****************************************************************/
            for(i=0;i<25;i++)    /* number of chapters */
            {
                trim(menu1[i].call);
                if(menu1[i].call[0]!='\0')    /* this means chapter exists *
                {
                    if (!strcmp(doc,menu1[i].call))
                    {
                        strncpy(docu[i][sel[i]],index1[q],7); /*copy
document to 2
                        trim(docu[i][sel[i]]);    /* dim array with chpt as
1st an
    num/chpt as 2nd*/
                        sel[i]++; /* increment number of documents for eac
chptr */
                        break;
                    }
                }
            }
        }
        for(chpt=0;chpt<25;chpt++)    /* loop for number of chptrs */
        {
            if(sel[chpt] != 0) /* if there are documents selected in this chp
*/
            {
                empty(fil,12);
                strncpy(fil,menu1[chpt].call,4);
                trim(fil);
                strcat(fil,".VAR");
                if((f1=fopen(fil,"r")) == NULL) /* open variable file for
chptr */
                {
                    w1=wxopen(10,15,13,65,NULL,ACTIVE+BORDER+BD1,0,0);
                    atsay(0,1,"Unable to open        chapter file");
                    atsay(0,17,fil);
                    atsay(1,10,"Press any key to continue");
                    ch=getone();
                    wclose(w1);
                    wclose(w5);
                    numfld=1;
                    return(0);
                }
                for(numdoc=0;numdoc<sel[chpt];numdoc++) /* loop for # doc sel
in
chpt*/
                {
                    flag=0;
                    flag1=0;    /*reset flag to see if each document contain
field*/
                    var2.pic[0]!='\0';  /* make sure pic is NULL*/
```

```c
                fldx=0; /* number of fields in single document */
                strcpy(doc,"@");
                strcat(doc,docu[chpt][numdoc]); /* create current
@docname */
                i=0;
                ch= 'n';
                while(ch != EOF )
                {
                        while(((ch =fgetc(f1)) != EOF) && (ch != '\n')&&(c
!= '\0'))
                        {
                                buff[i] = ch;
                                i++;
                        }
                        buff[i] ='\0';
                        i=0;
                        if((buff[0] == '@') && (!strcmp(buff,doc)))
                        {
                                flag=1;     /* document is current one */
                                k=0;
                        }
                        if((buff[0] == '@') && (strcmp(buff,doc))&& flag==1
                        {
                                flag=0;
                                break; /* Already have fields for this document
*/
                        }
                        if((buff[0] == '@') && (strcmp(buff,doc)))
                                flag = 0;           /*document is not current
one */
                        if((buff[0] != '@') && (flag == 1)
                        && (k != 4))            /* variable contained in
current doc.*/
                        {
                                if( k == 0)
                                        strcpy(var2.pic,buff);
                                if( k == 1)
                                        strcpy(var2.func,buff);
                                if( k == 2)
                                        strcpy(var2.prompt,buff);
                                if( k == 3)
                                        strcpy(var2.field,buff);
                                k++;
                        }
                        if((buff[0] != '@') && (flag == 1) && (k == 4))
                        {
                                if(var2.pic[0]!='\0')    /* make sure at leas
one var/doc*/
                                        flag1=1;
                                for(t=1;t<numfld;t++)    /* loop for total
number of fields
        */
                                {
                                        if((!strcmp(var2.pic,var1[t-1].pic)) &&
                                                        exists */
                                        (!strcmp(var2.field,var1[t-1].field)) &&
                                        (!strcmp(var2.prompt,var1[t-1].prompt)))
                                        {
                                                fldindx[chpt][numdoc][fldx]= t;/*
pointer to common
        fld */
                                                k=0;     /* reset struct load
pointer and flag
                                                        common field*/
                                                fldx++;  /* increment number of
fields in doc */
                                                break;
                                        }
```

```
                        }
                        if(k != 0) /* field and format unique so add
field specs*/
                        {
                                if(numfld>119)
                                        break;
                                strcpy(var1[numfld-1].pic,var2.pic);
                                strcpy(var1[numfld-1].func,var2.func);
                                strcpy(var1[numfld-1].prompt,var2.prompt
                                strcpy(var1[numfld-1].field,var2.field);
                                fldindx[chpt][numdoc][fldx]=numfld;
/*pointer to field
        */
                                fldx++; /* increment field number in
document */
                                numfld++; /* increment total number of
fields */
                                k=0;    /* reset struct load pointer *
                        }
                    }
                }
                if(ch==EOF && flag == 0)
                {
                        flag=1;
                        ch='n';
                }
                rewind(f1);
                if(flag1 == 0)
                {
                        w1=wxopen(10,15,13,65,NULL,ACTIVE+BORDER+BD1,0,0);
                        atsay(0,5,"Unable to find          in variable
file");
                        atsay(0,20,docu[chpt][numdoc]);
                        atsay(1,10,"Press any key to continue");
                        ch=getone();
                        wclose(w1);
                        wclose(w5);
                        numfld=1;
                        return(0);
                }
            }
            fclose(f1);
        }
    }
    if(numfld > 119 )
    {
        w1=wxopen(10,15,14,65,NULL,ACTIVE+BORDER+BD1,0,0);
        atsay(0,8,"More than 120 unique fields selected");
        atsay(1,10,"Select fewer documents again");
        atsay(2,14,"Press any key to continue");
        ch=getone();
        wclose(w1);
        numfld=1;
    }
    wclose(w5);
    return(0);
}
```

While the invention has been described in connection with what is presently considered to be the most practical and preferred embodiment, it is to be understood that the invention is not to be limited to the disclosed embodiment, but on the and equivalent arrangements included within the contrary, is intended to cover various modifications spirit and scope of the appended claims.

We claim:

1. An automated multiple file assembly system comprising:
   means for storing a plurality of primary files into at least one storage area, where each primary file contains one of at least two types of data fields, and where at least one of the types of data fields is a constant value data field type and where at least a second one of the types of data fields is a variable data field type, and where at least one of the plurality of primary files contains at least one data field of the variable data field type;

file selection means responsive to an external input for enabling selection, from the plurality of primary files stored by the means for storing, of a subset of the primary files to be used for file assembly;

variable data field compilation means responsive to the file selection means for creating a set of nonredundant variable data elements and associating each element of the set of nonredundant variable data elements with one or more respective variable data fields in one or more of the primary files comprising the subset of primary files;

variable data entry prompting means for prompting provision of file completion data elements associated with each of the nonredundant variable data elements;

variable data entry means for enabling file completion data elements corresponding to the nonredundant variable data elements to be provided in response to the variable data entry prompting means;

file completion instruction means for creating a set of instructions for creating a set of new files from the subset of primary files, where the set of instructions contains at least one instruction for substituting at least one file completion data element in place of a particular corresponding variable data field in at least one of the new files comprising the set of new files; and file processing means for executing the set of instructions created by the file completion instruction means to create the set of new files from the subset of primary files.

2. An automated multiple file assembly system according to claim 1, wherein the variable data entry prompting means includes means for generating a form for data entry, where the form for data entry provides a user of the automated multiple file assembly system with an opportunity to supply the file completion data elements associated with each of the nonredundant variable data elements.

3. An automated multiple file assembly system according to claim 2, wherein the means for generating a form for data entry includes means for displaying the form to a user, wherein the means for displaying operates in conjunction with the variable data entry means.

4. An automated multiple file assembly system according to claim 3, further including means for printing any file contained in the plurality of primary files, the subset of primary files or the set of new files.

5. An automated multiple file assembly system according to claim 4, wherein the file processing means includes means for controlling the printing means to link and sequentially print each new file.

6. An automated multiple file assembly system according to claim 5, wherein the means for controlling the printing means includes a data entry means for entering an instruction to initiate the sequential printing of each of the new files.

7. An automated multiple file assembly system according to claim 6, wherein the data entry means for entering an instruction to initiate the sequential printing of each of the new files is activated by a single user input.

8. An automated multiple file assembly system according to claim 7, wherein the data entry means for entering an instruction to initiate the sequential printing of each of the new files is a keyboard, and wherein the single user input is a depression of a single key on the keyboard.

9. An automated multiple file assembly system according to claim 2, wherein the means for generating a form for data entry includes means for printing the form for data entry.

10. An automated multiple file assembly system according to claim 1, wherein the means for storing the plurality of primary files includes organizing means for organizing the plurality of primary files into a library of files, wherein the library of files is further organized by the organizing means into a plurality of volumes with each of the volumes organized into a plurality of chapters each chapter containing at least one of the primary files.

11. An automated multiple file assembly system according to claim 10, wherein the organizing means includes a means for storing an index file associating each chapter with a description of each primary file contained in that chapter.

12. An automated multiple file assembly system according to claim 11, wherein the file selection means includes means for accessing the index file associating each chapter with a description of each primary file contained in that chapter and for building a menu that provides the description of a particular primary file associated with an external file query input that is associated with that particular primary file.

13. An automated multiple file assembly system according to claim 12 wherein the external file query input is provided by a user of the automated multiple file assembly system through a data entry means associated with the file selection means.

14. An automated multiple file assembly system according to claim 10, wherein the organizing means includes means for generating a table of contents of a chapter.

15. An automated multiple file assembly system according to claim 1, further including means for storing into at least one new file storage area subsets of new files created by the file processing means.

16. An automated multiple file assembly system according to claim 15, wherein means for storing into at least one new file storage area subsets of new files created by the file processing means includes means for designating each of the subsets of new files by a unique reference name.

17. An automated multiple file assembly system according to claim 16, wherein the means for designating each of the subsets of new files by a unique reference name includes means for accessing each subset of new files by the unique reference name by which such subset of new files is designated.

18. An automated multiple file assembly system according to claim 1, wherein the selection means includes means for associating with each primary file of the subset of primary files a file identifying name.

19. An automated multiple file assembly system according to claim 18, wherein the subset of primary files has associated therewith a subset file list containing each file identifying name associated with each primary file contained in the subset of primary files.

20. An automated multiple file assembly system according to claim 19, further including means for storing a plurality of subset file lists associated with previously selected subsets of primary files, wherein the external input to which the file selection means is responsive directs the file selection means to select, as the subset of primary files to be used for file assembly, the subset of primary files associated with a particular subset file list.

21. An automated multiple file assembly system according to claim 1, wherein the number of primary files in the subset of primary files is equal to the number of new files in the set of new files created by the file processing means.

22. An automated multiple file assembly system according to claim 21, wherein each of primary files in the subset of primary files is uniquely associated with a particular new file in the set of new files created by the file processing means.

23. An automated multiple file assembly system according to claim 21, wherein each of new files in the set of new files created by the file processing means is uniquely associated with a particular primary file in the subset of primary files.

24. An automated multiple file assembly system according to claim 21, wherein each of new files in the set of new files created by the file processing means corresponds one-to-one with a particularly primary file in the subset of primary files.

25. An automated multiple file assembly system according to claim 1, wherein each of the plurality of primary files is unique.

26. An automated multiple document assembly system comprising:
  means for storing a plurality of primary documents into at least one storage area, where each primary document contains one of at least two types of data fields, and where at least one of the types of data fields is a constant value data field type and where at least a second one of the types of data fields is a variable data field type, and where at least one of the plurality of primary documents contains at least one data field of the variable data field type;
  document selection means responsive to an external input for enabling selection, from the plurality of primary documents stored by the means for storing, of a subset of the primary documents to be used for document assembly;
  variable data field compilation means responsive to the document selection means for creating a set of nonredundant variable data elements and associating each element of the set of nonredundant variable data elements with one or more respective variable data fields in one or more of the primary documents comprising the subset of primary documents;
  variable data entry prompting means for prompting provision of document completion data elements associated with each of the nonredundant variable data elements;
  variable data entry means for enabling document completion data elements corresponding to the nonredundant variable data elements to be provided in response to the variable data entry prompting means;
  document completion instruction means for creating a set of instructions for creating a set of new documents from the subset of primary documents, where the set of instructions contains at least one instruction for substituting at least one document completion data element in place of a particular corresponding variable data field in at least one of the new documents comprising the set of new documents; and
  document processing means for executing the set of instructions created by the document completion instruction means to create the set of new documents from subset of primary documents.

27. An automated multiple document assembly system according to claim 26, wherein the variable data entry prompting means includes means for generating a form for data entry, where the form for data entry provides a user of the automated multiple document assembly system with an opportunity to supply the document completion data elements associated with each of the nonredundant variable data elements.

28. An automated multiple document assembly system according to claim 27, wherein the means for generating a form for data entry includes means for printing the form for data entry.

29. An automated multiple document assembly system according to claim 28, wherein the means for generating a form for data entry includes means for displaying the form to a user, wherein the means for displaying operates in conjunction with the variable data entry means.

30. An automated multiple document assembly system according to claim 29, further including means for printing any document contained in the plurality of primary documents, the subset of primary documents or the set of new documents.

31. An automated multiple document assembly system according to claim 30, wherein the document processing means includes means for controlling the printing means to link and sequentially print each new document.

32. An automated multiple document assembly system according to claim 31, wherein the means for controlling the printing means includes a data entry means for entering an instruction to initiate the sequential printing of each of the new documents.

33. An automated multiple document assembly system according to claim 32, wherein the data entry means for entering an instruction to initiate the sequential printing of each of the new documents is activated by a single user input.

34. An automated multiple document assembly system according to claim 33, wherein the data entry means for entering an instruction to initiate the sequential printing of each of the new documents is a keyboard, and wherein the single user input is a depression of a single key on the keyboard.

35. An automated multiple document assembly system according to claim 28, further including means for storing into at least one new document storage area subsets of new documents created by the document processing means.

36. An automated multiple document assembly system according to claim 35, wherein means for storing into at least one new document storage area subsets of new documents created by the document processing means includes means for designating each of the subsets of new documents by a unique reference name.

37. An automated multiple document assembly system according to claim 36, wherein the means for designating each of the subsets of new documents by a unique reference name includes means for accessing each subset of new documents by the unique reference name by which such subset of new files is designated.

38. An automated multiple document assembly system according to claim 37, wherein the external document query input is provided by a user of the automated multiple document assembly system through a data entry means associated with the document selection means.

39. An automated multiple document assembly system according to claim 27, wherein the means for storing the plurality of primary documents includes organizing means for organizing the plurality of primary documents into a library of documents, wherein the library of documents is further organized by the organizing means into a plurality of volumes with each of the volumes organized into a plurality of chapters each chapter containing at least one of the primary documents.

40. An automated multiple document assembly system according to claim 39, wherein the organizing means includes means for generating a table of contents of a chapter.

41. An automated multiple document assembly system according to claim 40, wherein the document selection means includes means for accessing the index document associating each chapter with a description of each primary document contained in that chapter and for building a menu that provides the description of a particular primary document associated with an external document query input that is associated with that particular primary document.

42. An automated multiple document assembly system according to claim 39, wherein the organizing means includes a means for storing an index document associating each chapter with a description of each primary document contained in that chapter.

43. An automated multiple document assembly system according to claim 26, wherein the selection means includes means for associating with each primary document of the subset of primary documents a document identifying name.

44. An automated multiple document assembly system according to claim 43, wherein the subset of primary documents has associated therewith a subset document list containing each document identifying name associated with each primary document contained in the subset of primary documents.

45. An automated multiple document assembly system according to claim 44, further including means for storing a plurality of subset document lists associated with previously selected subsets of primary documents, wherein the external input to which the document selection means is responsive directs the document selection means to select, as the subset of primary documents to be used for document assembly, the subset of primary documents associated with a particular subset document list.

46. An automated multiple document assembly system according to claim 26, wherein each of the plurality of primary documents is unique.

47. An automated multiple document assembly system according to claim 26, wherein the number of primary documents in the subset of primary documents is equal to the number of new documents in the set of new documents created by the document processing means.

48. An automated multiple document assembly system according to claim 26, wherein each of new documents in the the set of new documents created by the document processing means corresponds one-to-one with a particular primary document in the subset of primary documents.

49. A method for automated assembly of multiple documents comprising the steps of:
storing a plurality of primary documents into at least one storage area, where each primary document contains one of at least two types of data fields, and where at least one of the types of data fields is a constant value data field type and where at least a second one of the types of data fields is a variable data field type, and where at least one of the plurality of primary documents contains at least one data field of the variable data field type;
selecting from the plurality of primary documents a subset of primary documents to be used for document assembly;
creating a set of nonredundant variable data elements and associating each element of the set of nonredundant variable data elements with one or more respective variable data fields in one or more of the primary documents comprising the subset of primary documents;
providing document completion data elements corresponding to the nonredundant variable data elements;
creating a set of instructions for creating a set of new documents from the subset of primary documents, where the set of instructions contains at least one instruction for substituting in at least one of the new documents comprising the set of new documents at least one document completion data element in the place of a particular corresponding variable data field; and
executing the set of instructions created through the previous step to create the set of new documents that correspond to the subset of primary documents specified during the selecting step.

50. A method according to claim 49, wherein the providing step includes a step for generating a form for data entry for a user of the method to supply document completion data elements associated with each of the nonredundant variable data elements.

51. A method according to claim 50, wherein the generating step includes a printing step for the printing of the form for data entry.

52. A method according to claim 51, wherein the generating step includes the step of displaying the form to a user.

53. A method according to claim 49, wherein the step for storing the plurality of primary documents includes a step organizing the plurality of primary documents into a library of documents, wherein the library of documents is further organized in the organizing steps into a plurality of volumes with each of the volumes organized into a plurality of chapters each chapter containing at least one of the primary documents.

54. A method according to claim 53, wherein the organizing step includes the step of storing an index document associating each chapter with a description of each primary document contained in that chapter.

55. A method according to claim 49, further including a step for storing into at least one new document storage area subsets of new documents created as a result of the execution step.

56. A method for automated assembly of multiple files comprising the steps of:
storing a plurality of primary files into at least one storage area, where each primary file contains one of at least two types of data fields, and where at least one of the types of data fields is a constant value data field type and where at least a second one of the types of data fields is a variable data field type, and where at least one of the plurality of primary files contains at least one data field of the variable data field type;

selecting from the plurality of primary files a subset of primary files to be used for file assembly;

creating a set of nonredundant variable data elements and associating each element of the set of nonredundant variable data elements with one or more respective variable data fields in one or more of the primary files comprising the subset of primary files;

providing file completion data elements corresponding to the nonredundant variable data elements;

creating a set of instructions for creating a set of new files from the subset of primary files, where the set of instructions contains at least one instruction for substituting in at least one of the new files comprising the set of new files at least one file completion data element in the place of a particular corresponding variable data field; and executing the set of instructions created through the previous step to create the set of new files that correspond to the subset of primary files specified during the selecting step.

57. A method according to claim 56, wherein after the executing step, a step of printing each of the new files.

58. A method according to claim 56, wherein the printing step includes a step for storing subsets of the new files and further includes a step of printing a particular subset of new files.

59. A multiple file assembly data processing system comprising:

at least one storage area for storage of a plurality of primary files, where each primary file contains one of at least two types of data fields, and where at least one of the types of data fields is a constant value data field type and where at least a second one of the types of data fields is a variable data field type, and where at least one of the plurality of primary files contains at least one data field of the variable data field type;

a file selector responsive to an external input for enabling selection, from the plurality of primary files, of a subset of the primary files to be used for file assembly;

a variable data field extractor responsive to the file selector for creating a set of nonredundant variable data elements and associating each element of the set of nonredundant variable data elements with one or more respective variable data fields in one or more of the primary files comprising the subset of primary files;

a variable data entry prompter, for prompting the supply of file completion data elements associated with each of the nonredundant variable data elements;

a variable data entry device for enabling file completion data elements corresponding to the nonredundant variable data elements to be provided in response to the variable data entry prompter;

a file completion instructor, for creating a set of instructions for creating a set of new files from the subset of primary files, where the set of instructions contains at least one instruction for substituting at least one file completion data element in the place of a particular corresponding variable data field in at least one of the new files comprising the set of new files; and a file processor for executing the set of instructions created by the file completion instructor to create the set of new files from the subset of primary files.

60. A multiple file assembly data processing system according to claim 59, wherein the new files created are compatible with a word processing program.

61. A multiple file assembly data processing system according to claim 59, wherein the new files created are documents that contain only text.

62. A multiple file assembly data processing system according to claim 59, wherein the file processor includes a printing processor that, in response to at least one print command, prints any subset of the new files created by the file processor.

* * * * *